US012230239B2

(12) United States Patent
Lathrop et al.

(10) Patent No.: US 12,230,239 B2
(45) **Date of Patent: *Feb. 18, 2025**

(54) MAPPING CHARACTERISTICS OF MUSIC INTO A VISUAL DISPLAY

(71) Applicant: New Resonance, LLC, Mountain View, CA (US)

(72) Inventors: John Fargo Lathrop, Mountain View, CA (US); Fred Jay Cummins, San Francisco, CA (US)

(73) Assignee: New Resonance, LLC, Mountain View, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 17/209,037

(22) Filed: Mar. 22, 2021

(65) Prior Publication Data

US 2021/0295811 A1 Sep. 23, 2021

Related U.S. Application Data

(63) Continuation of application No. 16/074,077, filed as application No. PCT/US2017/016756 on Feb. 6, 2017, now Pat. No. 10,978,033.

(Continued)

(51) Int. Cl.

| | |
|---|---|
| ***G10H 1/36*** | (2006.01) |
| ***G10G 1/02*** | (2006.01) |
| ***G10H 1/00*** | (2006.01) |

(52) U.S. Cl.

CPC ............... *G10H 1/368* (2013.01); *G10G 1/02* (2013.01); *G10H 1/0008* (2013.01);

(Continued)

(58) Field of Classification Search

CPC ................ G10H 1/368; G10H 1/0008; G10H 2210/086; G10H 2220/005; G10H 2220/126; G10H 2250/235; G10G 1/02

See application file for complete search history.

(56) References Cited

U.S. PATENT DOCUMENTS

| | | | |
|---|---|---|---|
| 6,411,289 | B1 | 6/2002 | Zimmerman |
| 7,589,727 | B2 | 9/2009 | Haeker |

(Continued)

FOREIGN PATENT DOCUMENTS

| | | | |
|---|---|---|---|
| EP | 1087367 | A1 | 3/2001 |
| EP | 1089254 | A1 | 4/2001 |

(Continued)

OTHER PUBLICATIONS

Written Opinion of the International Searching Authority for PCT/US2017/016756.

English language translation of JP2005-209000A.

*Primary Examiner* — Jianchun Qin

(74) *Attorney, Agent, or Firm* — Appleton Luff

(57) ABSTRACT

A method and system for visualizing music using a perceptually conformal mapping system are provided. A music source file is input into a processor configured to carry out a series of steps on audio cues identified within the music and ultimately generate a simultaneous visual representation on a display device. The series of steps include application of one or more perceptually conformal mapping systems that essentially induce a synesthetic experience in which a person can experience music both acoustically and visually at the same time. The device extracts cues from the music that are designed to specifically capture fundamentals of human appreciation, maps them into visual cues, then presents those visual cues synchronized with the source music.

19 Claims, 12 Drawing Sheets

Related U.S. Application Data

(60) Provisional application No. 62/292,193, filed on Feb. 5, 2016.

(52) U.S. Cl.
CPC . *G10H 2210/086* (2013.01); *G10H 2220/005* (2013.01); *G10H 2220/126* (2013.01); *G10H 2250/235* (2013.01)

(56) References Cited

U.S. PATENT DOCUMENTS

| | | | | |
|---|---|---|---|---|
| 7,875,787 | B2 | 1/2011 | Lemons | |
| 8,461,443 | B2 | 6/2013 | McKinney et al. | |
| 8,502,826 | B2 | 8/2013 | Adhikari et al. | |
| 9,324,377 | B2 | 4/2016 | Woodman | |
| 10,032,447 | B1 | 7/2018 | Kochanczyk | |
| 10,440,071 | B2 | 10/2019 | Louchheim et al. | |
| 10,978,033 | B2 * | 4/2021 | Lathrop | G10G 1/02 |
| 2004/0264917 | A1 | 12/2004 | Braun et al. | |
| 2006/0156906 | A1 | 7/2006 | Haeker | |
| 2007/0044642 | A1 | 3/2007 | Schierle | |
| 2007/0071413 | A1 | 3/2007 | Takahashi et al. | |
| 2010/0208631 | A1 * | 8/2010 | Zhang | H04R 25/70 370/297 |
| 2012/0124473 | A1 | 5/2012 | Kim et al. | |
| 2013/0108994 | A1 * | 5/2013 | Srinivasa | G06F 40/44 434/156 |
| 2015/0319546 | A1 * | 11/2015 | Sprague | H04R 1/1066 381/312 |
| 2016/0133151 | A1 * | 5/2016 | O'Dowd | G06F 3/011 434/236 |
| 2016/0358595 | A1 | 12/2016 | Sung et al. | |

FOREIGN PATENT DOCUMENTS

| | | | |
|---|---|---|---|
| EP | 1089254 | B1 | 11/2011 |
| JP | 2005209000 | A * | 8/2005 |

* cited by examiner

*122*

| | Note 1 | | Note 2 | | • | • | • | Note 19 | | Note 20 | |
|---|---|---|---|---|---|---|---|---|---|---|---|
| Pitch | Ampl. | LIV | Ampl. | LIV | | | | Ampl. | LIV | Ampl. | LIV |
| 97 | | | | | | | | | | | |
| 96 | | | | | | | | | | | |
| • | | | | | | | | | | | |
| • | | | | | | | | | | | |
| • | | | | | | | | | | | |
| 2 | | | | | | | | | | | |
| 1 | | | | | | | | | | | |
| Pitches of notes not matching standard 97 pitches | | | | | | | | | | | |
| x | | | | | | | | | | | |
| y | | | | | | | | | | | |
| z | | | | | | | | | | | |
| s | | | | | | | | | | | |
| t | | | | | | | | | | | |
| u | | | | | | | | | | | |

FIG. 4

| #[1] | Psychoacoustic Attribute (Cue) | Metric |
|---|---|---|
| Overall Scores, one score for the frame | | |
| 11 | Chord, Overall Chord | label |
| 15 | Sum all Amplitudes | db |
| 16 | Chord Progression | label |
| 17 | Affect | label and/or score |
| 18 | Tension/Release | score |
| 19 | Ambience | label and/or score |
| For each identified note in the frame | | |
| 2 | Begin, Ongoing, End | label |
| 3 | Pitch | pitch |
| 4 | Amplitude of a note, w decay | db |
| 5 | Timbre | label |
| 6 | N-Instrument (e.g. 10 violins) | flag and/or score |
| 7 | Sibilance | flag and/or score |
| 8 | Attack of note, strum or chord | flag and/or score |
| 9 | Strum | flag and/or score |
| 10 | Melody, Harmony, Percus. Line | label |

Intervals between up to 40 current notes in the frame, 39 other current notes in the frame, and 40 previous notes.

| 40 Current Notes: | Current Note 1 | | | Current Note 2 | | | etc. | Current Note 40 | | |
|---|---|---|---|---|---|---|---|---|---|---|
| = 120 columns: | interval | amplitude | timbre | interval | amplitude | timbre | | interval | amplitude | timbre |
| Other Current Note 1 | 12 | 4 | 5 | 12 | 4 | 5 | | 12 | 4 | 5 |
| Other Current Note 2 | 12 | 4 | 5 | 12 | 4 | 5 | | 12 | 4 | 5 |
| etc. | 12 | 4 | 5 | 12 | 4 | 5 | | 12 | 4 | 5 |
| Other Current Note 39 | 12 | 4 | 5 | 12 | 4 | 5 | | 12 | 4 | 5 |
| Previous Note 1 | 13, 14 | 4 | 5 | 13, 14 | 4 | 5 | | 13, 14 | 4 | 5 |
| Previous Note 2 | 13, 14 | 4 | 5 | 13, 14 | 4 | 5 | | 13, 14 | 4 | 5 |
| etc. | 13, 14 | 4 | 5 | 13, 14 | 4 | 5 | | 13, 14 | 4 | 5 |
| Previous Note 40 | 13, 14 | 4 | 5 | 13, 14 | 4 | 5 | | 13, 14 | 4 | 5 |

[1] These cue numbers, and the numbers in the last 8 rows, correspond to the circled numbers in Figure 10 of the patent application.

FIG. 9

MAPPING CHARACTERISTICS OF MUSIC INTO A VISUAL DISPLAY

CLAIM OF PRIORITY

This application is a continuation of U.S. utility application Ser. No. 16/074,077, filed Jul. 30, 2018, which application claims the benefit of priority under 35 U.S.C. § 119(e) to U.S. provisional application Ser. No. 62/292,193, filed Feb. 5, 2016, which is incorporated herein by reference in its entirety.

TECHNICAL FIELD

The technology described herein generally relates to the visualization of music, such as the translation, or mapping, of music into a corresponding visual form that can be displayed on a screen, and more particularly to visualization that incorporates psychoacoustic effects.

BACKGROUND

Music is a rich and varied artform: the mere divisions of musical structure into broad categories of melody, rhythm and harmony does not do justice to the full complexity of the musical experience. Such broad categories are overly simplistic as a way to explain and capture a person's reactions and impressions when listening to a piece of music.

Consequently, there have been many attempts to reinforce the effects of a piece of music on a listener by deriving a visual accompaniment. A person's sight and hearing are the two primary senses for appreciating artistic creations. However, while it is not difficult to embellish a person's experience of a visual event by adding musical accompaniment and there are many ways to do that, the opposite—to positively augment a listener's experience of music by adding effective imagery has posed challenges.

Many techniques have been developed to accomplish visual renditions of music. Most music visualization systems are based on the division of an audio signal into certain of its constituent frequency bands, followed by the translation of the information from those frequency bands into a visualizable form. The earliest attempts to do this were very simple, and converted music into arrays of colored lights, where the colors of the lights correlated with various frequencies in the music and the lights were turned on and off as and when the frequencies were heard. Examples of such approaches are described in U.S. Pat. No. 1,790,903 to Craig, U.S. Pat. No. 3,851,332 to Dougherty, U.S. Pat. No. 4,928,568 to Snavely, and U.S. Pat. No. 3,228,278 to Wortman. Ultimately, such devices—which were often referred to as "color organs" (a now generally accepted term for a device that represents sound and/or accompanies music in a visual medium)—could not adequately represent the full texture of a piece of music.

Attempts were made to capture other aspects of musical form such as variations in amplitude, as well as to attempt a more continuously variable display than was possible with discrete lights. For example: U.S. Pat. No. 4,645,319 to Fekete describes a system in which projectors driven by a color organ reflect the spectral content of an audio source; U.S. Pat. No. 3,241,419 to Gracey describes processing of audio frequency signals to produce an undulating light image pattern on a display; U.S. Pat. No. 3,806,873 to Brady relates to an audio-to-video translating system that includes a time shift feature allowing visual representation of audio signal duration; U.S. Pat. No. 4,614,942 to Molinaro describes a visual sound device in which amplitude variations within an audio signal are translated into a varying visual amplitude output on a display; U.S. Pat. No. 4,394,656 to Goettsche describes a real-time light-modulated sound display in which the audio signal spectrum is visually displayed according to the discrete frequency bands in the spectrum; and U.S. Pat. No. 4,440,059 to Hunter, which describes a color organ employing a system of voltage-controlled oscillators to selectively illuminate LED lights along a pair of orthogonal axes;

One of the first attempts to visualize music electronically is described in U.S. Pat. No. 4,081,829 to Brown, which presents an apparatus that connects an audio source to a color television and provides a visual representation of the audio signal on the television screen. The representation was dynamic insofar as the image on the display varies with respect to shape, color, and luminance, depending on various characteristics of the audio signal processed.

Music visualization was revolutionized in the early 1980's when personal computers became widespread and a file format, the MIDI file, was developed that allowed musical data to be easily shared between electronic devices. The MIDI file allows the depiction of the various notes played by the various elements of an ensemble as parallel streams on a display. More recently, over the last 20 years, increasingly complicated music visualization software has been developed. Examples include, Cthugha (1993, Kevin Burfitt), Advanced Visualization Studio (2000, Justin Frankel), G-Force (2000, SoundSpectrum), OMX Music Visualization (see U.S. Pat. App. Pub. No. 2011/0213477), MIDI Trail (http://www.softpedia.com/get/Multimedia/Audio/Audio-Players/MIDITrail.shtml) and MusicAnimation Machine (e.g., *Knowledge-Based Intelligent Information and Engineering Systems:* 11th International Conference, K E S 2007, Vietri sul Mare, Italy, Sep. 12-14, 2007, Proceedings. Springer. 2007. p. 292.). See also Ox, J. "Two Performances in the 21st Century Virtual Color Organ," in the Proceedings of the 4th Conference on Creativity and Cognition, ACM, New York, N.Y., pp. 20-24 (2002). With the advantages conferred by a digital format, it has been possible to extend the aspects of a piece of music that can be depicted visually from merely the individual frequencies to amplitudes, timbre (including identification of particular instruments), and durations of notes.

However, the rigidity of the MIDI file format has actually had the effect of causing its adherents to look at visualization from a very linear perspective, one dictated by the structure of the format rather than on the overall musical form it represents. Furthermore, there are special aspects of music, e.g., guitar and banjo strums, that are not adequately represented in the MIDI format. In such a paradigm, music is to be described solely in terms captured by the industry standard in computer music rendition, i.e., notes, and each note's pitch and time extent, and a tag on each note to indicate its timbre. While offering some portability and flexibility of adaptation—e.g., one person can take another's MIDI file and alter the timbre attributes of given notes to change the feel of the music, more fundamental aspects of musical appreciation are not so susceptible to adaptation or representation. For example, while it is possible to display two different colored symbols to correspond respectively to two different notes played at the same time, the real source of human appreciation comes from the unique sound of the interval—or more generally a chord—not the individual separable notes of which it is made.

Other schemes add an artistic component to the visual depiction, such as animation. For example, U.S. Pat. No.

7,589,727 to Haeker describes a system and device for generating moving images representing various aspects of a musical performance. That system is focused on overall musical phrasing and structure, and a musical "artist" uses animation software to interpret the overall architecture of a musical piece and convert it into a "3D" representation that is then portrayed in two dimensions on a display. U.S. Pat. No. 6,898,759 to Terada describes a computer graphics motion image generator to move objects such as dancers on a visual display, in time with music such as that embedded in a MIDI file. Similarly, U.S. Pat. No. 7,601,904 to Dreyfuss, describes forms such as birds that are animated in accompaniment to music. U.S. Pat. No. 8,502,826 to Adhikari et al. pertains to a system that enables visualization of music on a television platform or set-top box. Other references pertaining to various aspects of music visualization include U.S. Pat. No. 8,461,443 to McKinney, which generates ambient light effects according to musical content.

Nevertheless, simply augmenting a piece of music—as heard—with a creative visual accompaniment does not necessarily tie in directly with the rich complexity of the music itself or augment the listener's experience. Human perception of music is affected by rich and complex aspects of musical form. None of the foregoing methods can adequately capture the sum total of the aspects of music that a human perceives, and augment the listening experience with a rich visual representation that is tied to the full dimensionality of the musical form. Psychoacoustics is the study of sound perception: that is it marries quantifiable aspects of sounds (such as pitch, amplitude, timbre) with the human perception of that sound.

Accordingly, there is a need for a method of augmenting a listener's psychoacoustic experience of a piece of music by producing an accompanying visual representation that faithfully corresponds to the full complexity of the music.

The discussion of the background herein is included to explain the context of the technology. This is not to be taken as an admission that any of the material referred to was published, known, or part of the common general knowledge as at the priority date of any of the claims found appended hereto.

Throughout the description and claims of the application the word "comprise" and variations thereof, such as "comprising" and "comprises", is not intended to exclude other additives, components, integers or steps.

SUMMARY

Prior methods for the translation of music into a visual format are limited in many key respects; the present invention addresses these limitations. The invention provides enhanced musical enjoyment for the normal hearing person, and also enables the hearing-impaired to enjoy music in a way they have not been able to until now.

The technology of the present invention is implemented as instructions executed by a computing device in conjunction with a visual display, and may be referred to herein variously as a system or a device, or as the method carried out on the system or device. The device may also be referred to as a psychoacoustic color organ.

The method and system of the invention involve use of a processor to convert a music source file into a visual format on a display device. The processor is in electronic communication with the selected visual display, and, in most cases, is also in electronic communication with a user interface. The processor may be within a stand-alone computer system or other consumer electronic device, or it may be a stand-alone module that receives the input music source file and feeds into the selected display device.

The device provides images on a visual display synchronized to music, in order to enhance a listener's perception and enjoyment of that music. In overview, the device extracts audio cues, such as chords, intervals, and other features as described herein, from the music wherein the features are tailored to a listener's perception of the music, maps those cues one-by-one, to visual cues, and then displays those visual cues in a time streaming display synchronized to the music, so that a listener can view the display while listening to the music, thereby enhancing their perception of the music.

In one aspect of the invention, then, a method is provided for visualizing music method of presenting a visualization of a piece of music on a display screen as the music is being played, the method comprising: establishing a mapping system, by selecting a number of audio cues from a set of audio cues, wherein each audio cue represents a distinct acoustic element of the piece of music, and the number of audio cues is optimized with respect to the complexity of the piece of music and the size and the resolution of the display screen, and wherein the audio cues comprise at least one cue selected from: a group of simultaneously played notes (chords), intervals, note sequences and transitional notes; and assigning a different visual cue to represent each selected audio cue in a manner that provides one-to-one correspondence between each selected audio cue and each visual cue; extracting the selected audio cues from the piece of music as it is being played, and converting the extracted audio cues to the corresponding visual cues in the mapping system; and displaying the visual cues on the display screen as the piece of music is being played, so that one or more persons sees the corresponding visual cues at the same time that they hear the piece of music.

In a further aspect the technology comprises, a music visualization system comprising: a music source; a display screen; a memory; and a processor, wherein the processor is configured to execute instructions stored in the memory, and wherein the instructions comprise instructions for: establishing a mapping system, by: selecting a number of audio cues from a set of audio cues, wherein each audio cue represents a distinct acoustic element of the piece of music, and the number of audio cues is optimized with respect to the complexity of the piece of music and the size and the resolution of the display screen, and wherein the audio cues comprise at least one cue selected from: a group of simultaneously played notes (chords), intervals, note sequences and transitional notes; and assigning a different visual cue to represent each selected audio cue in a manner that provides one-to-one correspondence between each selected audio cue and each visual cue; extracting the selected audio cues from the piece of music as it is being played, and converting the extracted audio cues to the corresponding visual cues in the mapping system; and displaying the visual cues on the display screen as the piece of music is being played, so that one or more persons sees the corresponding visual cues at the same time that they hear the piece of music.

In a still further aspect, the technology comprises a computer readable medium encoded with instructions for visualizing a piece of music on a display screen as the music is being played, wherein the instructions comprise instructions for: establishing a mapping system, by: selecting a number of audio cues from a set of audio cues, wherein each audio cue represents a distinct acoustic element of the piece of music, and the number of audio cues is optimized with respect to the complexity of the piece of music and the size and the resolution of the display screen, and wherein the audio cues comprise at least one cue selected from: a group of simultaneously played notes (chords), intervals, note sequences and transitional notes; and assigning a different visual cue to represent each selected audio cue in a manner that provides one-to-one correspondence between each selected audio cue and each visual cue; extracting the selected audio cues from the piece of music as it is being played, and converting the extracted audio cues to the corresponding visual cues in the mapping system; and displaying the visual cues on the display screen as the piece of music is being played, so that one or more persons sees the corresponding visual cues at the same time that they hear the piece of music.

The technology brings together aspects of human musical perception, music enjoyment, music markets, instruments, musical scores, societal conventions, and societal musical development at many levels. This technology implements the principle of perceptually conformal mapping in translating music from the auditory domain to the visual domain in order to create a dual-mode experience of music enjoyment, with one-to-one correspondence at the perceptual level.

A principal benefit provided by the technology is a radical enhancement of music enjoyment, appreciation and perception. This is achieved via cue-to-cue mapping that increases a person's bandwidth to two perceptual modes that are synergistically cross referenced.

Features of the technology include: mapping from music audio cues to visual cues, cue to cue, at a perceptually conformal level; mapping as many of those cues as most effectively visually depicts the music, adjusted according to bandwidth management of the finite visual perceptual bandwidth of the display.

Displaying those cues in a perceptually conformal manner provides a perceptual synergy that is more effective than the sum of the impressions of the cues considered separately. The display is adaptive, which means that the technology can monitor and adjust the display as the music varies in complexity, or can provide a consumer with options to control adjustments on the display. Alternately, the technology provides a producer-adjustable display so that music producers and concert organizers can generate a "PACO Track" (a saved visual display from a given piece of music and PACO means "psychoacoustic color organ") that can be played and replayed.

The technology can be developed with a suite of as few standardized mappings as are effective, to enhance consumer learning and consumer ability to make use of displays mapped from audio to visual at a high level of information and detail. Yet also the technology is capable of applying a very large set of alternative mapping systems, to provide highly compelling displays tuned specially to each piece of music.

The fact that there is a structured, systematically developed set of visual cue vocabularies means that the technology is versatile and adaptable and applicable to any form of music, regardless of genre, and including sound sources such as mechanical sounds that humans would not necessarily categorize as music. The fact that the technology is equipped with applications of machine learning and Bayesian inference to improve pattern recognition, and to improve the ability of the device and the user to select the most effective mapping means that the technology can continually improve.

Other musical uses of the technology include rehearsal aids for performers, music training aids, a system for taxonomizing musical pieces, such as for search and retrieval from digital repositories, and providing a platform for psychoacoustic research.

Additional objects, advantages, aspects, and novel features of the invention will be set forth in part in the description which follows, and in part will become apparent to those skilled in the art upon reading the following, or may be learned by practice of the invention.

BRIEF DESCRIPTION OF THE DRAWINGS

FIG. 4 provides a representative format for a PAL table.

FIG. 9 provides a representative format for a PAF, generated for each time segment by Stage 2.

Like reference symbols in the various drawings indicate like elements.

DETAILED DESCRIPTION

Figure 1:
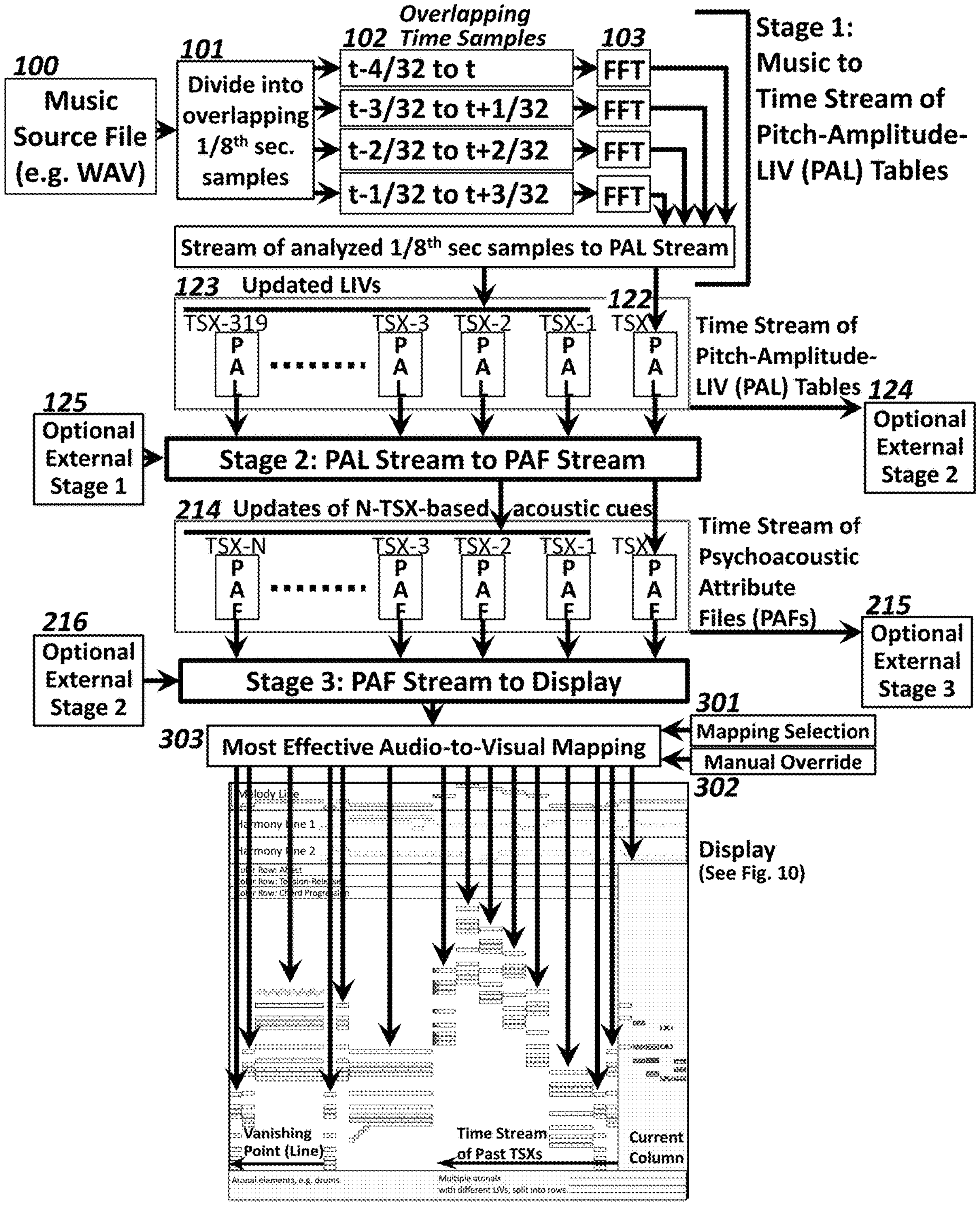
FIG. 1 is a flow chart illustrating three stages involved in the conversion of a music source file to a corresponding dynamic visual representation of the music, as further described herein.

The instant technology is directed to the visualization of music, such as the translation, or mapping, of music into a corresponding visual form that can be displayed on a screen. The technology enables synchronization of an audio signal with a video display such that a person, or group of persons, hears a segment of music and perceives the visualization of that music simultaneously. The invention supplements the information processing tasks that the human perceptual system carries out as a person listens to music.

The device starts by extracting audio cues from musical data, such as a music source file. Such cues may include the same cues as can be routinely extracted from files in the MIDI format, but also include other, more important, cues that are fundamental to music appreciation. Those other cues include: chords, structural aspects, amplitude and timbre, unique characteristics of particular instruments, and note modifiers such as tremolo.

Music perception and appreciation are based primarily on the intervals between notes, (such as a third, a fifth, etc., in particular chords), intervals, the intervals between notes in note sequences, and the intervals between transitional notes and preceding, concurrent and following chords. For example, if a musical piece is shifted up in pitch by, e.g., a third, the music will sound almost completely the same, even though every frequency is then different from the original rendition. Also, even though the intervals can be read off a vertical dimension of a display where the difference in vertical distance between, e.g., a third and a fourth on a plot from a MIDI file appears to be quite small, in fact the intervals a third versus a fourth sound quite different and lend a different character to the music.

There are structural aspects to many, if not most, musical pieces that are central to the perception and appreciation of that musical piece. The primary structural aspects are melody, harmony, and percussion lines. Other structural aspects are chord progressions, tension, affect, ambience and overall volume.

As used herein, the term "effective" is such that the listener experiences music with greater enjoyment, and will seek out the use of the device to increase his/her enjoyment of music. The mapping of music to a visual display is effective if it is such that the visual display seems to the user to represent the music visually, at a psychophysical level, and encourages a synesthetic experience, such that the user will seem to "hear" the music through the visual display. Furthermore, the mapping is effective if, after a user has heard and seen the combined music-visual-display for a particular piece of music several times, if (s)he plays that musical piece another time with the sound muted, (s)he "hears" the music in his/her head by simply viewing the visual display without the accompanying sound. The mapping is also considered effective if an experienced user can identify many aspects of a piece of music by simply viewing the visual display with the sound muted, even a piece of music (s)he has not heard before. While that definition does not provide the basis for a directly measurable objective metric of performance, the device includes a many-parameter mapping system, from which an effective mapping can be selected, as further described herein. Six aspects, as outlined in Appendix A, of each specific implementation of the device affect which mappings will be effective for that implementation.

To summarize the rationale underlying the present technology, it must be emphasized that a person enjoys music at any of several different levels, and that musical pieces vary over a vast range of richness, from a solo a cape/la singer, to two singers accompanied by four instruments such as in a rock-band, to a symphonic piece. The music of a solo singer and a symphony are composed, performed, perceived and enjoyed in extremely different ways, yet they both use the same "language" of music, i.e., the same notes, intervals, chords, and rhythms. The technology herein provides a method and system for translating music that is heard into a visually perceived version seen on a display screen, and can accomplish this regardless of the type of music or its complexity. The translation from the auditory to the visual is done in a manner that is perceptually conformal, so that the visual version of the music very closely tracks the music that is heard at a perceptual level, essentially "mapping" the key acoustic elements or "cues" of the music into the visual translation in a perceptually effective and naturally compelling way. The term "audio cue" as used herein will be taken to mean an acoustic element that has psychoacoustic significance, in particular here, significance for the perception and appreciation of music.

While other music visualization techniques involve visualization of some psychoacoustic cues, such as pitch and time duration of a note, the present invention uses many more psychoacoustic cues, mapped in a perceptually conformal manner, to provide a listener with an enriched perceptual experience.

In contrast to prior methods of translating music into a visual format, the technology maps from an auditory domain to a visual domain at a psychoacoustic level, thereby providing one-to-one correspondence between each audio (or psychoacoustic) cue and each visual cue, in particular between each audio cue selected for mapping into the visual domain and the corresponding visual cue. For example, psychoacoustic cues audio pitch and amplitude each translate to a respective corresponding single visual cue.

The term "audio cue" is used herein to refer to a single auditory attribute of a musical sound or piece, while the term "visual cue" is used to refer to the corresponding attribute as presented visually on a display screen. The number of audio cues selected for mapping into the visual domain is optimized to enhance a listener's overall musical enjoyment, and may vary depending on the genre of the music and other factors.

The audio cues of interest are termed "psychoacoustic" cues, herein, insofar as the audio cues selected for mapping are those that are generally accepted as significant to a person's perception or appreciation of music. On the one hand those cues can be scientifically quantified (such as defined, measured, and identified and/or isolated from a piece of music), and on the other hand they map on to aspects of a listener's perception of the piece of music that are both intelligible and widely appreciated. The visualized version, created using those key psychoacoustic cues, thus provides a visual sensory experience that is perceptually analogous to the music that is heard.

By using a suitable mapping to translate the acoustic experience into the visual realm, a user of the system experiences music acoustically and visually in the same way, at the same time. Mappings are described elsewhere herein.

In still another aspect of the invention, a music visualization method as characterized above is provided wherein the perceptually conformal mapping system involves representation of a time sequence of selected audio cues as a time-streaming sequence of corresponding visual cues on the visual display.

The device includes modules that perform each basic operation described herein (extract audio music perception cues, map those, cue-to-cue, to visual cues, then display those visual cues in a time streaming display synchronized to the music, such that it is effective). A key aspect of those operations is an extensive list of mappings, any of which can be selected to be applied. Which mapping is to be applied is a function of aspects of each specific implementation.

Definitions and Overview

In this specification and the appended claims, the singular forms "a", "an" and "the" include plural referents unless the context clearly dictates otherwise. Thus, for example, "a note" refers not only to a single note but also to a combination of two or more notes occurring simultaneously or sequentially. The term "group" as used herein refers to a combination of two or more members of the objects referenced.

The term "listener" as used herein means a person capable of both hearing a piece of music and viewing a visual display of images that accompany the piece of music and are produced by the methods herein. The terms listener, user, person, and consumer, may be used interchangeably herein. Such terms further include persons who may suffer from impairments to hearing or vision, but for whom the combined experience of listening to a piece of music while visualizing the display of images that accompany it, leads to an enhanced appreciation of that music.

The term "note" as used herein refers to a musical sound, i.e., to a sound that occurs in a piece of music, for example as is represented in a musical score. A "note" can be either a musical tone such as a note played by an instrument or sung by a human voice, or a percussive sound as may be associated with the playing of a drum or other percussive instrument. Each audio cue herein characterizes a single note, a group of simultaneously sounded notes (such as chords), a time series of individual notes, or a time series of groups of simultaneously sounded notes (such as a chord progression), or a time series that includes groups of notes as well as individual notes adjacent in time and/or interspersed with one another.

The term "time series of groups of notes" refers to a musical phrase, two or more musical phrases in succession, or to the entirety of a musical piece. It is to be understood that such a time series may include both groups of notes as well as individual notes.

As is understood in the art, the term "pitch" refers to the frequency of the note. A listener perceives a higher frequency as corresponding to a higher pitch and a lower frequency as corresponding to a lower pitch. The pitch serves as an audio cue (one of many such) for mapping into the visual domain, as is further described herein.

The term "interval" is the interval between two pitches and is determined by the ratio of frequencies associated with the pitch of each note. The interval may be between two simultaneously sounded notes or between two successively sounding notes.

The term "chord" refers to a group of simultaneously heard notes, i.e., to a combination of three or more notes sounded simultaneously, where the term "simultaneously" refers to three or more notes that have the same time of onset and the same duration as each other, as well as to three or more notes that occur almost simultaneously, i.e., having approximately the same time of onset and/or duration, or overlapping in time so that the notes are heard simultaneously, although not necessarily heard in their entireties simultaneously. In the latter case, for instance, a note C and a note E may be initially played simultaneously, with a G added a fraction of a second later, such that beginning with the sounding of the G, the chord will be heard as a C major chord with the notes heard simultaneously.

The term "synchronized" refers to the condition of operation of the technology where the occurrence of any audio cue, e.g., a note, in the audio signal is mapped into the appearance of the corresponding visual cue on the visual display coordinated in time, i.e., where those two events appear in time such that there is no noticeable difference in the times each appears to the viewer/listener. That is, as a result of the synchronized manner in which the method and system of the invention operate, the consumer perceives the music heard and the corresponding visualization simultaneously.

The term "real time" refers to the processing of an audio signal sufficiently rapidly to keep pace with the signal as it arrives in a time-streaming context.

The technology enables the mapping of music from the auditory domain to the visual domain at the perceptual level of musical perception and appreciation, and provides one-to-one correspondence between each audio cue and each visual cue at the perceptual level, i.e., one-to-one correspondence is provided between each audio cue selected for mapping into the visual domain and the visual cue that corresponds to the selected audio cue. Furthermore, the number of audio cues selected to be mapped into the visual domain is optimized to enhance music enjoyment. Mapping too few audio cues may result in a compromised visual experience, with key aspects of the music effectively missing from the visual experience, while mapping too many audio cues may result in a visually overwhelming experience. The method involves establishment and/or use of a "perceptually conformal" mapping system as further described herein.

Thus, in preferred embodiments, audio cues are selected from a set of 22 such cues. The 22 cues are not necessarily exhaustive, and may not be mutually exclusive of one another in that there are some interactions, e.g., chord progression, tension and affect, that depend on one another. Nevertheless, the 22 cues are an adequate basis for generating a visual display that is effective.

Psychoacoustic Cues

An audio cue is a single auditory attribute of a note, a chord, a time series of notes, a time series of chords, or a time series of two or more groups of notes or chords, as explained elsewhere herein. The audio cues of interest for the purpose of the present technology are those that are significant to a person's perception, appreciation or enjoyment of music, and are termed "psychoacoustic" herein. Psychoacoustic cues as used herein have the additional property that they can be extracted from musical data by a suitably programmed computer.

Other features of musical sound that are not directly meaningful for musical perception and/or music appreciation (e.g., the exact shape of the overall music signal in terms of amplitude versus time) are not relevant herein. It is therefore to be understood that when the term "audio cue" is used herein, a psychoacoustic cue is meant.

Psychoacoustic cues include, for instance, a note, pitch, amplitude, timbre (which characterizes a musical sound as originating from a particular instrument or voice), multiple instruments playing the same note (multiple of the same instruments, multiple across different instruments), sibilance, attack of a note, strum or chord, strum, melody line, harmony line, percussion line, vibrato, tremolo, glissando, pitch intervals for simultaneous and successive notes, chords, rhythm, time profile of each note (i.e., time of onset, duration, time of ending, and amplitude decay), overall volume, affect (somber, cheerful, etc.), tension profile, chord progression, and ambience.

The number of audio cues should be selected to optimize music enjoyment, and, as noted elsewhere herein, may vary by genre. Typically, the number of psychoacoustic cues mapped into the visual domain is in the range of at least 5 and up to about 22, and preferably in the range of about 6 to 20, and most preferably is in the range of about 10 to 18, and—as described elsewhere herein—always includes at least one cue related to chords, intervals, intervals between consecutive notes, or chord progressions. While most prior efforts in visualizing music used only a few audio cues, there has been some attempt to use more but without necessarily generating a display that augments a listener's experience. In contrast, however, the present invention involves at least one cue related to chords intervals, or chord progressions, and further involves optimization of the number of audio cues to provide an effective music visualization experience.

Psychoacoustic cues that may be selected for mapping include, without limitation, cues selected from any one or more of the following categories.

Characteristics of an individual note: Time of note onset and ending; pitch; amplitude; timbre, i.e., instrument or voice (based on relative amplitude of each overtone in each overtone series); N-instrument, i.e., identification that there is a single instrument or voice or multiple identical instruments or voices (e.g., a 20-instrument violin section, as opposed to a single violin); sibilance; atonal element (e.g., drum); drum-type timbre; tremolo (frequency fluctuation); attack; vibrato.

Characteristics of a set of concurrent notes: Interval between two notes; chord comprising three or more notes; major or minor chord.

Characteristics of a time series of individual notes: Interval between a note and the previous note corresponding to that note in a musical line; transitional note between two chords, arpeggio, strum (e.g., a banjo or guitar strum); glissando; melody; and harmony lines.

Characteristics of a time series of one or more groups of notes, including a musical phrase, two or more successive musical phrases, or an entire musical piece: Overall volume and dynamics; chord progression; affect (i.e., somber, cheerful, grand, and the like); tension (involving distance from tonic and motion relative to tonic); and ambience. It will be appreciated that some of these characteristics relate to what would commonly be referred to as characteristics of "musical structure."

Psychoacoustic cues can also—and alternatively—be grouped into categories according to how complex they are to extract from musical data. Thus, cues that can be programmed by a computer to identify include: note, time extent, pitch, amplitude, timbre, N-instrument, sibilance, strum, chord, interval, note sequence, transitional note, overall volume, vibrato, tremolo, and glissando. A directly observable cue that requires some ingenuity to identify and to generate a visual interpretation based on it is "attack". Other cues that require more effort to identify and to translate into visual interpretations include: melody, harmony, chord progression, affect, tension, and ambience.

Additionally, the psychoacoustic cues herein can be conveniently divided into several categories. Three basic audio cues (note, time extent, and pitch) can be considered fundamental and are likely to be present in most mappings. Additionally, vibrato and glissando where present in the music may also be present in most mappings. The device can depict amplitude and timbre more clearly than other visualizations. In particular it can depict amplitude in a continuously ordinal way, even to the metric of logarithmic to physical amplitude, and it can depict timbre with timbre labels or icons and even more clearly by dividing notes into, e.g., horizontal bands on the display by timbre (in the case of horizontal time streaming). There are some 15 other psychoacoustic cues described herein, that can be mapped in a way that increase the effectiveness of the device quite significantly, subject to bandwidth considerations. They are:

1. Chords, Intervals, Note Sequences, Transitional Notes.
2. Melody-Harmony-Percussion Lines (especially multi-band version).
3. Amplitude, Timbre (especially multi-band version).
4. Chord Progressions, Tension, Affect, Ambience, Overall Volume.
5. Note Sequences: Strum
6. Note Modifiers: N-Instrument, Sibilance, Attack.
7. Enhancement on amplitude cue: Tremolo.

It is to be understood that while the primary focus of the description herein is music loosely termed "Western music" that relies on major and minor keys, a 12-note chromatic scale, and notes that are a semi-tone apart from one another, there is no reason why the principles and implementation cannot be extended to other musical forms such as based on quarter tones.

Bandwidth Considerations

The term "bandwidth," abbreviated BW, is used informally herein to mean an indication of usable information per second. Human appreciation of music, as normally perceived, is limited by the BW of audio perception. The device enhances human music appreciation by increasing the perceptual BW by adding a second channel of perception, visual perception. The visual display, in providing a spatial display that is on perceptual dimensions different from the audio BW, effectively enhances human music appreciation. That is, the device adds to effective perceptual BW by employing two different perceptual processes, each based on different perceptual dimensions, that combine in overall perception. In addition, music appreciation involves a process of social-cultural associations. Those associations can be enhanced by increasing the number of perceptual dimensions, giving more possible "ties" to those associations.

But there is another important feature of the device related to bandwidth: the audio-visual mapping can be adjusted to make the best use of the visual perceptual bandwidth, in a process we call "bandwidth management." That is, the device is designed to exploit the fact that the audio-visual cue-to-cue mapping can be adjusted or selected to maximize the use of the visual bandwidth. As is described elsewhere herein, there are several ways to map the music into the visual display, and each way can make the most of that visual display for the given source of music and all other aspects described herein. For example, a solo singer can be displayed with a great deal of detail about all aspects of each note of that solo, while the fourth movement of Beethoven's Ninth Symphony, (which entails by some counting, 21 instrument types and voices performing 37 parts, with in some cases well over 100 performers), calls for a more cue-summarizing display. Those differences reflect the fact that those two extremes of music are perceived and appreciated in quite different ways, in part reflecting the audio perceptual system performing its own BW management. If the device visually displayed the Beethoven at the same detail as the solo singer, the display would be ineffectively complex. While that would provide an extreme case of a bits-per-second concept of BW, in fact the viewer could be overwhelmed by the display, such that the effective perceptual BW would be small. What may be lost in this discussion is an exciting fact: The device allows us to not only increase the perceptual BW of music appreciation through adding the visual perceptual process, it allows us to maximize that BW by adjusting the visual display in ways designed to optimize the use of that display, in a process of BW management.

Visual Cues

Examples of visual characteristics that may serve as visual cues herein include, without limitation: use of a particular shape as a visual cue, such as a square, rectangle, circle, diamond, triangle, "roundtangle" (a rectangle with rounded corners) to represent a selected audio cue, e.g., a note, or using a particular icon such as a mouth, guitar or other instrument, to represent timbre; size of the shape; color, pattern or texture of the shape or of parts of the shape; spacing between any two shapes; brightness; iridescence; flickering or shimmering of a visual cue; positioning on a vertical (y) axis (with positioning on the horizontal [x] axis generally representing the time stream of the music) or position on any axis or line on the display; fluctuating brightness represented on that axis; presence or absence of a border on a shape; border appearance (e.g., selection of color, sharp versus blurred, thickness, dashed vs. solid, etc.); interior appearance, including color, brightness, intensity, etc.; presence or absence of an interior pattern or design (dots, stripes, plaids, etc.); single versus multiple cues on a single vertical axis (e.g., as may indicate a single note or a chord, respectively); color intensity (saturation) of a cue; color lightness or darkness; presence or absence of connecting lines, bands or regions between cues; appearance of any such connecting lines, bands of regions with respect to curvature, color, thickness, etc.; presence or absence of columns and columns dividing sections of music, e.g., by timbre or melody-harmony-percussion lines; presence or absence of horizontal bands dividing sections of the music, again e.g., by timbre or melody-harmony-percussion lines, the width of any such columns, subcolumns, and horizontal bands; color, patterns or textures in horizontal bars at the top or bottom of the display, those colors, patterns or textures depicting characteristics of musical phrases such as chord progression, affect and tension, aligned or not in time and/or pitch with the notes having those characteristics; background color and color changes, with color and color intensity optionally varying spatially on a display, and/or with time; and blending or distinctness of two or more visual cues. For any of the listed cues involving color, that color can vary in hue, saturation, iridescence or shimmer. Any of the listed cues can include a gradient over whatever spatial extent is involved. Any of the listed cues can characterize a region of the display, including a frame around the display or around a part of the display. Any of the listed cues can be varied ordinally to indicate an ordinal variation in the audio cue being represented; that ordinal variation can vary as a monotonic, linear, ratio or logarithmic function of the ordinal variation in the represented audio cue; where appropriate that visual cue ordinal variation can be scaled to the magnitude of the effect in the represented audio cue. A single visual cue may also contain two or more component parts, such as a note icon and a visual cue modifying that note icon, e.g., an instrument symbol within, attached to, or adjacent to the note icon. Appendix B presents a visual cue vocabulary for each audio cue considered here, i.e., listed in the following.

Visual cues for the following audio cues are of particular importance in the context of the present technology: a note, which can be characterized by any of the audio cues listed as follows: pitch; amplitude; time of note onset; note duration; pitch interval between at least two simultaneously played notes, thus including both interval and chord; pitch interval between a note and a previous note; extending that to an arpeggio; different singers and/or instruments as represented by timbre; the number of a particular instrument or the number of particular voices creating a given note; extending that to numbers of different instruments and/or voices creating a given note; sibilance; attack and decay of a note, strum or chord; strum; melody versus harmony versus percussion line; transitional note; overall volume of a musical piece; chord progression; affect; tension; ambience; vibrato; tremolo; and glissando. Appendix B describes each of those audio cues in further detail.

Time streaming is one aspect of the consumer's sense of perceptual conformality, insofar as in time streaming, note icons appearing at one or more points and/or lines on the display stream until they vanish at one or more points or lines on the display. That is perceptually conformal with the consumer's audio experience, where a note appears at a particular point in time, the current time, then persists in his/her memory over some period of time moving on through that period of time, then vanishes from his immediate memory.

Visual cues may also include text corresponding to the lyrics of a song, either determined by the system or, more typically, provided as part of the music source file. In some instances lyrics can be ascertained from vocal music using commercially available speech recognition software.

The amplitude and timbre of each note are central to music appreciation, and so should be depicted as directly, clearly and completely as possible.

There are note modifiers that are quite important to music appreciation that should be depicted, while they are not depicted in typical MIDI formats. Those modifiers include attack, sibilance, multiple instruments playing the same note, and tremolo.

It must be emphasized that the foregoing audio cues and visual cues are for purposes of illustration, and those described herein are not intended to be an exhaustive list.

The number of cues selected for mapping into the visual display is preferably optimized to provide the best user experience. This is essentially a matter of visual bandwidth management, where the term "bandwidth" is used herein as referring to information displayed per second in the particular format chosen. Visual bandwidth management is important herein insofar as there are limits to human visual perception, and the present method and system should operate within that perceptual bandwidth.

Furthermore, human visual perception is psychophysically different from human auditory perception, and accommodating that difference calls for visual perceptual bandwidth management. Psychophysics quantitatively investigates the relationship between physical stimuli and the sensations and perceptions they produce. As that is applied in this device, starting with the physical stimuli in a musical piece, extracted from that music as audio musical cues, those cues represent the sensations and perceptions they produce as music appreciation. Those sensations and perceptions are enhanced by generating visual cues, systematically mapped, cue-to-cue, to those audio cues, to generate a visual display streaming in time synchronized to the music, such that the musical sensations and perceptions experienced by the user are enhanced by experiencing them through two perceptual modes, audio and visual.

People perceive music of different levels of complexity differently, and those differences may call for different visual display and mappings that most effectively stay within the human perceptual visual bandwidth. Psychophysical differences are based on both physics and physiology. Audio signals are coarse spatially, but are rich in concurrent frequencies and time-amplitude envelopes that can be separately perceived out of the combined frequencies of the signal. Visual displays are rich in spatial perceptual resolution and intermediate in color perceptual resolution. A simple physics (information theory) based bits per second comparison of the two modes would not fully capture the effective information per second bandwidth of the two perceptual modes due to the very different physiologies of the two perceptual modes.

A goal of the present invention is to provide a visual display that effectively presents selected audio cues in the visual domain in a way that mimics and supplements the audio experience. As noted elsewhere, the experience of listening to a solo a capella singer occurs in an entirely different way than does the experience of listening to the fourth movement of Beethoven's Ninth Symphony, which may involve as many as 100 instruments, a large chorus, and four soloists, among them playing and singing over 35 parts. A fixed technical mapping from selected audio cues to corresponding visual cues, calibrated to a chosen mid-range musical richness, e.g., two singers and four instruments, could present a visually cluttered rendition of the symphony, but at the same time might under-represent the perceptual richness of the solo singer. Yet the implementation of digital signal processing enables the invention to adjust its audio-visual mapping to the complexity of the musical piece. For example, an approach can be developed based primarily on the number of notes being played at the same time, and secondarily on tempo, that generates a numerical score that the device can then use to select among mappings. Beethoven's Ninth would get a high score (probably the highest score) and result in the selection of a cue-summarizing mapping. The a capella singer would get a low score (probably the lowest score depending on tempo) and result in the selection of a cue-maximizing mapping. Note that some pieces, (many pieces) begin at a low level of complexity and then increase that complexity. That would not be a problem for the device—it could simply adjust the mapping as the complexity changes.

As one example, the invention, mapping a solo a capella singer's performance, would make full use of many selected audio cues, while in mapping a performance of Beethoven's Ninth Symphony, would fall back to summary representations of many instruments effectively playing the same note (for example, stacked note icons), and depicting the overall "super chord" performed by those over 35 parts. As a practical matter, a person listening to Beethoven's Ninth does not separately perceive those parts, but rather perceives the fantastic richness of those parts generating each overall "super chord." A sequential pitch interval visual cue could present too cluttered a visual display. The same information could be depicted at a different level of detail using vertical motion of the visual cue in time streaming as well as chord progression cues.

The device further includes an integral feature that enables adaptation of the visual display to correspond to changes in the musical piece. For example, the number of seconds of music that is displayed at a given time can be adapted to most effectively present the music. As another example, the system analyzes a musical piece for melody and harmony lines and selects a display that presents melody and harmony in the most effective way. As a further example, the system can adapt with respect to time resolution, such that a lower level of resolution (in the form of a longer sampling time) may be selected for a slower piece while a higher level of resolution (in the form of a shorter sampling time) may be selected for a faster piece and/or a piece that contains rapidly changing audio cues (e.g., glissando, vibrato). Such adaptations can be executed in an automated form or chosen by the listener.

Perceptual Conformality

The one-to-one correspondence between a selected audio cue and its corresponding visual cue is preferably "perceptually conformal." Perceptual conformality ensures that a user of the technology will experience music acoustically and visually in a closely analogous way. Thus, use of the technology may have the effect of mimicking a synesthetic experience (i.e., one in which a perceptual experience in one perceptual mode, e.g., hearing, creates an automatic, involuntary perceptual experience in another perceptual mode, e.g. vision).

In some embodiments, perceptual conformality involves both an orthogonal correspondence, and an ordinal correspondence in the mapping from the auditory domain to the visual domain. In such embodiments, perceptual conformality therefore includes mappings in which those two conditions are met for at least some groups of audio cues.

The first condition is "orthogonal correspondence", meaning that two cues that are orthogonal to each other in the auditory domain must be orthogonal to each other in the visual domain. Two cues are "orthogonal" to each other if they vary independently of each other. Pitch and note duration are examples of two audio cues that are orthogonal to each other in the auditory domain. That is, pitch can vary independently of note duration in the auditory domain, meaning that to preserve orthogonal correspondence between those two cues in the mapping, the visual cue corresponding to pitch must also vary independently of the visual cue for note duration. As an example, if the visual cue for pitch is the location of the note icon on the vertical axis, and the visual cue for note duration is length or extent on the horizontal axis, then the condition of orthogonality is met. Other examples of pairs of audio cues that are orthogonal to each other include, without limitation: timbre and note duration, pitch and amplitude. Other examples of orthogonality in the visual domain include color and location on the display, which can both vary independently of each other, as well as color and size of representation.

A second condition in this embodiment of perceptual conformality is ordinal correspondence for audio cues that have a natural ordinal relationship, e.g., pitch, amplitude, note duration, and time of note onset. That is, pitch can be higher or lower, amplitude can be louder or softer, note duration can be longer or shorter, and time of note onset can be earlier or later. In these cases, where there are ordinal relationships in the auditory domain, those ordinal relationships must be preserved in the visual domain in order for there to be ordinal correspondence between the audio cues and the corresponding visual cues. It will be seen that while orthogonality involves the relationship between two cues, like pitch and note duration, ordinal correspondence involves variation within a single cue. For example, when relative pitch is indicated by relative vertical position in the visual display, then if note A has a higher pitch than note B, the visual display should represent note A has having a higher vertical position than note B. As another example, when amplitude (loudness) is represented by brightness on the visual display, then if note A is louder than note B, the visual display will present note A as brighter than note B to maintain an ordinal relationship.

One implication of ordinal correspondence with respect to time of note onset and note duration is that a sequence of audio cues will be represented by a time-streaming sequence of visual cues in the visual display, for instance, left to right, right to left, inward to outward, outward to inward, higher to lower, lower to higher, and the like. In this way, the flow of a musical passage can be translated into a flowing stream of visual cues. Time streaming is described in further detail elsewhere herein.

In some embodiments, perceptual conformality for any two audio cues that are perceived simultaneously and separately may require that the two corresponding visual cues be spatially separate, as this may enhance the overall experience of music perception in terms of an individual's enjoyment and appreciation of the music. It is important, however, to avoid overcrowding the visual display with too many visual cues or too many types of visual cues. As an example, separate and simultaneous audio cues may characterize different notes within a single chord. At a more structured level, melody, harmony, and percussion lines may be separated into separate bands on the display.

Alternatively, or in addition, the notes within the aforementioned musical lines may be highlighted or otherwise identified on the display.

In some embodiments, perceptual conformality involves one-to-one correspondence between a group of two or more selected audio cues that are perceptually associated with each other and a group of the selected two or more corresponding visual cues. That is, in this embodiment, perceptually conformal one-to-one correspondence requires that a group of two or more perceptually associated audio cues be translated into a corresponding group of two or more perceptually associated visual cues. It will be appreciated, in this embodiment, that two audio cues that are not perceptually associated with each other are represented by two spatially separate visual cues.

A representative mapping of selected psychoacoustic cues to corresponding visual cues using a perceptually conformal mapping system is as follows. Each psychoacoustic cue is associated with an individual note or a group of notes at any one point in time or as a sequence. The existence of an individual note can be represented in the selected visual display by a square, rectangle, circle, diamond, triangle, "roundtangle" (a rectangle with rounded corners), mouth, guitar or other instrument, or other visual cue as described elsewhere herein. The shapes can optionally be borderless. That representation will be referred to herein as a note icon. There is perceptually conformal one-to-one correspondence between the auditory perception of each note and the visual perception of each corresponding visual cue. The pitches of the notes processed by the system into visual cues are not limited to the discrete notes within a standard piano keyboard, such as the 88-note or 97-note versions, but can include pitches of notes in between those discrete notes. This is particularly useful, for instance, in representing glissando, vibrato, portamento, and the like. Accordingly, described elsewhere herein—in Appendix B—are audio cues with corresponding representative visual cues and a brief indication of how perceptual conformality is achieved.

Three Stages of a Method of Mapping Musical Characteristics into a Visual Display The method of visualizing music is a three-stage process, schematically illustrated in FIG. 1. In a first stage, a music source file 100 is translated into a time stream of music data files. In the second stage, the stream of music data files is converted into a time stream of psychoacoustic attribute files (PAFs). In the third stage, that time stream of psychoacoustic attribute files is mapped into the corresponding visual cues, and then loaded into a visual display device. In practice, the music source file 100 is input into a computer processor that is configured to execute the steps of FIG. 1 as is described elsewhere herein, and the processor is in electronic communication with the visual display.

Stages 1, 2, and 3 are further described as follows. The purpose of the description and the accompanying figures is to provide one skilled in the art with a representative method for implementing the technology. It will be appreciated by those skilled in the art that the actual signal processing may take any of a variety of forms and is not limited to that described herein. As an example, typical music compact discs (CD's) currently use a sampling rate of 44.1 kHz. If the device employs a time sample of 118th second, that corresponds to about 5,500 CD samples per device sample, and that relationship between two discrete sampling systems can be exploited to improve performance and/or efficiency. As another example, algorithms can be employed that infer amplitudes in ratios of frequencies directly from analysis of the music source file, without first translating that source file into a set of particular frequencies and then analyzing those frequencies for amplitudes in ratios of frequencies.

The piece of music may comprise a static music source file, or a streaming music source, such as a live performance, or music from a recorded music playback device.

Stage 1

Figure 2:
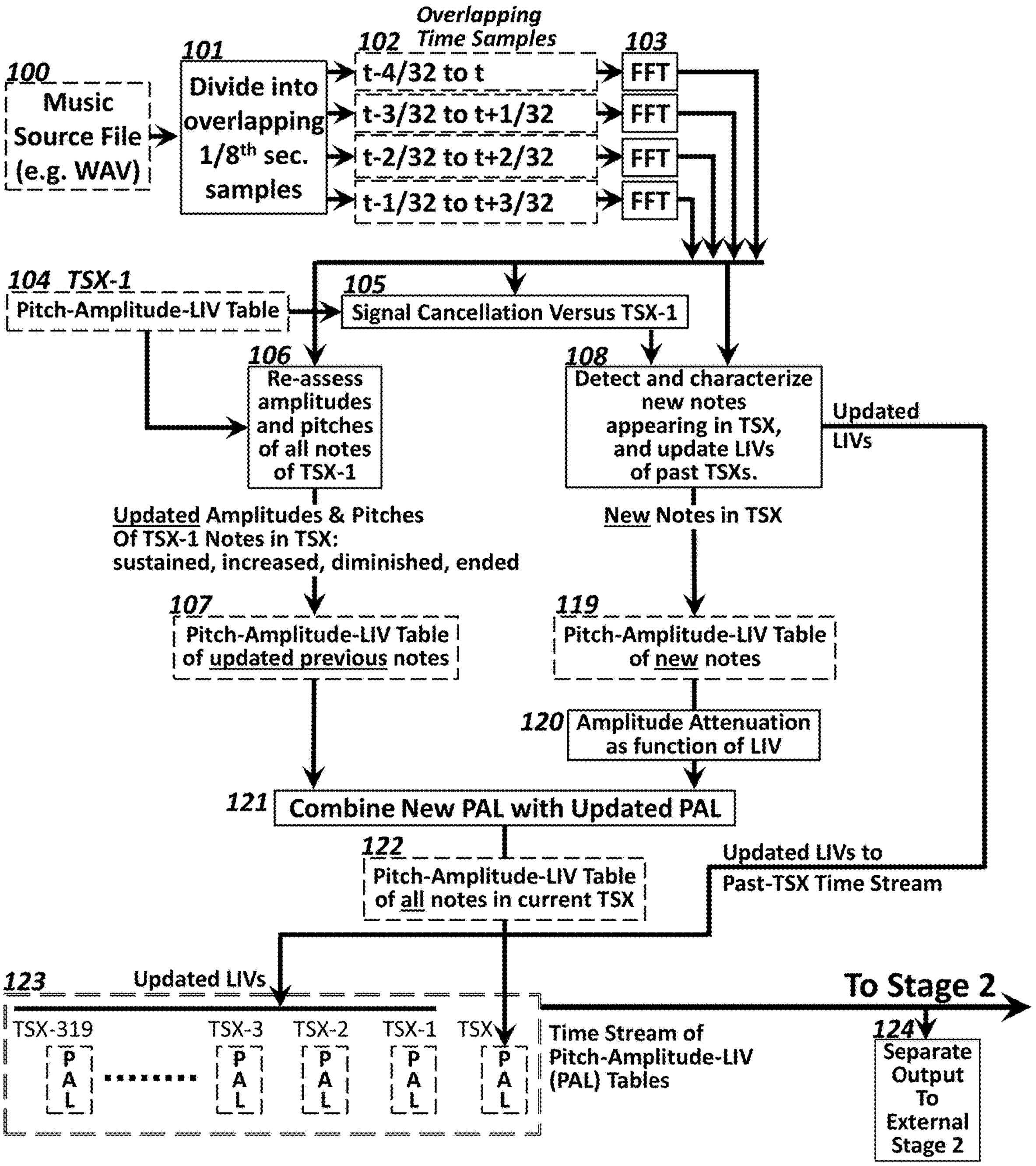
FIG. 2 is a flow chart illustrating Stage 1 of the present process in which a music source file is stepwise converted to a time stream of Pitch-Amplitude-LIV (PAL) tables.

The first stage of the present method is illustrated in FIG. 2. The purpose of the first stage is to analyze a piece of music, and generate a time-stream of pitch-amplitude-LIV (or "PAL") tables, where "LIV" is Label of Instrument or Voice, as further described herein.

The music source file 100 is preferably a raw (unedited) and "no loss" (uncompressed) digital rendition of an audio signal, and comprises amplitude, frequency, and time data for one or more pieces of music. The music source file can be a WAV (Waveform Audio File format) file, an MP3 (MPEG Layer III) file, or an AIFF (Audio Interchange File Format) file, or any other common format file, as will be known to those skilled in the art. The music source file can be a static file or a stream from alive performance. The source file preferably is one that adequately captures the characteristics of a musical piece necessary for normal human music perception. The source of the music may be a compact disc (CD), internet radio, MP3 player, or any other source that provides music content. An analog music source signal, e.g., from an analog recording or as a stream from a live performance, can be converted to a digital signal or file in a digital format with an analog-to-digital converter, prior to being analyzed by the methods herein.

Music source file 100, is initially divided 101 into a plurality of overlapping time samples 102. The time samples are indicated as being 118th second in length in FIG. 2, for the sole purpose of illustration and convenience with respect to overlap; the time samples may, however, be of shorter or longer durations. One challenge for the sampling process is that subsequent steps of the analysis, involving translation of the music source file into the frequency domain, for example using fast Fourier transform (FFT) processing, generally requires as a matter of practicality that an individual time sample be at least about 1/10th sec. Accordingly, the length of each time sample may be, for example, 114th sec, 118th, 1/10th sec, or may be expressed decimally as 0.1, 0.15, 0.2, 0.25, 0.3 s, etc.

Successive time samples are overlapping, offset in time by a pre-determined, fixed time interval. This offset results in individual time segments, each of a duration equal to that offset. Each of those individual time segments is referred to herein as a "TSX". Thus, for instance, if a time sample 118th sec. in length, and the offset is 1132nd sec., the result is four time segments, each 1132nd sec in duration. The offset correlates with the time resolution, in this context the time resolution of audio cues. That is not to be confused with the time resolution associated with frequencies within the range of human perception, which extend to 20 KHz. Typically, the human auditory system perceives a sound with a frequency higher than 16 Hz as a single tone. For example, the lowest typical piano note, on a 97-note keyboard, is 16.352 Hz. That is, the time resolution for audio cues of the human auditory system is about 1116th sec. Optimally, the time resolution provided by the present system enables the consumer to experience a very closely correlated perceptually conformal visual map at the same time as hearing the music. In this respect, the invention essentially induces a synesthetic experience in which a person can experience music both acoustically and visually.

The fact that successive time samples overlap by a fixed interval dictates the sampling rate. A preferred sampling rate is a frequency corresponding to about 1.5 to 2 times the reciprocal of 1116th second, the human time resolution for audio cues, as described elsewhere herein. The preferred sampling rate is thus in the range of about 24 Hz to about 32 Hz, preferably closer to 32 Hz. This is supported by the reasoning underlying the Nyquist-Shannon sampling theorem (see Shannon, *Proceedings of the IRE* 37(1):10-21, (January 1949), reprinted as Shannon (February 1998) Proceedings of the IEEE 86(2): 447-457).

Anyone who has attended a "four-hand" concert (one in which two pianos are played face to face) appreciates that the slight differences (offsets) in note onsets as played by the individual players are important to the experience of the performance. Thus, it is to be understood that in at least some cases, it is desirable that the system operate at the limits of human audio cue time resolution. That level of time resolution is approximately 1116th sec, which calls for a sampling rate of 32 Hz.

As with the length of the time sample, it is to be understood that a range of sampling rates and corresponding TSX durations can be employed within the context of the present invention, consistent with the purpose of the present technology, which is to visually mimic what a person actually hears. Furthermore, it will be appreciated that the length of each time sample and the extent of offset is preferably consistent throughout the analysis of the musical piece.

For purposes of illustration, four successive 118th second time samples offset by 1132nd second are shown in FIG. 2 as item 102. Time samples of 118th sec. duration are created every 1132nd second to achieve a TSX sampling rate of 32 Hz, meaning that each 118th sec sample overlaps with three other 118th sec samples, except at the very beginning and end of a piece of music.

Figure 3:
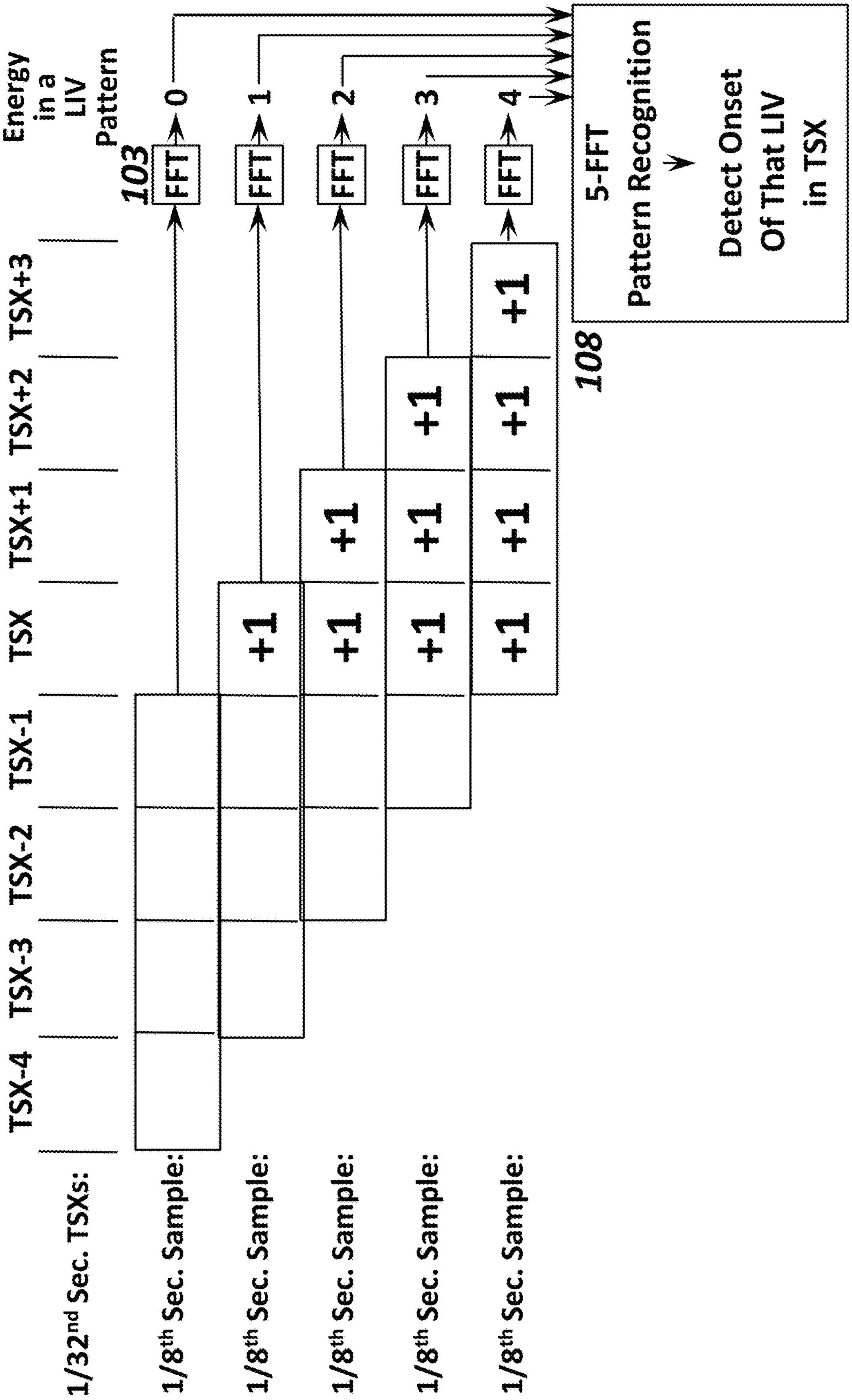
FIG. 3 illustrates how the time offsets of successive music samples relate to time resolution and recognition of the onset of a note.

FIG. 3 illustrates a series of five overlapping 118th sec time samples with a 1132nd sec offset. There is an "interior" 1132nd sec time segment, labelled "TSX", that is contained within four 118th sec samples. The preceding 1132nd sec time segments are referred to as TSX−1, TSX−2, etc., and the subsequent 1132nd sec segments are referred to as TSX−1, TSX+2, etc. FIG. 3 also illustrates the manner in which a five-segment pattern recognition process detects the onset of a note in time segment TSX.

Alternatively, time samples of 118th sec may be created every 1124th sec to achieve a TSX sampling rate of 24 Hz, meaning that each 118th sec sample overlaps with two other 118th sec samples. That is, one may envision a series of three overlapping 118th sec time samples with a 1124th sec offset. In that case, there will be a central 1124th sec segment that is contained within all three 118th sec samples. This central 1124th sec segment may be designated TSX, with the immediately preceding 1124th sec segment designated TSX−1 and the immediately following 1124th sec segment designated TSX−1.

It should be noted that the terms TSX, TSX−1, TSX−2, TSX−1, TSX+2, etc. can refer to time segments having a duration other than 1132nd sec. or 1124th sec., as explained elsewhere herein.

The overlapping time samples are then translated from the initial amplitude-versus-time data in the music source file into the frequency domain using, for instance, fast Fourier transform, as indicated in FIG. 2 at 103. The frequency domain, as will be appreciated by those of skill in the art, essentially comprises a histogram (a non-continuous, or bar, graph) indicating the amplitude at each frequency identified within each time sample. For each TSX, then, the data in the histogram includes the frequencies observed for all notes, and wherein the frequency data will include overtone series as well as the fundamental frequency for each individual note. As is well known, determination of a musical sound as corresponding to a specific musical instrument, musical instrument class, or voice, is achieved by using the identified overtone series. Each TSX is contained within, and thus is characterized by, histograms of a number of overlapping time samples. It will be appreciated that other tools are available to transform musical data from one domain to another, i.e., the time domain to the frequency domain, and are therefore applicable herein; such tools include, without limitation, the IFFT, or inverse fast Fourier transform, and the OFT, or discrete Fourier transform.

The time segments, converted to frequency domain, are now further processed according to subsequent steps shown in FIG. 2.

For the first TSX in a musical piece, referred to herein as TSX−0, the frequency domain data obtained in 103 is processed 108 so that each note in the segment is detected and characterized by pitch, amplitude, and LIV, and the data is loaded directly into PAL table 119, which is a PAL table of new notes recognized in each TSX. For TSX−0, this PAL table will be referred to as PAL−0 for ease of understanding. Step 108 is further described elsewhere herein.

The format of a representative PAL table is shown in FIG. 4, where each amplitude and LIV value for each note are shown as a function of pitch. The values in the table might be, for example, an amplitude as a value expressed in dB and a LIV that is an instrument type, instrument, voice, or the like, for each note at a particular pitch. (Off-pitch notes may be temporarily or permanently stored in a separate section of the table, as shown in the lower part of FIG. 4.) The system has the capability of logging more than one note at the same pitch (as shown), for instance a violin and flute playing the same note simultaneously.

In optional step 120, the amplitude is attenuated differentially as a function of LIV. For instance, drums might be attenuated more than other instruments or voice, in a manner that corresponds closely to how the human ear functions. (Human music perception and appreciation includes perceiving the relative volumes of different instruments in a way that adjusts those perceived relative volumes as a function of which instrument produced which notes. For example, when listening to a singer with drums, the perceived volume of the drums may be adjusted downward relative to the perceived volume of the singer.)

With the next TSX, i.e., TSX+1 (see FIG. 3), the frequency domain data is again obtained in 103 and processed 108, as with TSX−0. With TSX−1, however, and with all subsequent time segments, an optional signal cancellation step 105 may be carried out relative to the preceding TSX. Signal cancellation is further described elsewhere herein.

Figure 5:
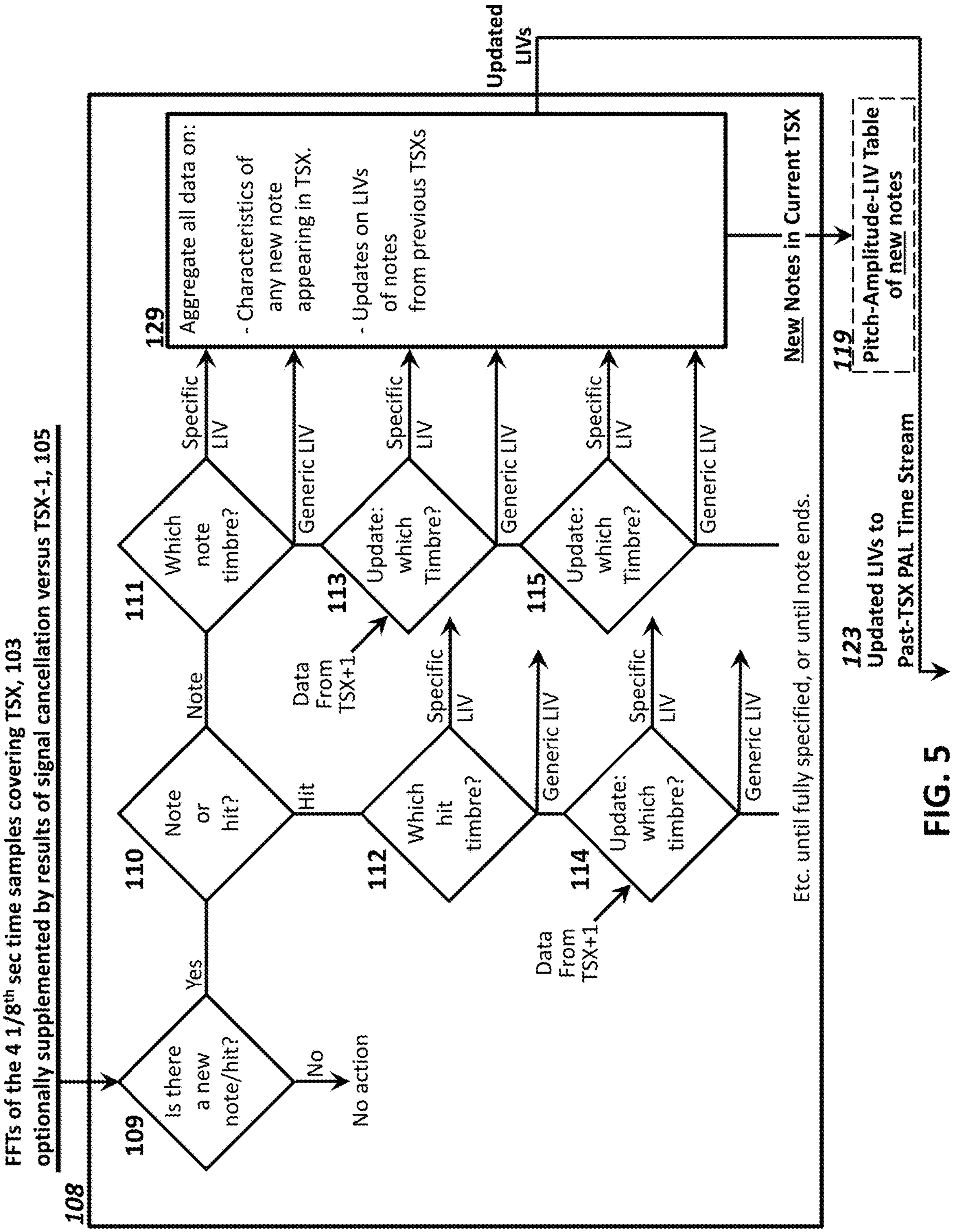
FIG. 5 expands that step in FIG. 2 regarding the detection and characterization of new notes and hits in a given time segment, as well as the updating of prior determinations.

In processing step 108, new notes are identified in each new TSX, i.e., new relative to the previous TSX, and each LIV is updated as illustrated in FIG. 5, as described further herein. The new notes that are identified in each new TSX are characterized by pitch, amplitude and LIV and the data is loaded into a new PAL table of the new notes identified in that new TSX. Differential amplitude attenuation (i.e., equalization) in operation 120 as a function of LIV is optional at this point in the process.

In parallel with step 108, as illustrated in FIG. 2, the previous PAL table 104 is fed into a process 106 in which amplitudes and pitches of all notes in that previous PAL are re-assessed for their amplitudes and pitches as they are found in the current TSX. The output of 106 provides updated amplitudes and pitches of the notes of the previous PAL, which includes sustained notes with increased amplitude, sustained notes with decreased amplitude, sustained notes with no change in amplitude, and completed notes. An updated PAL 107 of updated amplitudes and pitches of previous notes is created from this data.

In the next step of Stage 1, as shown in FIG. 2, the updated PAL 107 and the new PAL 119, optionally modified by amplitude attenuation in 120, are combined at step 121 to provide a single updated PAL 122 that corresponds to the current TSX. These steps are repeated for each new TSX, i.e., TSX+1, TSX+2, TSX−3, and so on, to provide updated PAL+1, PAL+2, PAL+3, etc. tables corresponding respectively to the sequence of TSX segments. That is, for any TSX−N, a PAL−N table of new notes is created, the TSX−(N−1) PAL table is updated to provide an updated PAL−(N−1) table, and the PAL−N table and the updated PAL−(N−1) table are combined to provide an updated PAL−N table. The time stream of updated PAL−N tables is shown at 123. As shown in FIG. 2, updated LIVs are also fed into the time stream of PAL tables so that prior PALs are updated.

The operations of Stage 1 extract audio cues such as pitch, amplitude and LIV, and direct them to Stage 2. Cues such as pitch and amplitude can be extracted (i.e., measured or determined) in a straightforward manner within the structure of TSXs presented herein. The extraction of LIVs involves a more complex process, and is further described as follows, with respect to FIGS. 5, 6, and 7.

Figure 6:
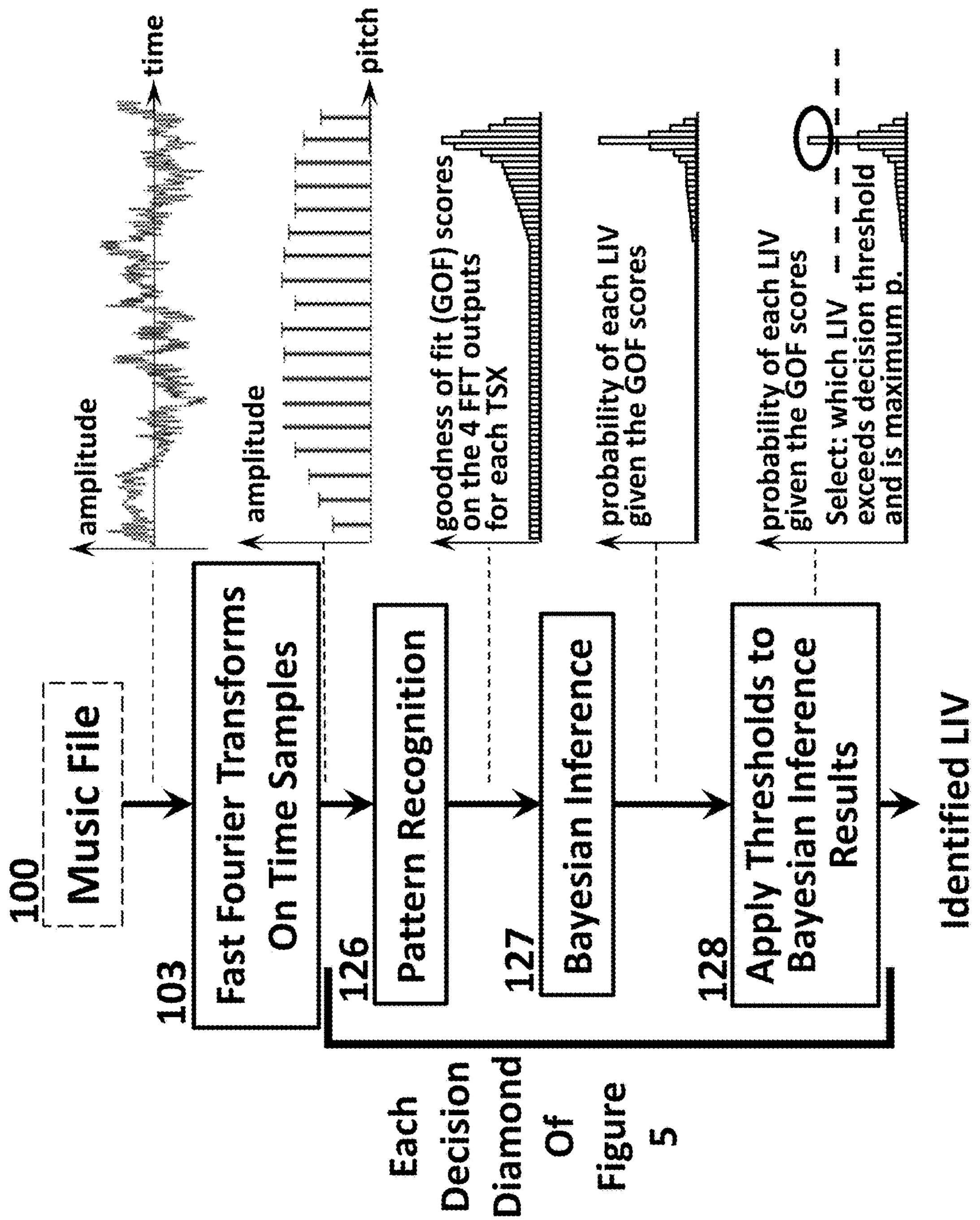
FIG. 6 illustrates the process steps involved in each decision diamond of FIG. 5.
Figure 7:
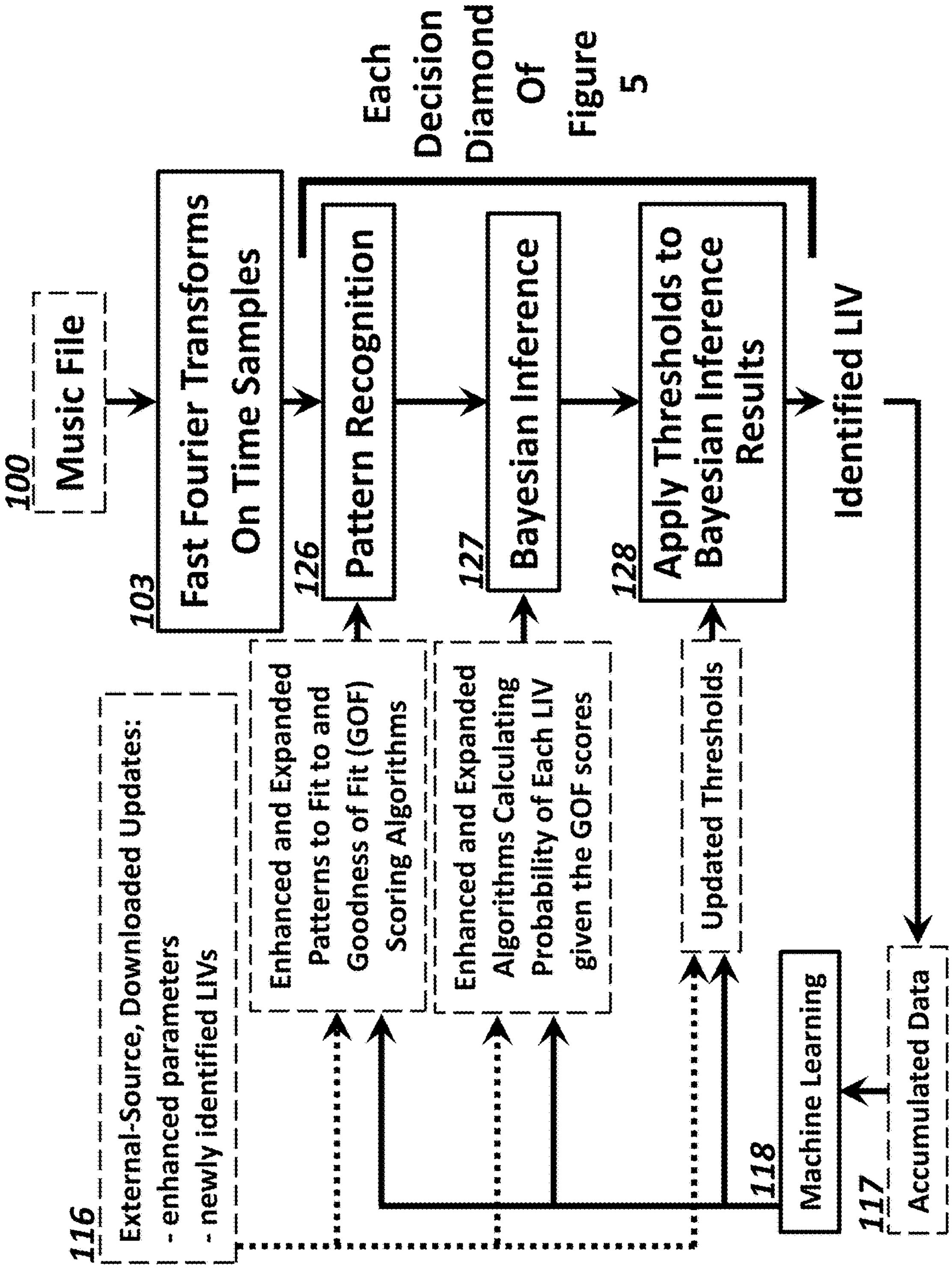
FIG. 7 is a flow chart illustrating how accumulated data, external updating, and machine learning support the operations of FIG. 5.

The operations in FIGS. 5, 6, and 7 are exemplary and not preclusive of other ways to extract the audio cues. For each TSX, the overlapping and successive time samples each containing that TSX are analyzed using a multistep technique to assign a Label of Instrument or Voice ("LIV") to each note or percussive hit. (A note or percussive hit may be referred to herein collectively as an auditory element). FIG. 5 provides a flow chart of the individual operations involved in LIV assignment, i.e., in process step 108 of FIG. 2. Operation 109 involves determining whether there is a new auditory element appearing in the TSX. If the answer is no, no further action is taken in this step for that TSX. If the answer is yes, the system proceeds to operation 110, which involves determining whether the new auditory element is a tone or a percussive hit.

If the new auditory element is a tone, the system proceeds to operation 111 to identify the note timbre (i.e., the overtone series of the note). If the note timbre can be specifically identified, e.g., as being associated with a human voice or a specific musical instrument, the specific note timbre is a LIV that is input into the data set for the TSX. If the timbre can only be identified generically, for instance as being associated with a stringed instrument or a wind instrument, that generic timbre information is also a LIV that is input into the data set for the TSX as aggregated in 129. (For generic timbre information, further data will be sought, as further described herein.) If the new auditory element is a percussive hit, the system proceeds to operation 112, which involves determining the timbre of the hit, e.g., as a specific type of drum or as associated with a class of percussive instruments. As with operation 111, a specific or generic LIV identification is input into the data set.

If the timbre identified in operation 111 is generic rather than specific, the system proceeds to operation 113, to incorporate data obtained from the next TSX. Further updating may be done as shown in 114 and 115, and may be repeated until the desired specificity is reached or the note ends, whichever event happens first.

In situations where the process does not identify a LIV with full specificity, the system is designed so that, in such a case, there is always a tailback LIV, at a more generic level, as long as operation 109 has identified a new note or hit. Therefore, the process will always assign some LIV to any identified a new note or hit; it is only a question of how specific a LIV that can be assign to that note or hit. This information is aggregated 129.

The foregoing description of operations 109 through 115 implies, more generally, the need to update information over many TSXs. That updating takes one or more of three forms:

Updating Form 1: LIV Refinement. The identification of a particular LIV, e.g., discriminating between a violin and a cello, may take many TSXs. That is, the system may need more than a full second of information (for example, if TSXs are each 1132nd second long, then more than 32 of those TSXs) to discriminate between those two LIVs. That is natural and expected, since in fact it may take a human more than a second to make that discrimination, but it requires the system to process many consecutive TSX's.

Updating Form 2: Note Characteristics Other Than LIVs. Many audio cues associated with a note can only be inferred over several TSXs. Those include cues such as attack, strum, vibrato, tremolo, melody and harmony. While attack and strum may be fairly immediately recognized by the listener, they may still occur over several TSXs, i.e., over several 1/32nds of a second. Vibrato and tremolo are revealed as fluctuations in frequency and amplitude over time, respectively, and as such only become apparent over many TSXs. Melody/harmony will only be perceived by the listener over very many TSXs.

Updating Form 3: Characteristics of Musical Phrases. Some audio cues are intrinsically associated with musical phrases, and so with time periods spanning very many TSXs. Those include chord progression, affect score, and tension. Again, all of those cues only become apparent to the listener over very many TSXs.

In all three modes of updating, the use of data over extended time periods in fact mimics human musical perception, since in all cases, the listener, also, must aggregate information over spans of time before each of the cues associated with the three updating forms becomes apparent.

The determination and assignment of LIV values may include not only labeling of instrument and voice but also labeling with regard to other audio cues such as sibilance (the "ess" sound made by a voice) and the number of a single type of musical instrument or voice ("N-instrument" or "N-voice", respectively). If sibilance and/or multiple instruments or voices are present, two or more separate LIVs may be assigned to a single note or hit, or one modified LIV (e.g., a multiple instrument LIV) can be assigned. If not otherwise defined, the term "LIV" herein includes assignment of sibilance and/or multiple instrument or voice information.

In a preferred embodiment, each of the operations 109 through 115 can be accomplished using techniques of pattern recognition, a Bayesian inferential method, and LIV assignment, see FIG. 6. The last of these (LIV assignment) has been described with respect to the individual operations elsewhere herein. By "Bayesian inference" or a "Bayesian inferential method" is meant the Bayesian method perseas well as a functionally equivalent inferential method. In pattern recognition, a comparison is made between the frequency domain histogram for each auditory element and each of many established voice and instrument overtone series ("OTS") in an OTS library. A goodness-of-fit ("GOF") score is then assigned based on how well the analyzed auditory element matches each of the OTS patterns in the library. It will be appreciated that although the following description references a particular way of obtaining a GOF score, that there are in fact a number of alternative algorithms for determining GOF scores, and any of these may be used in conjunction with the present invention.

By way of example, then, a starting point for obtaining a GOF score is simply to use the square root of the sum of mean squared differences between the observed OTS and library OTS patterns (i.e., using a root-mean-square, or "RMS" methodology, in which the difference in the amplitude between the observed amplitude and the pattern amplitude for each frequency tested is squared, summed over tested frequencies, then the square root of that sum taken, with normalization if there are different numbers of frequencies tested). The initial GOF score can then be refined in the course of device development and consumer device local experience through machine learning, as described elsewhere herein. Refinement can be based on the combined observed performance of pattern recognition, Bayesian inference and LIV assignment for LIV discrimination and speed to that discrimination.

Bayesian inference then combines the GOF information with any of a number of pieces of evidence that can be assembled from current applications and recent advances in music signal processing, such as those included in the journal volume *IEEE Journal of Selected Topics in Signal Processing* Vol. 5(6), (2011), incorporated herein by reference. All of those inputs can be transformed into probability information and then combined with the probability mathematics of Bayesian inference to generate the relative probability of each LIV given the GOF score and results of signal processing operations. One formula that converts GOF scores to probability information is set forth in Eq. (1):

$$P(LIV_i) = \frac{GOF(LIV_i)}{\sum_{all\ j} GOF(LIV_j)} \tag{1}$$

i one of j; j exhaustive all LIVs

As with pattern recognition, this initial version can then be refined in the course of device development and consumer device local experience through machine learning. As with GOF scores, refinement here can be based on the combined observed performance of pattern recognition, Bayesian inference and LIV assignment for LIV discrimination and speed to that discrimination. Speed of LIV identification is important and arises because, as the system becomes more intelligent, it will recognize an instrument more quickly. Thus, speed of LIV identification can be quantified by, say, the number of seconds sampling before getting to the most specific LIV.

LIV assignment takes the probability distribution over LIVs given the data from the Bayesian inference step and identifies the LIVs to be assigned to the auditory element based on those probabilities that exceed certain identification thresholds. As explained with respect to FIG. 2, FIG. 3, and FIG. 5, the cycling process, involving successive overlapping time samples, is useful in refining an initial LIV that may be generic rather than specific (e.g., referring to a string instrument as opposed to a violin), to a more specific LIV (such as that of a violin) by updating based on successive overlapping time samples.

In sum, within the context of the process herein, the method involves assigning a LIV to a note by:

(a) transforming successive overlapping time samples in a music source file to a histogram of discrete frequencies comprising an amplitude versus frequency distribution;

(b) comparing that histogram to a library of reference histograms each corresponding to a different reference instrument or instrument category and determining how well the histogram matches one or more reference histograms in the library by assigning a goodness-of-fit score to each comparison;

(c) inferring from the goodness-of-fit scores, using Bayesian inference, the probability of the histogram matching each of the reference histograms and creating a probability distribution therefrom;

(d) determining from the probability distribution whether an identification threshold has been exceeded for one or more particular reference histograms;

(e) if an identification threshold has been exceeded, assigning the most specific applicable reference instrument or instrument category to the histogram; and (f) if the most specific applicable identification threshold has not been exceeded, repeating steps (a) through (e) with subsequent time samples until the most specific applicable identification threshold has been exceeded or the note has ended, whichever event happens first.

It will be appreciated that after initial LIV assignment, which may be a generic LIV such as a string instrument or a female voice, the steps of (a) through (e) can be repeated until a more specific identification threshold is exceeded, such that a more specific LIV is assigned, e.g., a violin or a particular female vocalist.

The identification thresholds are to be designed and set such that the method always reaches the decisions necessary for satisfactory operation. That is, thresholds can be adaptive and adjusted in real time such that notes are always detected at some level of specificity, from "any note" to "note with specific LIV." That is in part based on another application of Bayesian inference, using prior probabilities of patterns in musical pieces. (The term "prior" is used here in the standard terminology of Bayesian inference, that is, probabilities known prior to observation of current data.) That is, musical pieces are always (within the scope of application of the method) comprised of a series of notes and/or note sets, appearing within known ranges of frequencies, tempos, and quiet passages. Combining the observed signal with that prior information, the system can adjust the thresholds to the realities of the observed signal.

The thresholds can also be adjusted to information that becomes known in the course of the musical piece and the observed experience that a particular listener has with a particular implementation. For example, once a LIV is identified, the method can more readily identify it if and when it appears later in a musical piece, and later in the consumer device local experience. The speed with which the method can recognize particular cues, for example, melody/harmony, affect, chord progression, tension and release, can be improved with predictive modeling using any form understood by those of skill in the art.

This combination of GOF calculations, Bayesian inference and LIV assignment, as presented herein, all approximated then refined, including the Bayesian inference that combines GOF information and current applications and recent advances in music signal processing, is powerful, analytically. Combining that analytic inference framework with the cue-centered framework of the device and the operations flowcharts described herein, together the system described herein can generate audio cue identification with a performance that exceeds the performance of current applications and recent advances in music signal processing.

Each time sample thus contains one fragment of the piece of music, and each time sample overlaps with a number of other time samples such that, ultimately, the piece is completely sampled and in fact each time segment TSX is sampled multiple times.

In FIG. 2, element 105 refers to the operation "Signal Cancellation Versus TSX−1," i.e., versus the previous time segment. This operation is optional, but may in some cases improve the operation of the method. It screens out the musical elements identified in the previous TSX, to improve the ability of the system to perform the signal detection operations, i.e., identification of new notes relative to the previous TSX. This signal cancellation operation takes the auditory elements identified in the previous TSX, reconstructs from them the corresponding music signal, i.e., amplitude vs. time, inverts that signal, combines that with the input signal characterizing the current TSX, re-performs the operations of 102 and 103 on that combined signal, then feeds that combined signal, along with the output of 103 which has not been subject to signal cancellation into 108 so that the operations of 108 can be performed based on both inputs, the signal-cancelled output of 105 and not-signal-cancelled output of 103. The signal combination must include a process to correct for differences in phase between the inverted signal and the current-TSX signal.

Machine Learning and the Device as a Learning System

Machine learning can also be used to improve the ability of the device and the user to select the most effective mapping.

Machine learning refers to the process of automated adaptation of algorithms based on incoming data. In the present context, machine learning involves application of the general principles of Bayesian inference throughout the operations of the method, as well as modelling the underlying processes that involve human perception and appreciation of music.

To expand and generalize the first concept, the method can be referred to as embodying a "learning system." Its application herein, wherever appropriate, may be important to the best possible performance of the method, and is in keeping with the general principle of making the best possible use of available information. It also adds robustness to the performance of the method. That is, changes in the signal patterns of musical files, or new LIVs, or unusual noise patterns, can render a device without machine learning unable to cope well with those changes, and be effectively "dumb". The exigencies of music performance, new music LIVs, music recording and noise patterns may make machine learning important to the most satisfactory performance of the device.

The operations of FIG. 6 have been described elsewhere herein. Those operations can initially apply initial values for the patterns, goodness-of-fit scoring algorithms, algorithms for calculating the probability of each LIV given the GOF scores, and the thresholds used to convert the Bayesian Inference results into decisions to identify LIVs. Those initial values can all be set by a person of ordinary skill in the art. Then the performance of the device can be improved by machine learning, as described herein.

FIG. 7 presents two additional operations, machine learning and external-source downloaded updates. As indicated in FIG. 7, machine learning 118 takes the accumulated data (i.e., experience) from past decisions 117, and uses those to enhance the patterns to fit to, the Goodness of Fit (GOF) scoring algorithms and the algorithms for calculating the probability of each LIV given the GOF scores, and updates the thresholds used to convert the Bayesian Inference results into decisions. That experience is accumulated from full-note-duration analysis in three forms: (1) during a musical piece, including LIVs that stop and then start again later in the piece; (2) from past plays in the consumer's play set, for enhanced identification in later plays; and (3) new notes, for possible use in later plays in the consumer's play set.

Those improvements in performance fall into three categories: 1) More refined patterns for a more refined set of LIVs to be detected and identified, based on logging the observed patterns, i.e., if different patterns are logged for female soprano voices, those can be identified as different LIVs and labeled accordingly, perhaps to be matched to named performers through external-source downloads. The same process applies to, e.g., more effectively and rapidly distinguishing viola from violin; 2) That same more refined pattern recognition process, but in particular applied to learning a LIV early in a piece then identifying that LIV when and if it reappears in that piece; and learning a LIV from a user's set of played music, then identifying it more quickly when and if it reappears in other played music; 3) More rapid identification of LIVs, based on the inference sequences that eventually result in a LIV identification.

Figure 11:
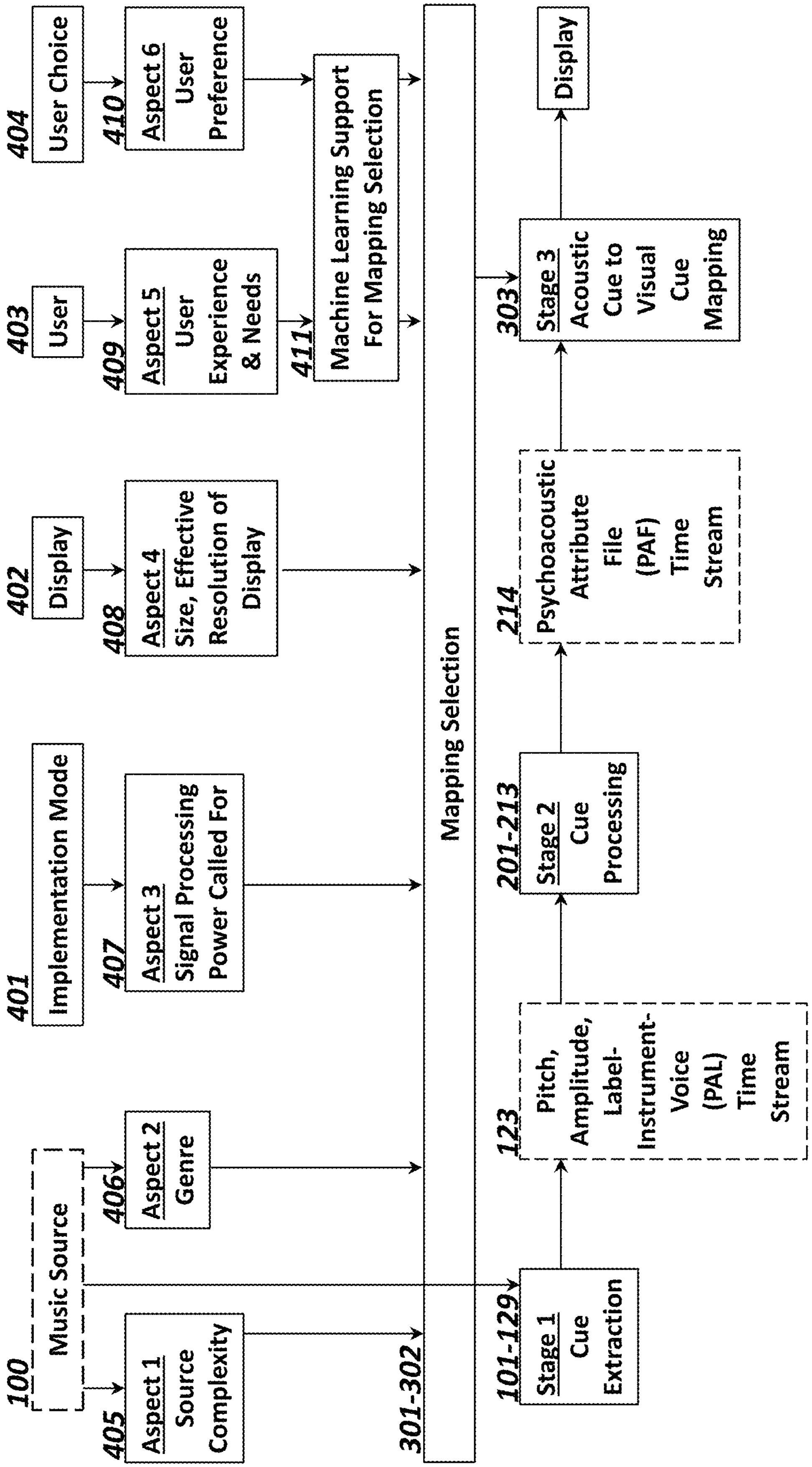
FIG. 11 presents the relationship between six aspects of implementation and mapping selection.

Appendix B presents a very general set of alternative mappings from audio cues to visual cues. That set of mappings is general enough to provide a visual cue vocabulary that can effectively support the broad range of implementations of the device described in Appendix A and FIG. 11. The dimensions of that broad range of implementations can be summarized in 6 aspects:

- Aspects 1 (Source Complexity) and 2 (Genre) describe the music to be mapped.
- Aspects 3 (Implementation Mode and so Signal Processing Power Called For) and 4 (Display) describe the technical aspects of the implementation.
- Aspects 5 (User Experience and Needs) and 6 (User Preference) describe the user aspects of the implementation.

The broad range of implementations of the device and the very general set of alternative mappings presents the question of how best to select the most effective mapping for each implementation, i.e., each set of settings of the six aspects. Aspects 1 through 4 involve levels set by the music itself and the technical implementation, so specific mappings for each of the six aspects can be set by the music producer, concert producer and device manufacturer communities. That is, persons of ordinary skill in the art from those communities can select, for each combination of Aspects 1-4, a set of alternative mappings to be considered in Aspects 5 (to be selected based on user experience and needs) and 6 (to be selected by the user). Those alternative mappings can then be improved upon through two processes: First, research, market interactions (e.g. inviting users to post their preferred mappings) and user interactions (e.g. monitoring the mappings selected by users) to identify what mappings are found to be most effective to users; and second, development of models of human music perception and appreciation to guide those identifications of mappings. That second process can include machine learning, as understood herein, i.e., automated adaptation of algorithms based on incoming data. That machine learning can be based on data collected in research, market interactions and user interactions, but rather than (as in the first process) applying that data directly to selecting alternative mappings, that data can be applied to building models of human music perception and appreciation, then those models improved by machine learning based on data collected. Both processes can be applied both at the market level (i.e. music producer, concert producer and manufacturer communities, working with data collected from their customer communities), and at the user level (i.e. the device can monitor user selections and use those to improve the selections offered to the user).

Also, as indicated in FIG. 7, 116, a second source of updates can be downloaded from external sources. Those updates can include enhanced Goodness of Fit (GOF) scoring algorithms and algorithms for calculating the probability of each LIV given the GOF scores, updates to the thresholds used to convert the Bayesian Inference results into decisions, and newly identified LIVs.

The output of Stage 1, i.e., the time stream 123 of PAL tables, can be input directly into a Stage 2 that is integrated into a single system containing both Stage 1 and Stage 2, and in addition it may be provided as a separate output, 124. That separate output may be provided to a consumer to be used in connection with a user-selected, separately acquired Stage 2 device. Formats of output 124 can take other forms as well, e.g., as a digital music file (such as a MIDI file) or a musical score.

Stage 2

Figure 8:
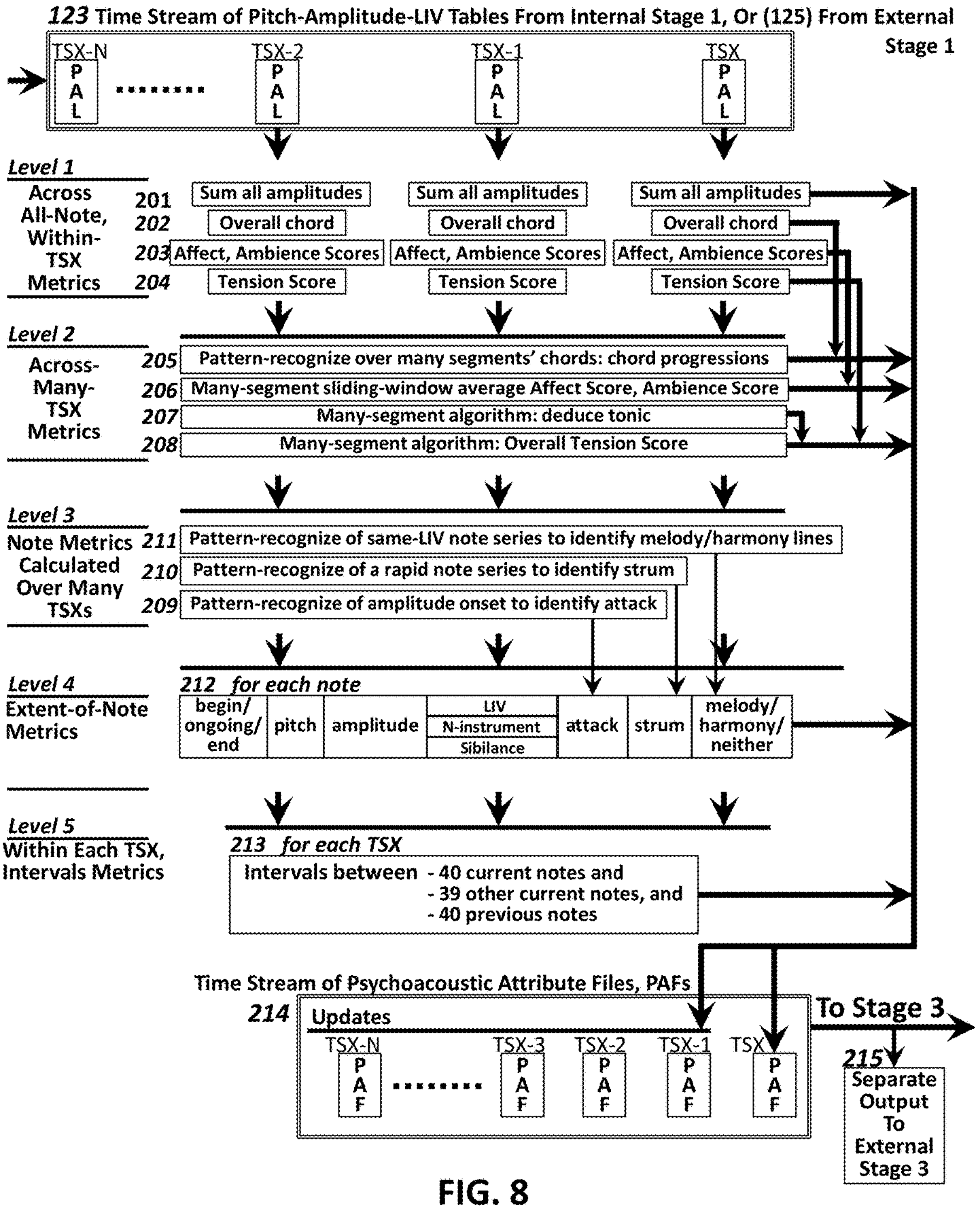
FIG. 8 is flow chart illustrating Stage 2 of the present process, in which a time stream of PAL tables are converted to a time stream of psychoacoustic attribute files (PAFs).

The second stage of the method is illustrated in FIG. 8. The purpose of the second stage is to take the output of Stage 1, i.e., a time stream of PAL tables 123, and convert it to a time stream of psychoacoustic attribute files, PAFs, 214. The format of a representative PAF is presented in FIG. 9.

In overview, Stage 2 analyzes the time stream of PALs to extract all the remaining cues to be used by the system, all cues other than pitch, amplitude and LIV. The input time stream of PALs can originate within the device (as 123), or from a different device separately acquired by the listener (as 125) such as a separately acquired MIDI file, or a Stage 1 output from a different system. Stage 2 is comprised of five levels, as follows:

Stage 2, Level 1

The first level of Stage 2 calculates across-all-note, within-TSX, metrics, of which there can be the following four, among others: 201: summing the amplitudes of all notes in a particular TSX to give a total TSX amplitude or volume; 202: calculating one or more chordal structures from frequency ratios; 203: assigning an individual affect score (i.e., an affect score for one TSX) based on factors such as pitch, tempo, key (i.e., major or minor), instrumentation, and an ambience score; and 204: assigning an individual tension score (i.e., a tension score for one TSX) based on several factors, including such as chord inversions and chord progressions, intervals, relationships between melody and harmony lines, relationships between multiple melody lines, relationships between current notes and the tonic, and volume. Each of the foregoing metrics is calculated for a single time segment TSX (cf. FIG. 8). The methods herein are not limited to those four metrics.

Processing in level 1 of stage 2 thus provides summed amplitudes, calculated chord structures, affect scores, ambience scores, and tension scores for each TSX analyzed. Other calculations in Stage 2, i.e., the calculations for levels 2 through 4, involve analysis of not only the current TSX but also a plurality of preceding TSXs. The number of preceding TSXs analyzed depends on the particular metric provided, as will be further described.

Stage 2, Level 2

The second level of stage 2 calculates across-many-TSX metrics of the musical piece, with four individual calculations performed using information obtained in level 1 of stage 2 for the current and preceding TSX segments, as follows. 205: Calculating a chord progression metric by using pattern recognition of the chord structure metric across successive TSX segments; 206: Calculating a time-streaming affect score from individual affect scores taken from successive TSX segments and calculating a time-streaming ambience score from individual ambience scores taken from successive TSX segments; 207: Deducing a tonic using an algorithm that reviews multiple TSX segments; and 208: Assigning a time-streaming tension score by combining individual tension scores obtained in 204 with the tonic identified in 207.

The metrics provided by the foregoing calculations, chord progression, time-streaming affect score, tonic, time-streaming ambience score and time-stream tension score, are calculated based on a sequence of preceding TSX segments through the current TSX, as noted above. The number of preceding TSX segments analyzed can vary with the metric calculated, such that n1 represents the number of TSX segments required to calculate chord progression, n2 the number required to calculate affect score, n3 the number required to deduce a tonic, and n4 the number required to assign a tension score. Each individual n value may be different for different musical pieces and/or different types of musical pieces. For instance, n4, the number of TSX segments required to assign tension score, will be much greater for a complex orchestral piece but much smaller for a short piano piece that is simple in structure. In fact, n4 can be adaptive to the musical piece as it progresses, as it is analyzed over time.

Stage 2, Level 3:

In the third level of stage 2, three note-oriented metrics are calculated over many TSX segments: attack 209, strum 210, and assignment to a melody or harmony line 211, if appropriate. In Level 3, each metric pertains to a single note. The attack of a note is identified by pattern recognition of its amplitude onset; the pattern of note onset includes speed of onset. Notes are identified as contained within a strum by pattern recognition of a rapid note series. For assignment of a note to a melody or harmony line, if appropriate, pattern recognition is based on a series of notes all having the same LIV, for example, a sequence of notes played by a violin, sung by a female voice, and the like. A note is typically assigned to a melody line if it is contained within a sequence of same LIV notes where that sequence fits into a typical melody pattern that can be inferred from relative pitch, relative amplitude, and, for a mix of voice and instruments, voice. The same reasoning is true for identifying harmony.

As in level 2 of stage 2, the number of TSX segments analyzed may be different for each metric, such that n5 represents the number of TSX segments required to calculate the attack pattern of a note, n6 is the number required to determine the presence of strum, and n7 the number required to assign a note to a melody or harmony line. It will be appreciated that n7 will typically be much higher than n5 and n6 since the melody and sometimes harmony may only become apparent over one to several seconds. As in level 2 of stage 2, n7 can be adapted to the musical piece as it progresses, as it is analyzed over time.

Stage 2, Level 4

As with level 3, the metrics determined in level 4 of stage 2 are note-oriented, 212. In level 4, a nine-element vector is created that characterizes each note with the following information: (1) the status of the note in each TSX, i.e., as beginning, continuing, or ending; (2) the pitch of the note; (3) the amplitude of the note; (4) the assigned LIV from the PAL data set; (5) N-instrument; (6) sibilance; (7) attack; (8) strum; and (9) melody/harmony/neither (characterization of a note as within a melody, within harmony, or neither). It is to be understood that the foregoing 9 elements are not the only ones that can be used to create a vector to characterize a note; other elements can be used in addition to, or in place of, those 9. Additionally, a satisfactory vector can be created with smaller numbers of elements, such as 6, 7, or 8.

There are other attributes that correspond to notes extending throughout a sequence of TSX segments that will be visually apparent solely from amplitude and frequency mapping of TSX data. These are tremolo, vibrato, and glissando, though as noted in Appendix B, those audio cues can also be enhanced by special visual cues. Though as described elsewhere, those audio cues can also be enhanced with special visual cues.

Stage 2, Level 5

In level 5 of stage 2, pitch intervals between notes are determined by: (1) the ratio of the two frequencies associated with two pitches of any two simultaneously played notes; (2) separately, for each note in a TSX, the note's pitch interval relationship to the last ended associated note. The data from this level is used to calculate several audio cues: chords, intervals, note sequences and transitional notes.

The information from all five levels of stage 2 is loaded into a current PAF, and updates previous PAFs as necessary, as indicated at the bottom of FIG. 8. The numbers in FIG. 8, i.e. "40 current notes, . . . 40 previous notes," are for example only, and in fact represent the upper limit of what would normally be called for.

A representative PAF format is presented in FIG. 9. The interval relationship of a note to each simultaneously sounded note and to the last ending note, calculated in level 5 of stage 2, is indicated in the lower part of the table. Both the representative PAL table format of FIG. 4 and the representative PAF format of FIG. 9 are general in nature, so that they can support a variety of perceptually conformal mapping systems. The numbers in FIG. 9 are also exemplary only. The number "20" for notes in FIG. 4 is also for example only; the numbering of FIG. 4 is not inconsistent with the numbering in FIGS. 8 and 9, but is not since FIG. 4 assumes a maximum of 20 notes at the same pitch.

The result of the calculations and determinations of stage 2 is a psychoacoustic attribute file that contains a full characterization of all psychoacoustic cues for the musical piece, in time order TSX by TSX. That is, each TSX segment has, at this point, an associated PAF. The PAFs for the entire musical piece are sequentially loaded, in real time, into a PAF sequence buffer.

The output of stage 2, i.e., the time stream 214 of PAFs, can be input directly into a stage 3 that is integrated into a single system containing both stage 2 and stage 3, or it may be provided as a separate output 215 to a consumer to be used in connection with a user-selected, separately acquired stage 3.

Stage 3

In stage 3, the PAF time stream 214 obtained as the output of stage 2 is converted into a visual display. That time stream can originate within the device (as 214) or from a different device separately acquired by the consumer (as 216). Stage 3, then, is where the mapping discussed previously occurs, taking the time sequence of PAFs and turning it into a signal to be fed into a visual display. As discussed earlier, different mappings may be applied for different types of music (e.g., different genres, voice versus instrumental, and the like) and for different types of displays (e.g., small screens versus JumboTrons, etc.). The selected audio-to-visual mapping algorithm is indicated at 303 in FIG. 1. As FIG. 1 also indicates, that mapping can be selected by an algorithm as indicated at 301 or that selection can be manually overridden by the user through a control device, as indicated at 302, e.g., if the user prefers a different mapping or different level of abstraction. A user can, for instance, use a remote control device to control not only mappings, but also the number of melody and harmony lines separately displayed, the amount of time displayed, time streaming options (right-to-left, right and left to center, center to right and left, etc.), and other aspects of the visualization. A representative perceptually conformal mapping system is described elsewhere herein, and alternatives to and variations of that mapping system will be apparent to those of ordinary skill in the art and/or can be arrived at using minimal experimentation.

FIG. 1 presents all three stages of the method, starting with the music source file and ending with the output of Stage 3 that is sent to the visual display. FIG. 1 also illustrates a particular aspect of updating, namely, that the updating of previous PALs (123) and updating of previous PAFs (214) have the effect of updating the visual cues in previous TSXs on the display (see also FIG. 10). That is, as the visual cues in earlier TSXs time-stream across the display (in FIG. 10, from right to left), those cues may be updated and so change. This feature mimics human music perception and takes into account the processing of the auditory information over time. For example, that part of the music that is the melody takes some seconds or fraction of a second to be recognized as such. The recognition applies to the melody sequence from its beginning. The same process applies to recognizing an instrument as, for example, a viola.

The operations of Stages 1, 2, and 3 are performed by a device having any one of a variety of configurations. For instance, the device can be a digital signal processing circuit inside in a consumer entertainment device or packaged in a separate housing. It can also be implemented in music processing devices for music producers and concert producers.

Figure 10:
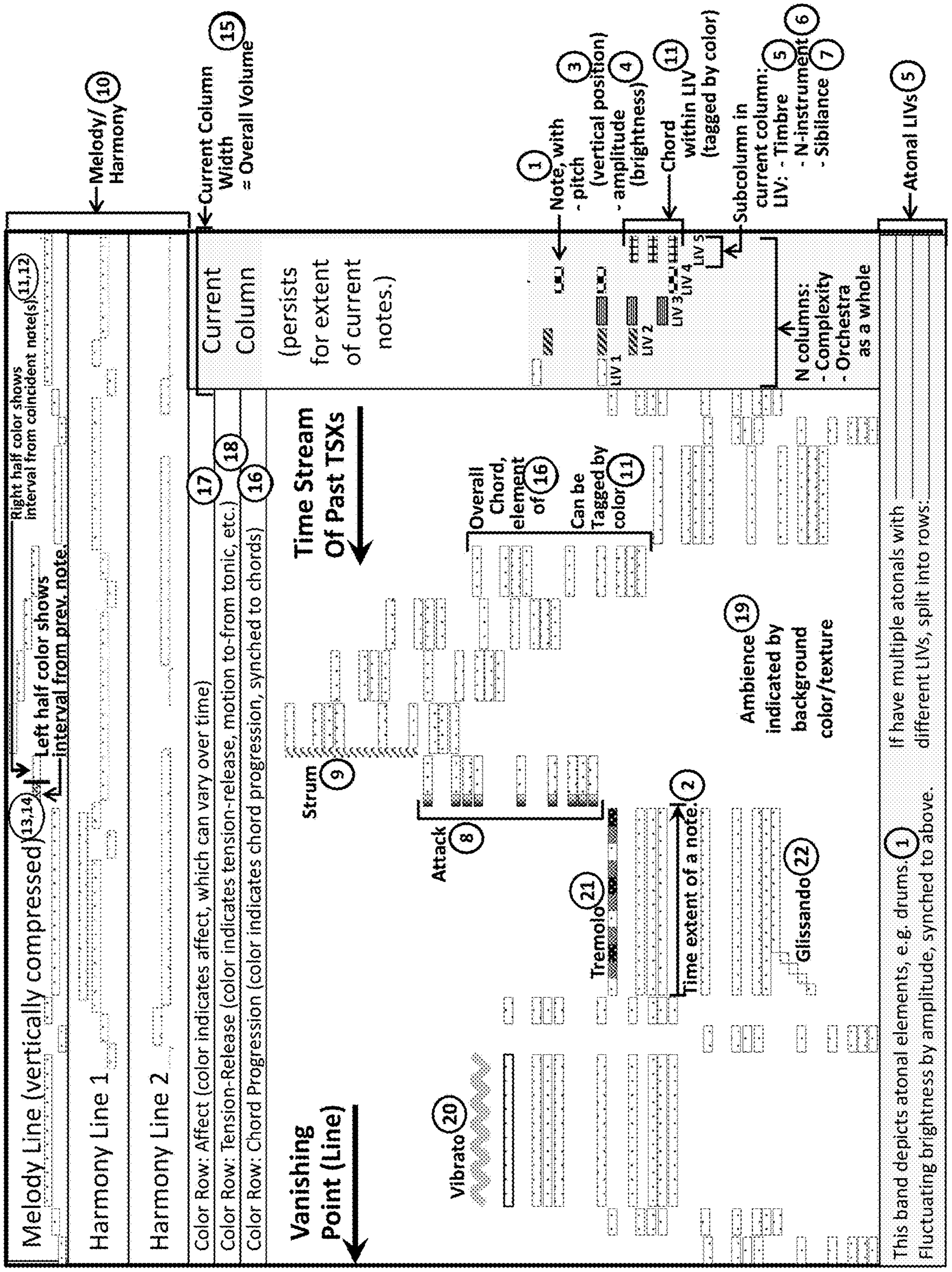
FIG. 10 provides a representative format of a visual display generated by the invention.

FIG. 10 schematically illustrates a representative display showing possible visual cues accompanying a segment of music; this example of a display shows how the visual cues described previously can be displayed. The circled numbers in FIG. 10 correspond to the cue numbering elsewhere herein (see Appendix B, for example).

The system can store information associated with a piece of music it processes, such that the music is stored along with the set of audio cues identified. Over time, the stored information can grow, e.g. at a market-wide scale, and ultimately be used as reference library that the system can query to find a particular piece of music or type of music. For instance, a consumer may wish to find a piece of music in a particular key with a particular affect played by a particular instrument, and can query the stored information in order to identify such a piece of music.

Applications

The method has several applications that do not depend on the real-time performance of a full implementation of all of the operations described herein. The system can be modified in one or more ways to reduce its overall computational burden, so that it may be made available to a variety of end users with different needs and/or expectations. Such modifications include, without limitation: capability of operating in real time, i.e., capability of processing as music is presented; operation at different levels of time resolution; sophistication of mapping; level of detail in voice/singer identification (e.g., female, generically, versus specific individual such as Taylor Swift or Marilyn Horne); level of detail in instrument identification (e.g., string instrument versus viola); sophistication of melody-harmony recognition; and sophistication of options offered to the user on a control device.

The various types of user can be placed in three categories: individual consumers; concerts; and commercial music producers. These applications are also discussed in Appendix A, where they are discussed from the perspective of their implications for called-for signal processing power. In the following, applications are discussed from the perspective of the implications of those markets for the intrinsically robust value of the device.

When targeting individual consumers, the device can be implemented at any of several price points. If it proves to be too expensive for some consumers to include real-time performance at a universally attractive price, then the system can be implemented in higher-cost versions for real-time performance, but also in lower-cost versions that provide simplified performance in real time, and/or in a two-pass mode, where the system can accept a music file and analyze it over an extended period of time, then store its analyzed file for playback synchronized with the music at any later time chosen by the consumer. The two-pass mode offers the opportunity for enhanced performance by allowing the system to preview the entire piece, and make adjustments regarding amplitude range, pitch range, LIV identification, melody-harmony divisions, chord progressions, affects and tensions, where those adjustments can only be made less effectively in a real-time mode.

Concert performances can preferentially employ a high performance version of the method and system so as to generate high performance in real time. In addition, there are several aspects of concerts that make the music cue extraction tasks much easier: LIV identification can be fully accomplished simply by separate microphone connections, including the specification of N voices or musical instruments versus single ones; melody-harmony divisions can be specified by a combination of microphone connections and real-time manual adjustments; chord progressions, affects and tensions can be specified by algorithms but also supplemented by real-time manual adjustments; and amplitude ranges and pitch ranges can be set in rehearsal. In an alternative embodiment, different instruments playing together may each be operatively connected to their own system, each including a separate display, such that each instrument's music is visualized simultaneously on different displays. In addition, concert producers can broadcast a PACO Track signal to the audience members' personal mobile devices (with PACO referring to psychoacoustic color organ). That PACO Track can either allow the audience member to select among alternative mappings, and/or it can directly feed to the audience member's personal mobile device display.

In the area of commercial music production, music producers can generate a "PACO Track" added to CDs, DVDs, MP3 files and any other form to accompany the music (in a synchronized manner), where the only consumer-side device called for is one that translates that track into input for consumer visual display devices, in formats such as HDMI, VGA and RGB. That PACO Track would be generated in studio mode, working on the recorded music, and so would effectively be in a two-pass mode. It could either replace Stages 1, 2 and 3 as described in this operations section and so generate complete outputs in the formats listed, or it could optionally provide an output, or an additional output, from Stage 2, and so generate an output that calls for a Display Loader stage (Stage 3), which could leave the consumer the option of purchasing and using a remote control that would allow him or her to vary display parameters to his or her liking. Music production can involve economics such that a very high performance version of the device can be used. In addition, as mentioned, that device doesn't need to perform in real time. In addition, all of the advantages for cue extraction listed above for concerts apply to an even greater degree in the studio environment.

Commercial music production ("PACO Tracks") and concerts provide mechanisms for sequential market development in that those markets can lead to consumer demand for consumer units. PACO tracks that do not allow for consumer adjustment in the display, i.e., that replace Stages 1, 2 and 3 and feed directly to consumer displays such as flat screens, can lead to consumer demand for PACO tracks that only replace Stages 1 and 2 and so allow for consumer adjustment through consumer control units.

Commercial music production and concerts additionally provide the opportunity for specialized "individually tuned" audio-to-visual cue mapping that makes each musical piece appear in an especially compelling visual form. While it is understandable that music producers and concert producers may want to generate the most compelling display possible tuned to each particular musical piece, it should be recognized that one advantage of the device is the development of as few market-wide mappings as may be most effective, since those few mappings would allow consumers to most easily understand the visual display of any piece of music, and understand more complex versions of visual displays than would be possible if, in the extreme, every piece of music had its own unique mapping. That would encourage music producers and concert producers to use as few standardized mappings as possible, so that consumers/audiences can most easily understand the displays. That in turn suggests a role for music-industry-wide publication of audio-to-visual cue mapping standards.

In addition, the home unit can look up on the Internet and download a "PACO Track" (explained further hereinbelow) prepared by music producers and/or uploaded by anyone who has developed a PACO Track in a public posting paradigm. That PACO Track can include the output of Stage 2, i.e. a time stream of PAF files, so that all the home unit has to do is perform the function of Stage 3, and translate that time stream into input for consumer visual display devices, which gives the consumer the option of selecting among alternative mappings. The PACO Track can also include a Stage 3 output, providing complete output for direct feed into consumer visual display devices.

A key implication of the various applications just discussed, and other aspects of the device, is that the device has intrinsically robust value. Its fundamental value lies in its key concept of mapping from the auditory domain to the visual domain at the level of psychoacoustic cues, including the concept of perceptually conformal standardized mapping. As explained herein, the invention includes a number of embodiments, some of which are versions of the present method and system at different levels of technical advancement. There are, as also explained, a number of different markets for those different versions, and those markets can interact to have the effect of a system of sequential market development. By its very nature, the device can exploit and even partially guide the current rapid pace of technological development in signal processing. It will also be appreciated that the ready modification of the system for different end uses enables manufacture of other embodiments such as developer and research versions. In the latter case, it will be appreciated that the present invention can serve as a platform for scientists and others conducting research in the field of psychoacoustics.

In another embodiment, the system can be implemented in a method for assisting hearing impaired individuals, including deaf individuals, in fully experiencing and thus appreciating music, by providing a perceptually conformal visual representation of music that those individuals may not hear or may hear to only a limited extent. In this embodiment, it may be desirable to use more visual cues than would be used for a hearing person to enhance the perception of musical detail such as, for instance, text and/or icons associated with certain notes (e.g., explaining that those particular notes are sung by a "female voice" or played by a guitar or saxophone icon or the like, or actual lyrics) or notes on a musical staff.

In an additional embodiment, the system can be used as a rehearsal aid or a music training aid, such that musicians would strive to mimic the ideal visual representation of a musical piece.

The technology thus provides a method and system for allowing a listener/viewer to experience music acoustically and visually in a perceptually conformal manner, where the method and system essentially induce and simulate a synesthetic experience of perceiving music in two perceptual modes in the user. The method applies a perceptually conformal mapping system that is preferably adaptable during use, and provides visual cues corresponding to an optimized number of audio cues in a piece of music that are selected for mapping. Perceptually conformal visualization of music at any level of complexity is enabled, with optimal mappings empirically determined such that aspects of any particular perceptually conformal mapping system can be adapted before, during or after application to a particular piece of music.

Computer Implementation

The computer functions for manipulations of audio data, and causing representations of the same to be displayed on a screen, can be developed and implemented by a programmer or a team of programmers skilled in the art, particularly those familiar with techniques of digital signal processing. The functions can be implemented in a number and variety of programming languages, including, in some cases mixed implementations. For example, the functions can be programmed in programming languages including but not limited to: FORTRAN, C, or TurboPascal. Other programming languages may be used for portions of the implementation such as scripting functions, including Prolog, Pascal, C, C++, Java, Python, VisualBasic, Perl, .Net languages such as C#, and other equivalent languages not listed herein. The capability of the technology is not limited by or dependent on the underlying programming language used for implementation or control of access to the basic functions. Alternatively, the functionality could be implemented from higher level functions such as tool-kits that rely on previously developed functions for manipulating audio and graphics data.

The technology herein can be developed to run with any of the well-known computer operating systems in use today, as well as others not listed herein. Those operating systems include, but are not limited to: Windows (including variants such as Windows XP, Windows95, Windows2000, Windows Vista, Windows 7, and Windows 8, Windows Mobile, and Windows 10, and intermediate updates of any thereof, available from Microsoft Corporation); Apple iOS (including variants such as iOS3, iOS4, and iOS5, iOS6, iOS7, iOS8, and iOS9, and intervening updates to the same); Apple Mac operating systems such as OS9, OS 10.x (including variants known as "Leopard", "Snow Leopard", "Mountain Lion", and "Lion"; Android operating systems; the UNIX operating system (e.g., Berkeley Standard version); and the Linux operating system (e.g., available from numerous distributors of free or "open source" software).

To the extent that a given implementation relies on other software components, already implemented by others, such as functions for manipulating audio data, and functions for manipulating images on computer displays, those functions can be assumed to be accessible to a programmer of skill in the art.

Furthermore, it is to be understood that the executable instructions that cause a suitably-programmed computer to execute the methods described herein, can be stored and delivered in any suitable computer-readable format. This can include, but is not limited to, a portable readable drive, such as a large capacity "hard-drive", or a "pen-drive", such as removably connects to a computer's USB port, an internal drive to a computer, and a CD-Rom or an optical disk. It is further to be understood that while the executable instructions can be stored on a portable computer-readable medium and delivered in such tangible form to a purchaser or user, the executable instructions can also be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

The technology herein may be implemented as a stand-alone application program that runs on a user's computer or mobile device, or may be run from within a web-browser as a plug-in equivalent technology, or may be downloadable to a user's mobile device and run as an application program ("app"). In each form of implementation, the technology is configured to accept an audio input from some source.

If launched from within a web-browser, the browser is not limited to a particular version or type; it can be envisaged that the technology can be practiced with one or more of: Safari, Internet Explorer, Edge, FireFox, Chrome, or Opera, and any version thereof.

Computing Apparatus

Figure 12:
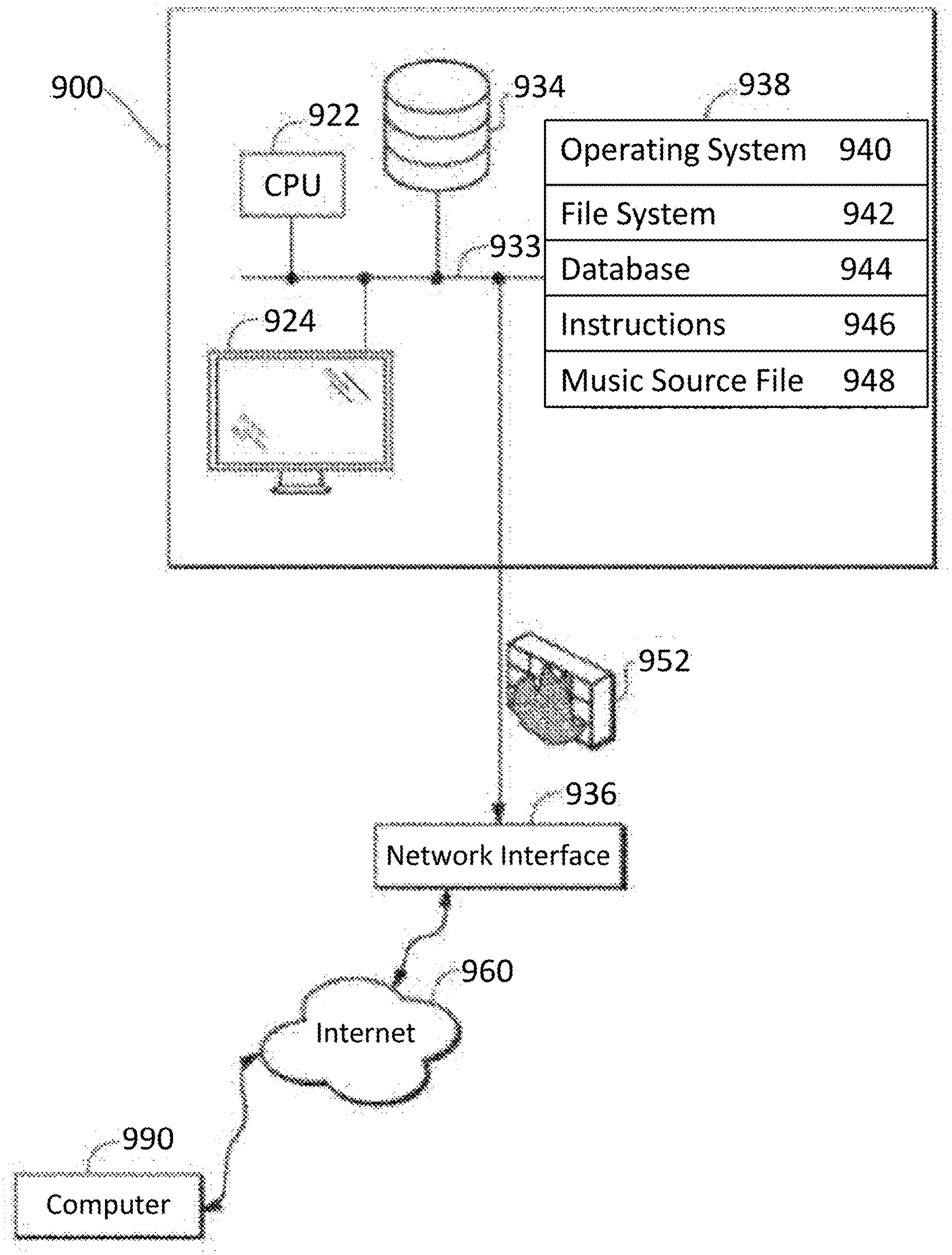
FIG. 12 shows a schematic computer implementation.

An exemplary general-purpose computing apparatus 900 suitable for practicing the methods described herein is depicted schematically in FIG. 12. Such a computer apparatus can be located in a user's home or workplace, or in their car, or can operate in a public place such as a concert hall, transportation hub, item of transportation, or other public building.

The computer system 900 comprises at least one data processing unit (CPU) 922, a memory 938, which will typically include both high speed random access memory as well as non-volatile memory (such as one or more magnetic disk drives), a user interface, a display 924, one more disks 934, and at least one network or other communication interface connection 936 for communicating with other computers over a network, including the Internet, as well as other devices, such as via a high speed networking cable, or a wireless connection. There may optionally be a firewall 952 between the computer and the Internet. At least the CPU 922, memory 938, user interface 924, disk 934 and network interface 936, communicate with one another via at least one communication bus 933.

CPU 922 may optionally include a graphics processing unit (GPU), optimized for manipulating graphical data.

Memory 938 stores procedures and data, typically including some or all of: an operating system 940 for providing basic system services; one or more application programs, such as a parser routine and a compiler (not shown in FIG. 12), a file system 942, one or more databases 944 that may store mapping functions and other information, and other instructions 946 for carrying out the methods herein. Memory 938 may also store a music source file 948 (or more than one such file) that is being converted to a visual representation by methods herein. Computer 900 may optionally comprise a floating point coprocessor where necessary for carrying out high level mathematical operations such as fast Fourier transforms. The methods of the present invention may also draw upon functions contained in one or more dynamically linked libraries, not shown in FIG. 12, but stored either in memory 938, or on disk 934.

The database and other routines shown in FIG. 12 as stored in memory 938 may instead, optionally, be stored on disk 934 where the amount of data in the database is too great to be efficiently stored in memory 938. The database may also instead, or in part, be stored on one or more remote computers that communicate with computer system 900 through network interface 936.

Memory 938 is encoded with instructions for receiving input from one or more sources of music and for calculating a conformal mapping from an audio input. Instructions further include programmed instructions for performing one or more of converting audio signals into graphical formats, and causing various graphical objects to be displayed. In some embodiments, the calculations themselves are not carried out on the computer 900 but are performed on a different computer and, e.g., transferred via network interface 936 to computer 900.

Various implementations of the technology herein can be contemplated, particularly as performed on computing apparatuses of varying complexity, including, without limitation, workstations, desktop computers such as PC's, laptops, notebooks, tablets, netbooks, and other mobile computing devices, including cell-phones, mobile phones, media players, wearable devices such as smart watches and fitness monitors, and personal digital assistants.

Thus the display screens on which the visual representation of music is displayed can be the display screen of any of the afore-mentioned computing devices including flatscreens of mobile computing devices, and displays of wearable devices where—for example—the display may be a flexible material included within the fabric of a garment, as well as objects found in the home such as networked photo frames, gaming consoles, streaming devices, and devices considered to function within the "Internet of Things" such as domestic appliances (fridges, etc.), and other networked in-home monitoring devices such as thermostats and alarm systems. The display screens can also be found in modes of transportation such as aircraft (such as in seat-back and overhead displays), as well as in cars.

Further, the visual display used in connection with the present method and system can be a liquid crystal display (LCD), a plasma display, an electroluminescent display such as an OLEO, or a combination of two or more flatscreens, a JumboTron, a projection device for home, theater, or concert use, or laser shows. The display may be adapted to supertitle formats, e.g., scrolling panels above a stage for use in concerts and theaters. Home display formats for the display include HDMI, VGA, RGB, and others. It is also envisioned that two or more types of displays can be used simultaneously, e.g., a concert that includes a large multiple-flatscreen display or JumboTron display on or near the stage, with synchronized displays on personal mobile devices held by audience members. Those individual displays can be driven by a signal transmitted by the concert producers (either a ready-to-display signal or representing the output of an intermediate step of the present method, such that each member of the audience can choose the display mapping) or driven by each audience member's own system operating in real time. Three-dimensional displays, such as holographic, projection-based, or used in conjunction with iMAX movies, are also possible.

The resolution of the display is preferably as high as possible, but the present method and system can accommodate lower resolution displays as well. The perceptually conformal mapping system can be adapted for different displays depending on both resolution and size. The optimized number of cues selected for mapping will generally be higher for larger displays and lower for smaller displays, in which the likelihood of overcrowding the display with too many visual cues is higher. A lower resolution display, similarly, will typically call for fewer visual cues.

The computing devices can have suitably configured processors, including, without limitation, graphics processors, vector processors, and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer.

Control of the computing apparatuses can be via a user interface, which may comprise a display 924, mouse, keyboard, and/or other items not shown in FIG. 12, such as a track-pad, track-ball, touch-screen, stylus, speech-recognition, gesture-recognition technology, or other input such as based on a user's eye-movement, or any subcombination or combination of inputs thereof. Additionally, implementations are configured that permit a user to access computer 900 remotely, over a network connection, and to view the visual depiction of music via an interface having attributes comparable to display 924.

The interface may comprise a microphone input for accepting musical sounds for processing. Music, in the form of a data file, may also be introduced into computer 900 via network interface 936 as well as via a plug-in memory stick or other media.

In one embodiment, the computing apparatus can be configured to restrict user access, such as by scanning a QR-code, or requiring gesture recognition, biometric data input, or password input before the visual display is started.

The manner of operation of the technology, when reduced to an embodiment as one or more software modules, functions, or subroutines, can be in a batch-mode—as on a stored database of audio data, processed in batches, or by interaction with a user who inputs specific instructions for a single piece of music.

The results of converting audio data to visual form, as created by the technology herein, can be displayed in tangible form, such as on one or more computer displays, such as a monitor, laptop display, or the screen of a tablet, notebook, netbook, or cellular phone. The results can further be stored as electronic files in a format for saving on a computer-readable medium or for transferring or sharing between computers, or projected onto a screen of an auditorium such as during a presentation.

ToolKit: The technology herein can be implemented in a manner that gives a user access to, and control over, basic functions that provide key elements of audio to visual conversion. Certain default settings can be built in to a computer-implementation, but the user can be given as much choice as possible over the features that are used in assigning inventory, thereby permitting a user to remove certain features from consideration or adjust their weightings, as applicable.

The toolkit can be operated via scripting tools, as well as or instead of a graphical user interface that offers touch-screen selection, and/or menu pull-downs, as applicable to the sophistication of the user. The manner of access to the underlying tools by a user is not in any way a limitation on the technology's novelty, inventiveness, or utility.

Accordingly, the methods herein may be implemented on or across one or more computing apparatuses having processors configured to execute the methods, and encoded as executable instructions in computer readable media.

For example, the technology herein includes computer readable media encoded with instructions for executing a method for visualizing a piece of music on a display screen as the music is being played, wherein the instructions comprise instructions for: establishing a mapping system, by: selecting a number of audio cues from a set of audio cues, wherein each audio cue represents a distinct acoustic element of the piece of music, and the number of audio cues is optimized with respect to the complexity of the piece of music and the size and the resolution of the display screen, and wherein the audio cues comprise at least one cue selected from: a group of simultaneously played notes (chords), intervals, note sequences and transitional notes; and assigning a different visual cue to represent each selected audio cue in a manner that provides one-to-one correspondence between each selected audio cue and each visual cue; extracting the selected audio cues from the piece of music as it is being played, and converting the extracted audio cues to the corresponding visual cues in the mapping system; and displaying the visual cues on the display screen as the piece of music is being played, so that one or more persons sees the corresponding visual cues at the same time that they hear the piece of music.

Correspondingly, the technology herein also includes a computing apparatus for visualizing a piece of music on a display screen as the music is being played, wherein the system comprises: a music source; a display screen; a memory; and a processor, wherein the processor is configured to execute instructions stored in the memory, and wherein the instructions comprise instructions for: establishing a mapping system, by: selecting a number of audio cues from a set of audio cues, wherein each audio cue represents a distinct acoustic element of the piece of music, and the number of audio cues is optimized with respect to the complexity of the piece of music and the size and the resolution of the display screen, and wherein the audio cues comprise at least one cue selected from: a group of simultaneously played notes (chords), intervals, note sequences and transitional notes; and assigning a different visual cue to represent each selected audio cue in a manner that provides one-to-one correspondence between each selected audio cue and each visual cue; extracting the selected audio cues from the piece of music as it is being played, and converting the extracted audio cues to the corresponding visual cues in the mapping system; and displaying the visual cues on the display screen as the piece of music is being played, so that one or more persons sees the corresponding visual cues at the same time that they hear the piece of music.

Cloud Computing

The methods herein can be implemented to run in the "cloud." Thus the processes that one or more computer processors execute to carry out the computer-based methods herein do not need to be carried out by a single computing machine or apparatus, such as being used or worn by the user. Processes and calculations can be distributed amongst multiple processors in one or more datacenters that are physically situated in different locations from one another. Data is exchanged with the various processors using network connections such as the Internet. Preferably, security protocols such as encryption are utilized to minimize the possibility that consumer data can be compromised. Calculations that are performed across one or more locations remote from the user include calculation of graphical forms.

While the invention has been described in connection with specific embodiments of the methodology and system, that description is intended only to illustrate and not limit the scope of the invention. Based on the foregoing description, publicly available texts, documents, and literature, and on the inherent knowledge of individuals skilled in the art, such individuals will recognize other embodiments as well as modifications and/or improvements, and such embodiments and modifications and/or improvements are also intended to be within the scope and spirit of the invention.

APPENDIX A

Aspects of Each Specific Implementation, which Affect which Mappings are Most Effective.

Six Aspects

There are six aspects in the device's signal processing where different values within each aspect, in fact the set of those six values, call for different mappings, again to maximize effectiveness, which involves maximizing the use of the visual perceptual BW:

Aspect 1: Source Complexity. This has already been described herein, in connection with bandwidth management and the manner in which individuals perceive music.

Aspect 2: Genre, e.g., choral, jazz, Country Western, classical, etc. Genre can be defined more tightly, e.g., a given performing group, or as unique to each particular musical piece. That is, the term genre is used here to represent all aspects of a musical piece that can affect which cue-to-cue mappings are more effective, while at the same time retaining the flexibility of a system where different users can have different mappings they regard as more effective. Each different genre has more-effective subsets of audio-visual cue-to-cue mappings, with those subsets varying among users.

Aspect 3: Signal Processing Power called for. The device has five operational, implementation modes, each with its own signal processing requirements, and so each with different implications for the most effective mapping.

Before listing those modes, it is noted that each mode involves the generation of a "PACO Track" which is, as explained elsewhere, a time stream of Psychoacoustic Attribute Files (PAFs), which can then be mapped into the visual display with mappings adjustable by the user, though with default values set by the music or concert producer, or by the manufacturer of the device. Generating the time stream of PAFs from the music represents the bulk of the signal processing involved. The mapping from PAFs to the visual display is straightforward and can be done in real time with minimal signal processing power, which can be made inexpensively available in home units and personal digital devices.

Aspect 3.1. Music Producer: The music producer has a very long time to process the signal, can adjust the mapping to be most effective using music appreciation specialists, and can use high-cost signal processing components, in order to produce a PACO track to accompany the audio signal. That PACO track can then be marketed paired with the audio music file.

Aspect 3.2. Concert Producer: Has a very long time, in rehearsal, to develop the best mapping, and can use high-cost signal processing components. Though the concert format requires real-time processing, the most difficult part of that processing, the discrimination of different voices and instruments, is (at least partially) handled by the different mic-instrument cords or signal transmissions into the mixer. The stage setup can include both a large visual display and broadcasting a PACO track to be received by personal digital devices held by audience members.

Aspect 3.3. Home Look-Up: Here the home unit, upon receiving a commercial music piece, looks up and downloads the corresponding PACO track through the Internet. While that involves some delay the first time the home user loads a music file, that PACO track can be stored for all future playbacks of the music piece. Depending on market development, there may be alternative PACO tracks available on the Internet, in which case the user can choose among them. This mode has the same considerations for effective mappings as does the Music Producer mode.

The last two implementation modes involve a home unit performing the music-to-PAF-stream operation itself.

Aspect 3.4. Home Two-Pass: Here the home unit, upon receiving a musical audio file, performs the signal processing to generate a PACO track, performing that at a speed more slowly than real time. The user loads the music, then waits for a time before playing the piece with the visual display. Once that PACO track is generated it is stored, paired with the audio track for any future use. The slower signal processing allows for better signal processing for any given consumer price, relative to Home One-Pass:

Aspect 3.5. Home One-Pass: Here the home unit, upon receiving a musical audio file or streaming input, performs the signal processing to generate a PACO track in real time, i.e., "keeping up with" the speed of presentation of the musical piece, perhaps with a slight delay (to enable parallel processing) then with the musical audio file audio output also delayed by the same amount, to maintain time synchronization.

Aspect 4. Size and Effective Resolution of the Display: What matters here is the image on the retina, and so is a function of distance to the viewer, which we here incorporate into the term effective resolution. Clearly, higher size-effective-resolution displays can depict more visual information, and so differing size-effective-resolution displays will call for differing cue-to-cue mappings to be most effective. The range is quite large, ranging from small cell phone displays to the home user who invests in four or even six flatscreens arrayed on a wall, with large concert displays within that range.

Aspect 5. User Experience and Special Needs: This aspect captures the general skills and needs of the user, not adjusted for any particular piece of music. As a user gains experience in viewing the device, (s)he can make more effective use of the visual display, and so can make use of and enjoy more complex visual mappings, much like differences in performance levels in some video games. So users can be given the option of setting display complexity to reflect their experience. In addition, the user may have special needs, for example he may be hearing impaired. For hearing impaired users, the display can be modified to include, for example, icons or names of singers or instruments, those labels applied to different notes or bands of the display (see Cues 5 and 10).

Aspect 6. User Preference: This aspect captures adjustments the user may want to make specific to a particular playing of a particular piece of music. Even with the device set to a user's experience level, he may want to choose more or less complex displays and so mappings, from the maximally complex to much less complex, more "abstract" displays and so mappings. The user may want to increase his skill level, and so temporarily set the device to above his experience level. Settings could include for example "Abstract," "Party," and "Maximal."

Reviewing the Six Aspects: Aspects 1 through 4 can be set to their values by the device system, while Aspect 5 can be set to its value by a combination of user-specific system experience and user input, while Aspect 6 can be set to its level by the user.

Implications of Those Six Aspects

The ability of the device to select from a range of mappings is critical to its functioning in the range of implementations defined by the six aspects. The relationships among the six aspects of implementation and the mapping employed by the device are presented in FIG. 11.

APPENDIX B

The Mapping System

Requirements for the Mapping System

The Mapping System presented here was developed to meet two requirements: Requirement 1: must provide the opportunity to make the most effective use of the visual perception space. Requirement 2: must provide the opportunity to flexibly and effectively accommodate all plausible sets of values of the six aspects of Appendix A and Figure X.

To that end, requirement 1 can be subdivided into two parts. In Requirement 1a, all visual cues are selected from a very broad vocabulary of cues, described in terms of six categories of cue descriptors, listed herein. This is another aspect of the bandwidth concept described elsewhere herein. Again, that bandwidth is not in terms of physical bits per second—it is in terms of what the user can perceive and comprehend in the display. So the vocabulary of visual cues used here is designed to exploit patterns of human visual perception, in particular: spatial position and extent, at the scale of lines, icons (with or without borders), bands or regions of the display including the borders, sizes and shapes of those icons, bands and regions, and their color (hue, saturation, shimmer and iridescence), brightness, patterns, textures, time streaming (explained below), and time variation-fluctuation. In Requirement 1b, each visual cue is described in terms of its metric scale, which is selected to be as representative as is effective of the metric scale of the audio cue from which it is mapped.

The net effect of Requirements 1 and 2 is a quite large set of alternative mappings. That is a natural consequence of the richness of the space of all musical experiences that the device is to be applied to. In a very real sense, music is a "language" with an extremely large range of what could be called "phonemes" or a musical analog to language phonemes, each of which is perceived and appreciated in ways that vary enormously. During research and development, it has been found that this large a set of visual cue vocabularies, structured as presented here, is called for, since music varies over such a wide range in Aspects 1 (complexity) and 2 (genre), where in fact genre can be classified down to the level of separate pieces of music, then Aspects 3, 4, 5 and 6 lead to a quite large set of possible implementation cases. The net effect is that the very large set of visual cue vocabularies presented herein is desirable for the effective implementation of the device.

Basic Elements of the Visual Vocabularies of the Mapping System

Described herein are alternative mappings that can be applied by the device. The listing is based on 22 specific audio cues central to the perception and appreciation of music. There are possible audio cues other than those 22, but the 22 are the cues identified here. The 22 cues herein are adequate for the effective functioning of the device. While many different mappings are called for in the several implementations of the device, all of those mappings are mappings from those 22 audio cues or subsets of those cues. The alternative mappings described here, then, are alternative visual cues to be mapped into from those 22 audio cues or subsets of those cues. For clarity, in this Appendix, the names of the 22 audio cues will be capitalized, and in some cases referred to by number, e.g., cue 10.

The alternative mappings are described in terms of alternative vocabularies of visual cues, i.e., for each audio cue, we specify a vocabulary of visual cues into which that audio cue can be mapped.

The listing herein is not a complete listing of all possible visual cue vocabularies in terms of all possible combinations. The visual cue vocabularies presented herein are a subset of all possible vocabularies, that subset selected to be a set of effective vocabularies, not all possible vocabularies.

The various visual cues are described within the following logical structure: 1.) six visual cue categories; and 2.) a standard list of visual cues, that list applied five different ways.

Six Visual Cue Categories

The alternative visual cues are themselves selected from six visual cue categories, as follows:

1.) Display-scale spatial: The vertical position and extent on the display, and the horizontal position and extent on the display. That extent can extend to regions of the display including bands across the display (e.g. to depict different Timbres and Melody-Harmony-Percussion Lines), to the entire background of the display and to frames surrounding the display, e.g., to depict Ambience.
2.) Smaller-scale spatial: Shapes, lines, borders (varying in thickness, styles and colors), patterns and textures, at the scale of icons or small regions of the display, including borderless icons. Icons can vary in size. Smaller-scale regions and icons can extend over individual Notes (which can be modified by any of the visual cues mapped from any of the audio cues listed here except Overall Volume and Ambience) and the sets of Notes that are being represented by the visual cue, including Strums, Chords, Intervals, Note Sequences, Glissandos and Chord Progressions.
3.) Color, including hue, saturation, shimmer and iridescence.
4.) Brightness.
5.) Time streaming: A pattern of visual cues appearing at a point, points, line or lines of the display, then streaming toward a vanishing point, points, line or lines of the display, that streaming not necessarily spatially linear in time. For example, that streaming can compress (spatially per second) as the cues progress toward the vanishing point, even to the extent of never actually vanishing.
6.) Fluctuation with time: Any of the visual cues can include fluctuation with time. For example smaller-scale spatial cues can include an icon fluctuating vertically to depict Vibrato (Cue 20), or fluctuating in brightness to depict Tremolo (Cue 21).

A Standard List of Visual Cue Elements, that List Applied Five Different Ways.

Each audio cue can be taken in turn, with a vocabulary of visual cues that it can be mapped into. Those vocabularies include several different cues, but among those cues is a list of visual cues that is cited repeatedly over several audio cues. It is comprised of the following visual cues ("list (a)"): Brightness, size, shape, border (its thickness, style and/or color), color, pattern, texture, gradients in color, pattern or texture, and/or fluctuations with time.

That list of cues is applied five different ways. Four of those versions are nominal metrics, i.e., a label with no direction for "more." The fifth version is an ordinal metric, i.e., a value on a continuous scale with a direction for "more," where the ordinal value of the visual cue is mapped into from the ordinal value of the audio cue with a function that is monotonic, non-linear, linear, ratio, or logarithmic. Presenting those five versions, list (a) visual cues can be applied to characterize:

Version 1, Nominal: a Note icon to depict an audio cue or cues characterizing that Note. Examples include Timbre, Sibilance, Attack, Strum and Chord.

Version 2, Nominal: a connecting line, border, band, shape or region characterizing a set of Notes by a set-of-Notes audio cue. Examples include Strum and Chord.

Version 3, Nominal: a line, border, band, shape or region characterizing a set of Notes by a set-of-Notes audio cue as in Option 2, except with that line, border, band, shape or region separated from that set of Notes, aligned with that set in Time Extent and/or Pitch. For example, with horizontal time streaming, Chord Progression can be indicated by a horizontal band at the bottom of the display, aligned in time with the Time Extent of the Chord progression.

Version 4, Nominal: a line, border, band, shape or region characterizing a set of Notes by a set-of-Notes audio cue as in Option 3, except with that line, border, band, shape or region separated from that set of Notes and not aligned with that set in Time Extent and/or Pitch. For example, Chord Progression can be indicated by a visual cue or cues characterizing a region in a corner of the display.

Version 5, Ordinal: an ordinal quality of any of the audio cues that have an ordinal quality. Examples include Note Amplitude, degree of Sibilance, and strength of Attack. All of the List (a) visual cues can be used to depict an ordinal quality. Some of those are obvious, e.g. brightness, size and border thickness. Others are less obvious. Examples include: shape can vary continuously from a circle to a star, a border style can vary from solid to increasingly smaller dashes, color can vary in hue, saturation, shimmer and iridescence, pattern can vary in density, texture can vary in roughness, gradient can vary in steepness and fluctuation with time can vary in magnitude and/or frequency.

Note that the structure of this description of vocabularies of visual cues includes several instances where an audio cue can be mapped into more than one visual cue. For example, a Strum can be depicted both by a modification of the icons of the Notes comprising the Strum and also by a localized marked region surrounding those Strum notes. More generally, a display can present multiple visual cues for the same audio cue, in any combination of the five different ways.

The basic elements of the visual vocabularies of the mapping system presented herein do not fully specify the visual cue vocabularies to be used for each of the 22 audio cues. That full specification is presented in the following section.

Visual Cue Vocabularies

The 22 subsections of this section take each audio cue, in turn, and describe visual cues that it can be mapped into. Note that the cues are not mutually exclusive. For example the first cue, Cue 1, Note, may be an icon modified by any visual cues mapped to from any of the other audio cues, Cues 2 through 22. Also, in some cases what is discussed here as a cue is in fact a category of cues. For many types of music it is unlikely that all 22 audio cues would be mapped. But these 22 cues comprise a vocabulary of cues from which a subset of cues will be selected for mapping. Each section is separated into descriptions of the audio cue, then metric considerations, then the visual cue vocabulary into which that audio cue can be mapped.

By metric (mentioned previously in Requirement 1b) is meant the metric aspect of the visual cue as it depicts its corresponding audio cue. Metrics used here range over the set: icon, region of the display, binary (i.e., the audio cue is either there or it is not there, e.g. Sibilance), nominal (a label with no order, e.g. Timbre), and ordinal (any audio aspect where there is a "more," varying continuously, e.g. amplitude or volume, degree of Sibilance, strength of Attack, degree of Vibrato or Tremolo) where ordinal metrics can be at any of five levels: monotonic, non-linear, linear, ratio and logarithmic scales. By non-linear is meant, here, a mathematical relationship deviating from linear in a continuous and itself monotonic way, for example, on the time dimension, linear except compressed with increasing time versus distance in a regular way as time increases. For each audio cue, only one or some visual cues and one or some metrics will be effective, and only those visual cues and metrics will be listed.

In the following, whenever a visual cue is mentioned, the descriptions of the six visual cue categories listed herein apply. For example, whenever color is mentioned, that color can vary over hue, saturation, shimmer and iridescence.

Cues 1-8 pertain to characteristics of a note. For each cue, an exemplary metric, and visual cue vocabulary are offered.

Audio Cue 1. Note

Metric: Icon, region of the display, or incorporated into a visual cue depicting, e.g. the Strum, Melody-Harmony Line, Chord, Interval, Note Sequence, Transitional Note, Chord Progression, Affect, Tension-Release Pattern, Vibrato, Tremolo, or Glissando of which it is a part. By icon is meant a symbol of any sort, either with or without a border.

Visual Cue Vocabulary: A Note may be visually depicted as an icon (with or without a border) that can be modified by visual cues reflecting any of the audio cues listed in this section except Overall Volume and Ambience. For example, a Note icon may be a rounded rectangle on the display, placed horizontally according to its start and stop times (then time streamed as described above), sized ("stretched") to match its time duration, placed vertically according to its Pitch, with brightness or size according to its Amplitude, with shapes, lines, borders, patterns, textures, colors, sizes and time fluctuations to depict other cues associated with the Note. A Note without tonal Pitch, e.g. percussive hit, may be assigned to a separate region on the display.

Audio Cue 2. Time Extent of a Note, Strum, Chord, or any Other Audio Cue with a Time of Appearance and Disappearance Metric: Position on the display along a dimension depicting time, that dimension can be binary (current vs. past time) or two-stage (current time then past time streaming in some direction), or continuous time streaming from current to past time. In any case with time streaming, that past time will be depicted on a metric spatially linear, or non-linear compressed with more time per spatial extent as the time streaming approaches a disappearance point. A linear metric can be a ratio metric, with the zero point defined as the appearance point, or in displays with a current column, as in FIG. 10, as the boundary between the current column and the time streaming part of the display.

Visual Cue Vocabulary: Any audio cue that has a Time Extent, i.e. a time of appearance then disappearance, can be depicted as appearing and disappearing along a visual dimension depicting time. For example, a Note can appear at an appearance point, points, line or lines, then visually extend in a time streaming pattern to a disappearance point, points, line or lines. For example: A Note can appear at the right edge of the display, then time stream to the left to disappear at the left edge. Visual cues not associated with an individual Note, e.g., Affect (Cue 17), can be depicted either in a time relation with the Notes to which it is associated, e.g. matching (in time) its associated Notes in a time streaming pattern but separated from those Notes, or that audio cue can be represented by a visual cue, e.g. a colored area or bar, that appears and disappears in time, in a way not linked to a time streaming pattern in the visual display. The two-stage case mentioned in the metric discussion is presented in FIG. 10, with a current column representing the currently playing Notes, then a time streaming pattern off to its left. In that type of display, the Time Extent of a Note is indicated by both its existence in the current column and in the time streaming part of the display to the (in this case) left. Note that in cases where the time streaming pattern is non-linear in time, e.g. where that pattern is compressed in time per spatial extent as the time streaming approaches the disappearance point, points, line or lines, the spatial extent of a Note is not linear with its Time Extent.

Audio Cue 3. Pitch.

The Pitch of a Note is perceived based on its frequency. The Pitch of a group of Notes, such as a guitar Strum, is associated with the Pitches of its component Notes.

Metric: Ordinal, anywhere from monotonic to logarithmic in frequency. Generally, logarithmic metric on frequency is desirable in that Pitch is perceived on a logarithmic scale with frequency. That is, an octave interval is always a factor of two in frequency, with each other musical interval corresponding to a certain ratio of frequencies. That logarithmic metric means, then, that for cases where Pitch is mapped on to a spatial dimension on the display, any given musical interval is mapped on to a given distance on the display. For example, an octave will always correspond to X inches on the display, a major fifth will correspond to $\frac{7}{12}$*X inches (if well tempered) on the display, etc. That said, it can be effective to adjust that logarithmic scale over the range of Pitches, e.g. to compress that scale in terms of interval per inch as Pitch moves up, or alternatively to compress that scale as Pitch moves down.

Visual Cue Vocabulary: Pitch can be mapped onto any axis of the display or line on the display. One mapping of Pitch would be to the vertical position on the display, with Notes without tonal Pitch, e.g. percussive hits, assigned to a special region of the display. However, Pitch may also be mapped to one or more other visual cues on List (a) Version 5, the ordinal version.

Audio Cue 4. Amplitude of a Note

The perceived Amplitude of a Note is a logarithmic function of physical amplitude of that Note.

Metric: All ordinal metrics can apply to this cue: Monotonic, non-linear, linear, ratio or logarithmic in physical amplitude, though note as described further herein that some adjustments to the metric can be desirable. Aside from those adjustments, a logarithmic metric on physical amplitude is desirable in that Amplitude is perceived on a logarithmic scale with physical amplitude.

Visual Cue Vocabulary: One or more of the List (a) Version 5 cues, the ordinal version, can be used. One mapping of Amplitude would be to the visual brightness of the Note icon. Note that in music often the significance of that Amplitude is related to the Amplitude of a Note relative to the Amplitudes of its concurrent or adjacent Notes, referred to commonly as the accent of a Note. The device could highlight accented Notes with differences in brightness/size/border/etc. exaggerated relative to the actual physical difference in audio Amplitude. In addition, the device could account for the fact that the perceived Amplitude of a Note may be a function of the instrument producing that Note. For example, a drum may be perceived as having a lower Amplitude than a singer's voice, relative to the difference in physical amplitude of the two instruments-voices. In those cases the device can adjust the indicated visual cue for Amplitude to reflect that phenomenon.

That adjustment is referred to as amplitude attenuation as function of LIV in Operation 120 in the discussion associated with FIG. 1.

Audio Cue 5. Timbre of a Note

The Timbre of a Note is a function of the relative amplitudes of the overtones and undertones of that Note. Overtones and undertones are naturally occurring frequencies that accompany the primary frequency of a played or sung Note, at even multiples over that primary frequency (overtones) and at even fractions of that primary frequency (undertones). Those overtones and undertones are not perceived as separate Notes. Rather, the relative amplitudes of those overtones and undertones are what makes a violin sound like a violin, not a trumpet, and so forth between the different instruments and voices performing music. Timbre extends to instruments lacking a tonal Pitch, such as drums. Based on that, we refer to Timbre operationally in brief as "Label, Instrument or Voice," "LIV," in that the device detects the Timbre of a Note and based on that assigns that Note a LIV. Cues 6, 7 and 8 are also aspects of Timbre, but are treated separately because they are perceived differently than simply violin vs. trumpet etc.

Metric: Nominal, with some patterns. That is, Timbre is a label, with no ordinal relationship among those labels, except that there are relationships among Timbres that can be reflected in the visual cue or cues for Timbre. For example, certain sets of instruments have Timbres that are similar to each other, e.g. among different bowed string instruments, as contrasted to brass instruments, etc. The corresponding visual cue or cues can reflect those patterns of similarity.

Visual Cue Vocabulary: Timbre can be mapped into one or more of the List (a) Version 1 visual cues of Note icons, optionally in a manner reflecting patterns among Timbres. In addition, Timbre can be mapped into spatial separations of Note icons into regions on the display, those regions labeled by Timbre by List (a) cues and/or explicit icons or titles labeling each region, those regions parallel to the dimension on the display depicting time. For example, in displays with horizontal time streaming, Notes from different instruments-voices (i.e., different Timbres) can be assigned to different horizontal bands on the display, each band labelled with optional explicit icons or titles designating the Timbre, i.e. labels identifying the instrument (and optionally the number of instruments) and singing voice (and optionally labeling gender, part, and/or number of singers), and can even identify the names of the performer(s), for each display band. The device can assign Notes of different Timbres to any combination of separate bands and visual cues of Note icons in a blended display, including Notes of a Timbre appearing in both separate bands and the blended display. The number of separate bands chosen by the device can be determined by settings of Aspects 1-6. The labeling of separate bands would be of special value to hearing-impaired users. Note that even without explicit Timbre icons or titles, the typical listener can associate what he sees on the display to what he is hearing and so identify a particular Note icon or display band with "trumpet," "male voice," etc. Generally the same points will be made, from a different perspective, regarding the separation into display bands in Cue 10, Melody, Harmony and Percussion Lines.

Audio Cue 6. N-Instrument.

This cue represents the difference between, e.g., a single violin playing a Note and a section of ten violins playing that same Note. Those two "Notes" sound significantly different, even though they are the same instrument(s) playing the same Note. That differing perception is based on variance in the individual Timbres of each instrument, Amplitude, and variance in attacks, phase and (in some cases) bowing. This same cue extends to different instrument types playing the same Note, and more than one instrument of each type playing the same Note.

Metric: In all of those cases, this N-Instrument cue is a version of Timbre, and so can be mapped to the visual cue as a nominal, binary (i.e. it is there or it is not there) metric. However, there is an ordinal metric quality to this cue that can be captured. For example, two violins have less of an N-Instrument affect than 20 violins.

Visual Cue Vocabulary: The nominal, binary metric can be depicted using one or more List (a) Version 1 visual cues modifying Note icons. For example, the N-Instrument cue could be an added thickness or fuzziness to the border of the Note, with all other aspects of that Note icon not revised. The different-instrument versions of the N-Instrument cue could also be marked by special borders. The ordinal quality, magnitude of the N-Instrument effect, can be captured by the degree of change of the icon, varying as specified in List (a) Version 5, the ordinal version. For example, that thicker or more fuzzy border could have its thickness or fuzziness scaled to the magnitude of the effect relative to the corresponding single-instrument audio cue. That scaling can be on a monotonic, non-linear, linear, ratio or logarithmic metric.

Audio Cue 7: Sibilance

This cue is the pronounced "ess" aspect of Timbre, and applies primarily to voice Timbres. It is typically highly transient.

Metric: As with Cue 6, as a version of Timbre this cue can be mapped to a visual cue as a nominal, binary (i.e. it is there or it is not there) metric. However, again as with Cue 6, there is an ordinal metric quality to this cue that can be captured: Sibilance ranges from non-existent to slight to severe.

Visual Cue Vocabulary: The nominal binary metric can be depicted using one or more List (a) Version 1 visual cues modifying Note icons. Example mappings include a flickering white border at the top of a Note icon, or a flickering white area of a borderless Note icon, lasting only as long as the Sibilance lasts. The ordinal quality, magnitude of the Sibilance, can be captured by the degree of change of the icon, varying as specified in List (a) Version 5, the ordinal version. For example, more severe Sibilance could be represented by a larger and/or brighter flickering white border, the size and/or brightness scaled to the magnitude of the effect relative to the corresponding no-Sibilance audio cue. That scaling can be on a monotonic, non-linear, linear, ratio or logarithmic metric.

Audio Cue 8. Attack and Decay of a Note, Strum or Chord

In the Note version, this audio cue is based on, for the Attack, the onset profile of a Note, its shape and rapidity of growth of Amplitude, as well as the Timbre of that leading part of the Note. Decay as considered here is the profile of diminishing Amplitude over time. There are other aspects of decay, e.g. a singer can change a vowel or add a voiced consonant, but those other aspects will not be considered here. Any Note by an instrument or voice has Attack and Decay as variables. In the Strum and Chord versions, the Attacks of each individual Note comprising the Strum or Chord aggregate to the Attack of the Strum or Chord, though that Attack of the Strum or Chord is perceived as something different than the Attacks of the individual Notes involved.

Metric: Again as with Cue 6, as a version of Timbre the Attack part of this cue can be mapped to a visual cue as a nominal, binary (i.e. it is there or it is not there) metric. However, again as with Cue 6, there is an ordinal metric quality to this cue that can be captured: Attack ranges from minimal to pronounced. The Decay part of this cue can be depicted simply by the profile of the diminishing value of Amplitude (Cue 4) over time.

Visual Cue Vocabulary: The nominal binary Attack metric can be depicted using one or more List (a) Version 1 visual cues modifying Note icons. Example mappings include the appearance of the leading border of a Note icon, or the leading edge of a borderless Note icon, e.g. its shape, fuzziness, thickness, color, gradient ramp, and/or relative brightness. Another visual cue could be a symbol, e.g. an exclamation point. Attack visual cues can extend to the Attack of a group of Notes, e.g. Strum or Chords, applied to the visual representation of those cues. The ordinal quality of Attack, the sharpness of the Attack, can be captured by the degree of change of the representation of the Note, Strum or Chord, varying as specified in List (a) Version 5, the ordinal version. A more pronounced Attack could be represented by for example a larger and brighter modification of the leading border or leading edge of the visual representation, the size and/or brightness scaled to the magnitude of the effect relative to the corresponding minimal-Attack audio cue. That scaling can be on a monotonic, non-linear, linear, ratio or logarithmic metric. The Decay part of this cue does not need any special visual cue, since it can be depicted by the profile over time of the diminishing Amplitude (Cue 4).

Cues 9-14 pertain to characteristics of sets of notes (though note that Cue 8 applies to both Notes and sets of Notes).

Audio Cue 9: Strum.

Strums are specially perceived phenomena, not simply the Chords or near-simultaneous Notes comprising them. We have captured two aspects of Strums in two other cues: Attack (Cue 8) and Chord (Cue 11). What remains, in this Cue 9, is the perceived phenomenon of Strums not captured in those two other cues.

Metric: As with Cues 6-8, there are two metric qualities with this Cue: 1.) Nominal, binary: simply the on/off quality of a Strum; 2.) Ordinal: the overall volume of the Strum. Another ordinal quality of a Strum is already captured in the Attack cue (Cue 8).

Visual Cue Vocabulary: Strums can be represented by any combination of four options. Option 1.) Simply presenting the comprising Notes (with their Cues 1-8), though those Note icons can be modified with a cue or cues from List (a) Version 1, specifically to designate a Strum. The 1/16th-second time resolution of the device (in the example implementation) will depict generally the same offsets of Note onsets as the human ear will perceive. Option 2.) A Strum visual cue as a localized connecting line, border, band, shape or region extending over the Notes in the Strum, that connecting cue characterized with a cue or cues from List (a) Version 2; Option 3.) That Option-2 visual cue, but separated from the Strum notes, yet aligned with them in Time and/or Pitch, characterized with a cue or cues from List (a) Version 3. Option 4.) That Option-2 visual cue, but separated from the Strum notes and not aligned with them in Time or Pitch, characterized with a cue or cues from List (a) Version 4. That Option-2-3-4 Strum visual cue may include some or all of the Cues 1-8 of the comprising Notes. To be clear, the "any combination" term includes an Option 2-3-4 visual cue with or without depictions of the involved Notes.

As to the ordinal quality, the overall volume of the Strum: The Option-2-3-4 Strum visual cue can vary to indicate the overall volume of the comprising Notes, varying as specified in List (a) Version 5, the ordinal version, e.g. varying size or brightness of the visual cue, in a manner consistent with the metric and visual cue vocabulary parts of Cue 15 below. Note that in cases where a Strum is the only sound in a piece, any depiction of overall volume of the Strum must be coordinated with the depiction of the Overall Volume of the piece as presented in Cue 15.

Audio Cue 10: Melody, Harmony, and Percussion Lines

Musical pieces, other than solos, can have Melody, Harmony, and Percussion ("MHP") Lines. Musical pieces can have any combination of multiple Melody Lines, multiple Harmony Lines, and multiple Percussion Lines. We will abbreviate that set of Lines as MHP Lines. Those different Lines are typically a critical part of the perception of the piece. Though for many pieces there is not a clean delineation between Melody and Harmony Lines.

Metric: Ordinal or ordinal with ties. At first glance those MHP Lines are simply separate, and so nominal. But in fact there is at least a partially ordinal quality that can be applied: Melody over Harmony over Percussion, though for some renditions that ordering can be varied. While for any particular piece some of those orderings could be arguable, e.g. orderings between two Melody Lines and so forth, for any musical piece those Lines can be ordered, though that ordering may include ties, and may change in the course of the piece.

Visual Cue Vocabulary: MHP Lines can be mapped into the visual display in either of two ways, or a combination of those ways: Option 1.) Separate regions of the display, optionally explicitly labelled, with an icon or text, by its MHP Line, parallel to the dimension on the display depicting time, e.g. horizontal bands in a horizontally time-streaming display; Option 2.) Differently highlighting, with a cue or cues from List (a) Version 1, the Notes belonging to the different MHP Lines while presenting them in a blended display or a blended part of the display, i.e. without separation into different regions of the display. That highlighting can include making the Melody Note icons larger or more generally, assigning different sizes to different Note icons represent the different MHP Lines. As discussed with Timbre (Cue 5), the device display, perhaps at least in part as a function of the set levels of Aspects 1-6, can assign any number of MHP Lines, including zero, to separate regions (e.g., horizontal bands for horizontal time streaming) and other MHP Lines to a blended part of the display with or without MHP line-designating cues, and even assign one or more MHP Lines to both a region and the blended display. Recall that this separation into display bands is also an option in Timbre (Cue 5). Those two different bases for display band assignments can be coordinated for the most effective display. Each band can be labeled, with an icon or text, to indicate both MHP line and the one or more Timbres of Notes in that line. These variations are the primary ones concerning Aspect 1 (Source Complexity), Aspect 2 (Genre), Aspect 3 (Signal Processing Called For), and Aspect 4 (Size, Effective Resolution of the Display) and controlled by Aspect 5 (User Experience & Needs) and Aspect 6 (User Preference). That is, the musical piece itself dictates Aspects 1 and 2, the implementation of the device dictates Aspects 3 and 4, then the device and user can select how to adapt to those Aspects 1-4 through adjustments in Aspects 5 and 6. Finally, note that the different-MHP-bands option has a special advantage, as with Cue 5: Those different display bands can be labeled with icons or labels identifying the MHP Line and/or the instrument (and optionally the number of instruments) or singing voice (and optionally labeling gender, part, and/or number of singers), and can even identify the names of the performer(s), for each display band. That labeling would be of special value to hearing-impaired users. All of the above may seem to be an overly complex choice space, but that choice space is called for to effectively cope with the facts that musical pieces vary extremely in complexity, again from a solo voice to Beethoven's Ninth, while Aspects 3-6 also vary over a broad range, as described previously in the context of "Bandwidth Management."

Audio Cue 11: Chords

Any set of concurrent Notes in a typical musical piece belongs to one of many standard Chords (each chord comprised of three or more Notes), so a visual cue corresponding to that Chord can be assigned to all of those concurrent Notes. Some pieces of music will be more effectively represented with Chord representations for only some of the Notes playing, e.g. the supporting parts and not the Melody.

Metric: There are two metric qualities with this cue: 1.) Nominal: the name of each Chord, with some patterns; 2.) Ordinal: the overall volume of the Chord.

Visual Cue Vocabulary, Level 1: As to the nominal quality: While Chords are intrinsically simply labeled and so those labels purely nominal, in fact the names assigned to Chords depict patterns among those Chords. Those names include adjectives such as major, minor, augmented, diminished, and half-diminished, as well as added intervals, e.g. added second, third, fourth, fifth, sixth, seventh, ninth, eleventh and thirteenth. In addition, any Chord has variations called inversions, where the notes of the Chord are rotated such that different notes of the Chord are at the lowest position. Inversions have implications for Affect (Cue 17) and Tension (Cue 18), and so can be labelled with a cue or cues indicating those implications. Those adjectives specify a structure of relationships among Chords that can be reflected in relationships among the visual cues assigned to them. For example if those visual cues are colors, the minor version of a major Chord could be assigned the same color as its major version, altered in a standard way, such as adding a particular hue, or that same color plus a standard pattern.

Visual Cue Vocabulary, Level 2: As with Strum (Cue 9), the Chord visual cue can be any combination of four options: Option 1.) Simply presenting the comprising Notes (with their Cues 1-8), though those Note icons can be modified with a cue or cues from List (a) Version 1 to indicate the Chord name; Option 2.) A Chord visual cue as a localized connecting line, border, band, shape or region extending over the Notes in the Chord, that connecting cue modified with a cue or cues from List (a) Version 2 to indicate the Chord name; Option 3.) That Option-2 visual cue, but separated from the Chord notes, yet aligned with them in Time and/or Pitch, characterized with a cue or cues from List (a) Version 3 to indicate the Chord name; Option 4.) That Option-2 visual cue, but separated from the Chord notes and not aligned with them in Time or Pitch, characterized with a cue or cues from List (a) Version 4 to indicate the Chord name. That Option-2-3-4 Chord visual cue may include some or all of the Cues 1-8 of the comprising Notes. To be clear, the "any combination" term includes an Option-2-3-4 Chord visual cue with or without depictions of the involved Notes. As to the ordinal quality, the overall volume of the Chord: The Option-2-3-4 Chord visual cue can vary to indicate the overall volume of the comprising Notes, varying as discussed in List (a) Version 5, the ordinal version, e.g. varying size or brightness of the visual cue, in a manner consistent with the metric and visual cue vocabulary parts of Cue 15 below. Note that in cases where a Chord is the only sound in apiece, any depiction of overall volume of the Chord must be coordinated with the depiction of the Overall Volume of the piece as presented in Cue 15.

Since Chords (Cue 11) and Sequential Intervals (Cue 13) can both modify the same Notes in related but separate ways, Cue-11 visual cues may extend over only part of a Note, as another part of each Note may depict Cue 13. For a given piece of music any combination of visual cues can be applied. For example, in a piece we are working with that is simply three female voices, soprano-soprano-alto, as one option each three-Note concurrent set is depicted with an icon with a height denoting Melody Pitch, a color denoting its chord, and a separate, smaller icon indicating the Pitch of the alto. Bandwidth management also comes into play here. While those three voices simply move from single chord to single chord (with one complication to be presented in Cue 14), for example Beethoven's Ninth includes many complex Chords, which may be most effectively represented in a summary form that does not completely represent all chordal relationships among all concurrent Notes in all places in the piece.

Audio Cue 12: Inte,Va/s, that is, Pitch Inte,Va/s Between Pairs of Concurrent Notes Examples: a third, a fourth, a fifth, then those modified by the adjectives major, minor, augmented and diminished. Intervals are often crucial to music perception and appreciation. It could be argued that the viewer can observe those intervals by for example the distance between the Note icons in the display (when Pitch is represented by height on the display), but while the perceived differences between Intervals of for example a third and a fourth are quite distinct, the height differences associated with those two Intervals are quite similar. The solution to that issue presented here is to have the device assign an Interval cue value to each pair of notes for which that Interval is important to music perception and appreciation.

Metric: The nominal metric quality that applies to this cue is essentially the same as that applies to Chords, Cue 11, so the nominal metric discussion in Cue 11 applies here as well.

Visual Cue Vocabulary: The vocabulary of possible visual cues is the same as for Chords, Cue 11. In some cases Intervals are related to Chords in the piece, and so can be labelled using cue values related to, or even the same as, their corresponding Chords. In other cases or in those same cases, Intervals have significance for Tension and Release, and so can be labelled using cue values related to the cues being used for Tension and Release (see Cue 18).

In parallel with the foregoing discussion, in Cue 11, of Cues 11 and 13 both modifying Notes, those same considerations apply to Cues 12 and 13 both modifying Notes, so that discussion applies here as well.

Audio Cue 13: Note Sequences, Pitch Intervals Between a Note and a Previous Ended Note Corresponding to that Note This cue extends to arpeggios, the notes of a chord played in succession. This cue deals with the fact that interval relationships, just discussed in Cue 12 as crucial to music perception and appreciation, extend to the perception and appreciation of sequences of Notes. In the extreme, if the device is presenting a solo, those sequential interval relationships are the primary thing determining the appreciation of the piece, and so they must be depicted visually. It could be argued that the viewer can observe those intervals by for example how much Note icons move up and down in the display (when Pitch is represented by height on the display), but while the perceived differences between intervals of for example a third and a fourth are quite distinct, the height differences associated with those two intervals are quite similar. One solution is to have the device assign a sequential-interval cue value to each sequential step of Notes. In fact, the same cue value could be assigned to a sequential interval “X” as is assigned to the corresponding concurrent interval “X” in Cue 12.

Metric: The nominal metric quality that applies to this cue is essentially the same as that applies to Cue 12, so the nominal metric discussion in Cue 12 applies here as well.

Visual Cue Vocabulary: The vocabulary of possible visual cues is the same as for Cue 12, with two modifications: 1.) The visual cue for Options 2 and 3 extends over the sequential pair of Notes or the several Notes of the arpeggio; 2.) Since an arpeggio spells out a Chord, an arpeggio can be labelled with the same cue or cue values as that Chord, using any of the four options for visual cues presented in Cue 11, Chords.

The descriptions herein, in Cues 11 and 12, of Cues 11, 12 and 13 all modifying the same Notes, can now be combined here: The device may include the option of presenting both sequential-interval cues and Chord cues to the same Note, as well as the option of presenting both sequential-interval and Interval Cues to the same Note. One option would be to assign the sequential-interval cue, e.g. a color, to the leading half of the second Note icon (or for example the first second for Notes longer than two seconds, or a similar algorithm), and the Interval or Chord cue, e.g. another color, to the remaining fraction of that Note icon. One consideration is how to identify, when several Notes are changing at once, which pairs of Notes should be depicted as sequential pairs for this Cue 13. That can be partially addressed by assigning as sequential pairs two Notes that at least share the same Timbre and Cues 6-8, and also at least share the same Melody-Harmony Line where that cue applies.

Audio Cue 14: Transitional Note, Non-Chord Tone

One complication related to Cues 11 and 13 is that there are sometimes Transitional Notes between two Chords, or associated with two adjacent Chords, that are important for music perception and appreciation. Those are termed Non-Chord Tones and typically fall into several categories, e.g. Passing Tone, Neighboring Tone, Appoggiatura and Suspension. In some of those categories, the Transitional Note sounds between the previous and next Chords. In the other categories, the Transitional Note sounds coincident with other notes of the second chord, but then the second Chord is resolved in a next step. In either case, the Transitional Note process involves three points in time: either 1.) the first Chord, then the Transitional Note, then the second Chord; or 2.) the first Chord, then a transitional version of the second Chord, then the resolved second Chord.

Metric: In the first five cases, the metric quality that applies to this cue involves either Note Sequences (Cue 13) and/or Chords (Cue 11), so the metric discussions of those two cues apply here as specified in the visual cue vocabulary discussion to follow. In the second five cases, the second Chord goes through transitional then resolved stages, so there is in fact a progression through three Chords, so the metric discussion in Chords (Cue 11) applies.

Visual Cue Vocabulary: In the first five cases, the Transitional Note can be assigned a version of the Chord (Cue 11) value assigned to the earlier of the two Chords it is transitioning between. For example, that Cue 11 value, if it is a color, could be that same hue but darkened. Then as the second Chord is sounded, the Transitional Note disappears. Alternatively or in addition, the Transitional Note can be linked to its associated preceding Note using cues consistent with Note Sequences (Cue 13) Options 1, 2, 3 and 4, in general format or in specific values. In the second five cases the transition involves simply presenting the three Chords using the visual cues of Chord (Cue 11). Assuming those Chord cues capture relationships between transitional and resolved Chords, the effect of the Transitional Note can be well represented.

Cues 15-19 involve characteristics of an overall musical piece and Musical Phrases Within the Piece.

Audio Cue 15: Overall Volume, Dynamics of all Notes Together

This cue is distinctly different from Cue 4, Amplitude of a Note. The Overall Volume of a piece, including shifts such as crescendos and diminuendos, are often a dramatically important part of music perception and appreciation.

Metric: As effectively a version of Cue 4, the metric for this cue takes on the same form as the metric for Cue 4: Monotonic, non-linear, linear, ratio or logarithmic in physical amplitude. A logarithmic metric is desirable in that Amplitude is perceived on a logarithmic scale with physical amplitude. The exceptions discussed for Cue 4 do not apply to this Cue 15.

Visual Cue Vocabulary: As this Cue 15 applies to all Notes playing at one time, it should be spatially associated with all of the Notes to which it applies, not with any one Note. Visual cues can include a line, border, band, shape or region of the display, parallel to the time dimension, varying with changing Overall Volume in one or more cues from List (a) Version 5, the ordinal version, e.g. varying in size or brightness. For example in a horizontally time streaming display, the Overall Volume can be indicated by a cue or cues from List (a) Version 5, the ordinal version, in a horizontal band or region above, below or in the background of the time streaming Notes. In that way the user observes the dynamics of crescendos and diminuendos in a spatially effective way. In displays where a part of the display represents the currently playing Notes in a separate region, as with the current column in FIG. 10, that current part of the display can become larger with increasing volume and vice versa. Though in those cases, if a part of the display includes time streaming, as in FIG. 10, Overall Volume in the time streaming part of the display can be displayed in a band parallel to the time streaming dimension, aligned in the time dimension, and so be associated with the point in time to which it applies.

Audio Cue 16: Chord Progression

Often a progression of Chords is an important part of the perception and appreciation of a piece, in a way not simply associated with each individual Chord in that progression.

Some pieces of music will be more effectively represented with Chord Progression representations for only some of the Notes playing, e.g. the supporting parts and not the Melody. One typical Chord Progression is tonic, sub-dominant, dominant, then back to tonic. A typical Chord Progression pattern is a repetition of one Chord Progression.

Metric: Nominal, with some patterns: the name of the Chord Progression. While Chord Progressions seem to be intrinsically simply labeled and so those labels purely nominal, in fact the names assigned to Chord Progressions indicate patterns among those Chord Progressions. Those patterns can be reflected in the visual cues assigned to them. For example, if the visual cue is based on color, then the colors of related Chord Progressions can themselves be related.

Visual Cue Vocabulary: Analogously to Strum (Cue 9) and Chord (Cue 11), this visual cue can be any combination of four options: Option 1.) Simply presenting the comprising Notes (with their Cues 1-8), though those Note icons can be modified with a cue or cues from List (a) Version 1, specifically to designate a Chord Progression; Option 2.) a Chord Progression visual cue as a localized connecting line, border, band, shape or region, extending over the Chords in a Chord Progression, that connecting cue modified by a cue or cues from List (a) Version 2; Option 3.) That Option-2 visual cue, but separated from the Chord Progression Notes, yet aligned with them in Time and/or Pitch, characterized with a cue or cues from List (a) Version 3; Option 4.) That Option-2 visual cue, but separated from the Chord Progression Notes and not aligned with them in Time or Pitch, characterized with a cue or cues from List (a) Version 4. That Option-2-3-4 Chord Progression visual cue can include some or all of the Cues 1-8 of the comprising Notes. To be clear, the "any combination" term includes an Option-2-3-4 visual cue with or without depictions of the involved Notes. One version of Option 3 can be particularly effective: As a band, parallel to the time axis, aligned in time with the time extent of each Chord Progression. For example with horizontal time streaming, Chord Progression could be indicated by a horizontal band on the top, middle or bottom of the display. Note in those cases that a pattern of a repeated Chord Progression can be seen graphically in that horizontal band.

Audio Cue 17: Affect

The Affect of a piece is the overall perceived and appreciated "mood" of the piece or part of a piece, e.g. somber, cheerful, grand, etc. It is a function of, e.g., color (i.e., major, minor), Chord Progression, tempo and instrumentation. In some cases musicians can shift the Timbre of their instrument in a direction that indicates Affect, e.g. a violin played in the classical style vs. played as a fiddle.

Metric: There are two metric qualities with this cue: 1.) Nominal: A label for each different type of Affect, e.g., somber, cheerful, grand, etc.; 2.) Ordinal: The degree of, the extremeness of, that Affect, e.g. very slightly cheerful to extremely cheerful.

Visual Cue Vocabulary: The nominal-aspect visual cue or cues can be selected from the same visual-cue vocabulary as listed for Chord Progression, Options 1, 3 and 4, with the visual cue for Option 3 extending over the Time Extents of the Affect. The Options 3 and 4 visual cue can vary to indicate the degree of the Affect, varying as specified in List (a) Version 5, the ordinal version, e.g. varying in size or brightness.

Audio Cue 18: Tension/Release

The perception and appreciation of many musical pieces involves a sense of tension and release that can be created and/or enhanced by any of several means, including Chord Progressions, Intervals, relationships between Melody and Harmony Lines, relationships between multiple Melody Lines and volume.

Metric: Ordinal. That is, as a piece moves away from the tonic or a major chord, Tension increases. Then as it moves back toward the tonic or a major chord, that Tension decreases.

Visual Cue Vocabulary: The visual cue can be selected from the same visual-cue vocabulary as listed for Chord Progression, Options 1, 3 and 4, with the visual cue for Option 3 extending over, e.g. the Pitch and/or Time Extents of the Tension and Release, except in each case indicating the degree of Tension by varying that cue or those cues as specified in List (a) Version 5, including color varying in hue. That is, the increasing-Tension part of a Tension-Release sequence may involve an increase in a visual cue, then the Release part of that sequence may involve a decrease in that same visual cue. For example, in a parallel band a neutral blue could represent lack of Tension, then shifting to more and more red as Tension increases, and vice versa. Alternatively or in addition, Tension/Release can be represented more spatially by a line representing the tonic, then an indication of the Tension-Release distance of the current Notes (Chords) from that tonic line. Since Tension/Release characterizes the entire piece, there is no need for any special indication of Overall Volume, as that is fully captured in Cue 15.

Audio Cue 19: Ambience

In many musical pieces, one aspect of the perception and appreciation of the piece is the background audio Ambience. For example, a piece played in a large cathedral has a distinctive Ambience, based on the reverberation of especially the lower Pitches.

Other examples of Ambience involve the way the music is processed between the source and the audio file. Contemporary artists with distinctive Ambience include Enya and certain pieces by Florence and the Machine.

Metric: There are two metric qualities with this cue: 1.) Nominal: A label for each different type of Ambience, e.g. cathedral vs. synthesized in one particular way; 2.) Ordinal: Ambience can be totally lacking, as in a very "clean and crisp" studio production, or it can be so prominent as to almost obscure the music of the piece.

Visual Cue Vocabulary: The type of Ambience can be indicated by a region, frame, border, band or line that is colored, patterned, textured, shaped, and/or fluctuating with time (or more generally any cue or cues from List (a) Version 4), including those visual cues surrounding or including some or all of the display. One version of a List (a) Version 2 cue is to have the type of Ambience indicated by an iconic image in the background or in some region of the display, e.g. an image of a cathedral if the Ambience is suggestive of a cathedral. The magnitude of Ambience can be represented by varying that cue or those cues as specified in List (a) Version 5, the ordinal version. Those ordinal cues can be scaled to the magnitude of the effect, relative to the same music totally lacking in Ambience, on a monotonic, non-linear, linear, ratio or logarithmic scale. As opposed to Cues 15-18, which involve aspects intrinsically tied to particular time periods in a piece, generally the Ambience of a piece applies to the entire piece. As such, Ambience can be represented by a visual cue covering the entire background of the display, or of an entire frame of the display. Then in pieces where Ambience varies over time, that background or frame can vary over time, in a way that either is aligned with time streaming, or is not aligned with time streaming, where time streaming is involved. In some cases the Ambience has its own sense of Tremolo, such that its visual cue or cues can include fluctuation with time, though one designed to not be too distracting.

Cues 20-22 involve audio cues that could be depicted with Cues 1-4, with no special mapping. The following three cues do not require special mapping, though their perception and appreciation can be enhanced by special mapping, as described here.

Audio Cue 20: Vibrato

This audio cue is simply a Pitch fluctuation in a Note. As such, it can be represented simply by Cues 1-3, a Note representation fluctuating in Pitch. Yet the full perception and appreciation of Vibrato could be enhanced by other visual cues.

Metric: There are two metric qualities with this cue: 1.) Binary, with a visual cue designating a Vibrato (exists or not); 2.) Ordinal, indicating the magnitude of Pitch fluctuation of that Vibrato.

Visual Cue Vocabulary: The vocabulary of visual cues is the same as for Strum (Cue 9), with the modification that it applies to a single Note over time as it fluctuates in Pitch, with the visual cue or cues for Options 2 and 3 extending over the Pitch and/or Time extents of the Vibrato. As to the ordinal quality, the degree of fluctuation in Pitch, the Option-2-3-4 Vibrato visual cue can vary to indicate the degree of fluctuation in Pitch, as specified in List (a) Version 5, the ordinal version, e.g. varying size or brightness of the visual cue, and that variation can be scaled to the magnitude in Pitch fluctuation at a monotonic, non-linear, linear, ratio or logarithmic metric.

Audio Cue 21: Tremolo

There are several definitions of Tremolo. As used here, this audio cue is simply an Amplitude fluctuation in a Note. As such, it can be represented simply by Cues 1, 2 and 4, a Note representation fluctuating in Amplitude. Yet the full perception and appreciation of Tremolo can be enhanced by other visual cues.

Metric: As with Vibrato, there are two metric qualities with this cue: 1.) Binary, with a visual cue designating a Tremolo (exists or not); 2.) Ordinal, indicating the magnitude of Amplitude fluctuation of that Tremolo.

Visual Cue Vocabulary: The vocabulary of visual cues is the same as for Strum (Cue 9), with the modification that it applies to a single Note over time as it fluctuates in Amplitude, with the visual cue or cues for Options 2 and 3 extending over the Time Extent of the Tremolo. As to the ordinal quality, the degree of fluctuation in Amplitude, the Option-2-3-4 Tremolo visual cue can vary to indicate the degree of fluctuation in Amplitude, as specified in List (a) Version 5, the ordinal version, e.g. varying size or brightness of the visual cue, and that variation can be scaled to the magnitude in Amplitude fluctuation at a monotonic, non-linear, linear, ratio or logarithmic metric.

Audio Cue 22: Glissando

This cue is simply a time sequence of Notes changing in Pitch in rapid succession, where that rapid succession is perceptually and appreciationally distinct from a less rapid sequence of Notes. As such, it can be represented simply by Cues 1-3, Note representations of that rapid sequence of Notes. Yet the full perception and appreciation of Glissando can be enhanced by other visual cues.

Metric: Binary. That is, a visual cue can simply designate a Glissando (exists or not). Other, ordinal characteristics, such as rapidity, Pitch range or Amplitude, are adequately represented by Cues 1-4 of the comprising Notes.

Visual Cue Vocabulary: The vocabulary of possible visual cues is the same as for Strum (Cue 9), with the visual cue or cues for Options 2 and 3 extending over the Pitch and/or Time Extents of the Glissando.

Assembling the Visual Cues into an Overall Mapping

The foregoing description presents several choices of audio-cue-to-visual-cue mappings for each of 22 audio cues. For any particular settings of the six aspects presented hereinabove, there will be a subset of all possible mappings that will be adequately, to most, effective. The effectiveness of the device will be determined by how those several cue-to-cue mappings, one for each audio cue selected to be mapped, interact to comprise the overall display. Displays can range from depicting as few as three or four of the audio cues, to all 22 audio cues.

There are two goals for the most effective mapping that apply at a level above cue-to-cue mappings. Those are disambiguation and perceptual conformality. Disambiguation is straightforward: The cue-to-cue mapping must be selected such that every visual cue displayed can be mapped by the user unambiguously to the audio cue it represents. For example, if a selected mapping uses a color red within a Note icon to indicate a particular Chord that Note is part of, that same color red within a Note icon cannot also indicate the Tension status of that Note icon. Though note that that same color red can indicate the Tension status of any given time in the musical piece if it appears in a region or band of the display that is spatially separate from individual Note icons.

The second goal is perceptual conformality. As has been described elsewhere herein: Perceptual conformality ensures that a user of the technology will experience music acoustically and visually in a closely analogous way. To apply that more directly here, perceptual conformality has as an overall goal the display of the selected set of visual cues that is most compellingly analogous to the set of audio cues that set of visual cues represents. Also, as has been discussed and explained, perceptual conformality involves four conditions: orthogonality, ordinality, time streaming and association, though association may or may not be mapped for particular audio cues. As can be seen from earlier in this appendix, given disambiguation, the conditions of orthogonality and ordinality are built in to the visual cue vocabularies listed above, while time streaming is a selectable aspect of the overall display. The condition of association must be considered on a case by case basis. With the exception of Time Extent, which is intrinsically associated with time streaming, all other audio to visual cue mappings are flexible with respect to association. For any particular musical piece and setting of the six aspects described earlier, two visual cue representing associated audio cues may be most clear if they are spatially associated, e.g. Timbre modifying a Note. Yet for other musical pieces and settings of the six aspects, two visual cues representing associated audio cues may be most clearly presented if they are not spatially associated. For example in a complex piece, a visual mapping of a Chord may be most clearly presented in a region of the display separate from the Notes comprising that Chord. That case by case determination can be made based on the settings of the six aspects described earlier.

All references cited herein are incorporated by reference in their entireties.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims.

What is claimed:

1. A computer-implemented method of presenting a visualization of a piece of music, the method comprising:

(a) selecting a translation system, from a set of-more than one translation systems to generate a selected translation system, wherein each of the translation systems comprises, a. a set of psychoacoustic cues, each psychoacoustic cue selected from a set of psychoacoustic cues, each psychoacoustic cue representing a distinct acoustic element of the piece of music specific to music perception, and b. an assignment of each selected psychoacoustic cue to a different visual cue to provide a one-to-one correspondence between each selected psychoacoustic cue and each visual cue;

(b) extracting the selected psychoacoustic cues from the piece of music and translating, as a function of the selected translation system, the extracted psychoacoustic cues to corresponding visual cues;

(c) presenting the visualization of the piece of music on a display screen by causing display of the visual cues on the display screen as the piece of music is being played, so that one or more persons sees the corresponding visual cues time synchronized with the piece of music as they hear the piece of music; and (d) adjusting the assignment of psychoacoustic cues to visual cues to account for the complexity of the piece of music and size and resolution of the display screen.

2. The computer-implemented method of claim 1, wherein the selected psychoacoustic cues further comprise at least one cue representing pitch interval information, the at least one cue based on pitch interval information selected from one of:

pitch intervals among two or more simultaneously played notes;

pitch intervals between sequential notes including transitional notes and glissandos;

pitch intervals among notes in a chord progression;

pitch intervals among notes creating musical tension, and pitch intervals among notes creating musical affect.

3. The computer-implemented method of claim 1 further comprising:

causing display on the visual display to be divided into sections separately representing different aspects of the piece of music perceivable as separate musical components specifically to enhance music perception, that comprise one or more components selected from a set of components that include melody-harmony-percussion, and different instruments and voices.

4. The computer-implemented method of claim 1, wherein the selection of a translation system is aided by one or more decision aiding systems specifically designed to aid users in selecting translation systems from a larger set of possible translation systems, specifically to aid in music perception.

5. The computer-implemented method of claim 1 further comprising assembling a number of translation systems, and enabling the user to select or enter a translation system selection algorithm, based on the type of music or other descriptors of music to be visualized, to select from among those translation systems.

6. The computer-implemented method of claim 1 wherein the piece of music is received comprising information separated from separate music sources within and during a musical piece, wherein each music source of the separate music sources is specific to a particular instrument, or musician, or musical part, and some or all of the separate music sources are depicted visually separately on the visual display.

7. The computer-implemented method of claim 1, further comprising:

applying signal cancellation to enhance analysis of a time sample of the piece of music by cancelling out of the time sample specific features that have been identified from one or more previous time samples.

8. The computer-implemented method of claim 1 further comprising:

employing machine learning to develop relationships and patterns in music source data that enable improvement in the detection and extraction of psychoacoustic cues, wherein such cues are specific to music perception.

9. The computer-implemented method of claim 1 further comprising:

employing machine learning to develop and/or select the most desirable translation systems from psychoacoustic to visual cues, such translation specifically between one perceptual mode comprising psychoacoustic cues as descriptors of music in an audio perception domain, to a different perceptual mode comprising visual cues as descriptors of the same music in a visual perception domain, specifically as desirable for music perception.

10. The computer-implemented method of claim 1 further comprising:

employing machine learning to develop and/or select further adjustments in the visual display to complexity, structure, and tempo of the music, such adjustments in response to changes in the music as the piece of music is being played, such adjustments improving music perception.

11. The computer-implemented method of claim 1 wherein the display of the visual cues occurs time synchronized with the audio presentation of the piece of music as it is being played, that synchronization achieved by delaying the audio presentation with a time delay approximately equal to the time taken to perform the operations set forth in claim 1.

12. The computer-implemented method of claim 1 wherein the audio signal of the piece of music is received then processed performing the operations set forth in claim 1 to generate the visualization of the piece of music with a short enough signal processing time such that the visual cues are delayed with respect to the audio cues with delays short enough so as not to be perceived by the user.

13. The computer-implemented method of claim 1, wherein the translation system is selected in a process that combines the translation system selection responses of more than one user.

14. The computer-implemented method of claim 1, wherein the selected psychoacoustic cues further comprise at least one cue from the following set of cues, which are selected to be specifically significant for enhancing music perception:

vibrato of each note;

tremolo of each note;

sibilance of each note;

“N-Instrument” quality of each note;

glissando;

chord progression;

musical tension; and musical affect.

15. The computer-implemented method of claim 1, wherein each of the one or more translation systems performs a translation of music into a visually perceived version that is perceptually conformal such that the visually perceived version visually represents music that is heard at a perceptual level.

16. A computer-implemented method of presenting a visualization of a piece of music, the method comprising:

(a) selecting a translation system, from a set of-more than one translation systems to generate a selected translation system, wherein each of the translation systems comprises, a. a set of psychoacoustic cues, each psychoacoustic cue selected from a set of psychoacoustic cues, each psychoacoustic cue representing a distinct acoustic element of the piece of music specific to music perception, and b. an assignment of each selected psychoacoustic cue to a different visual cue to provide a one-to-one correspondence between each selected psychoacoustic cue and each visual cue;

(b) extracting the selected psychoacoustic cues from the piece of music and translating, as a function of the selected translation system, the extracted psychoacoustic cues to corresponding visual cues; and (c) presenting the visualization of the piece of music on a display screen by causing display of the visual cues on the display screen as the piece of music is being played, so that one or more persons sees the corresponding visual cues time synchronized with the piece of music as they hear the piece of music;

(d) wherein a time sequence of the selected psychoacoustic cues is represented as a time-streaming sequence of corresponding visual cues on the display screen, specifically to enhance music perception, whereby the time-streaming sequence comprises generating visual cues that first appear at one part of the visual display and shift along the display on a path toward a vanishing point, line or lines on the display, that shift monotonic with time.

17. A computer-implemented method of presenting a visualization of a piece of music, the method comprising:

(a) selecting a translation system, from a set of-more than one translation systems to generate a selected translation system, wherein each of the translation systems comprises, a. a set of psychoacoustic cues, each psychoacoustic cue selected from a set of psychoacoustic cues, each psychoacoustic cue representing a distinct acoustic element of the piece of music specific to music perception, and b. an assignment of each selected psychoacoustic cue to a different visual cue to provide a one-to-one correspondence between each selected psychoacoustic cue and each visual cue;

(b) extracting the selected psychoacoustic cues from the piece of music and translating, as a function of the selected translation system, the extracted psychoacoustic cues to corresponding visual cues; and (c) presenting the visualization of the piece of music on a display screen by causing display of the visual cues on the display screen as the piece of music is being played, so that one or more persons sees the corresponding visual cues time synchronized with the piece of music as they hear the piece of music;

(d) wherein the one-to-one correspondence further comprises:

(i) orthogonal correspondence between any two orthogonally related psychoacoustic cues and the two corresponding visual cues wherein the two corresponding visual cues are also orthogonally related to each other; and (ii) ordinal correspondence for a psychoacoustic cue as applied to any two notes so that the ordinal relationship between the psychoacoustic cues for the two notes is preserved in the relationship between the two corresponding visual cues for the two notes.

18. A computer-implemented method of presenting a visualization of a piece of music, the method comprising:

(a) selecting a translation system, from a set of-more than one translation systems to generate a selected translation system, wherein each of the translation systems comprises, a. a set of psychoacoustic cues, each psychoacoustic cue selected from a set of psychoacoustic cues, each psychoacoustic cue representing a distinct acoustic element of the piece of music specific to music perception, and b. an assignment of each selected psychoacoustic cue to a different visual cue to provide a one-to-one correspondence between each selected psychoacoustic cue and each visual cue;

(b) extracting the selected psychoacoustic cues from the piece of music and translating, as a function of the selected translation system, the extracted psychoacoustic cues to corresponding visual cues; and (c) presenting the visualization of the piece of music on a display screen by causing display of the visual cues on the display screen as the piece of music is being played, so that one or more persons sees the corresponding visual cues time synchronized with the piece of music as they hear the piece of music;

(d) wherein the selected translation system includes adjustments to complexity, structure, and tempo of the music as displayed in the visual display;

wherein the adjustments comprise one or more of:

adjustments to separations of melody, harmony, and percussion, adjustments to separations of musical parts and/or performers, adjustments to pitch range, and adjustments to the time displayed, wherein the time displayed comprises time from appearance of each musical event until the music event disappears from the display.

19. The computer-implemented method of claim 18 further comprising:

wherein the one or more adjustments to the translation system are made in response to changes in the music as the piece of music is being played.

* * * * *